United States Patent
Kitabayashi et al.

(10) Patent No.: US 6,935,745 B1
(45) Date of Patent: Aug. 30, 2005

(54) OPTICAL DEVICE, METHOD FOR MANUFACTURING OPTICAL DEVICE, AND PROJECTOR

(75) Inventors: Masashi Kitabayashi, Horigane-mura (JP); Nobuo Watanabe, Shiajiri (JP); Motoyuki Fujimori, Suwa (JP); Yoshiyuki Yanagisawa, Matsumoto (JP); Taisuke Uehara, Chino (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 10/189,387

(22) Filed: Jul. 8, 2002

(30) Foreign Application Priority Data

| Aug. 8, 2001 | (JP) | 2001-240449 |
| Aug. 8, 2001 | (JP) | 2001-240976 |
| Aug. 9, 2001 | (JP) | 2001-242680 |
| Jun. 6, 2002 | (JP) | 2002-165965 |

(51) Int. Cl.[7] ........................ G03B 21/00; G02F 1/1335; G02F 1/00
(52) U.S. Cl. ..................... 353/20; 349/5; 348/750; 348/758; 348/759
(58) Field of Search ............... 353/20, 31, 37, 353/84, 100, 119, 122; 348/750, 751, 758–59, 766; 349/5, 8, 9

(56) References Cited

U.S. PATENT DOCUMENTS

| 5,868,485 A | * | 2/1999 | Fujimori et al. ............ 353/119 |
| 6,053,616 A | | 4/2000 | Fujimori et al. |
| 6,056,407 A | * | 5/2000 | Iinuma et al. .............. 353/119 |
| 6,135,600 A | * | 10/2000 | Fujimori |
| 6,322,217 B1 | * | 11/2001 | Fujimori et al. ............. 353/31 |
| 6,587,167 B1 | * | 7/2003 | Fujimori et al. ............. 349/58 |
| 6,657,680 B2 | * | 12/2003 | Takizawa ...................... 349/5 |

FOREIGN PATENT DOCUMENTS

| EP | 0 803 754 A1 | 10/1997 |
| EP | 1 041 828 A2 | 10/2000 |
| JP | A 10-10994 | 1/1998 |
| JP | A 2000-221588 | 8/2000 |
| JP | 2000-258859 | 9/2000 |
| JP | A 2000-258859 | 9/2000 |
| JP | 2000-259094 | 9/2000 |
| JP | A 2000-259094 | 9/2000 |
| JP | 2001-21989 | * 1/2001 |

* cited by examiner

*Primary Examiner*—Rodney Fuller
*Assistant Examiner*—Michael Dalakis
(74) *Attorney, Agent, or Firm*—Oliff & Berridge, PLC

(57) ABSTRACT

The present invention provides an optical device that achieves reduction in size, reduction in manufacturing costs, improved image quality, and so forth, by simplification and the like of a panel in prisms (POP) structure wherein light-modulating devices and a color synthesizing optical element are integrally formed. A POP structure is configured wherein pins integrally formed with a holding member are inserted through holes formed in the four corners of holding frames storing the liquid crystal panelsso as to fix the holding frames and holding members by adhesion. End faces of holding members opposite to the pins are fixed by adhesion to the side faces of bases fixed on the upper and lower faces of a cross-dichroic prism.

84 Claims, 49 Drawing Sheets

OPTICAL DEVICE, METHOD FOR MANUFACTURING OPTICAL DEVICE, AND PROJECTOR

BACKGROUND OF THE INVENTION

1. Field of Invention

The present invention relates to an optical device wherein a light modulating device for modulating color light according to image information and a color synthesizing optical element for synthesizing color light modulated by the light modulating device are integrally formed, to a manufacturing method for the optical device, and to a projector employing the optical device.

2. Description of Related Art

Conventionally, so-called three-panel projectors are known, which divide a light flux emitted from a light source into color light of the three primary colors of red, green, and blue, by a color separator optical system using dichroic mirrors and the like, and also modulate each color light with three light modulating devices using liquid crystal panels or the like according to image information, synthesize each color light following image modulation with a cross-dichroic prism, and make an enlarged projection of a color image through a projecting lens.

With such projectors, each light modulating device must always be at the back focus position of the projecting lens. Also, one display pixel is formed by additive color mixing of the three primary colors of red, green, and blue, and there is the need to prevent misalignment of pixels among the liquid crystal panels, and misalignment in the distance from the projecting lens, in order to obtain a clearer image. Focus adjustment for accurately disposing the light modulating devices at the back focus position of the projecting lens and alignment adjustment for aligning the pixels of the light modulating devices must be performed with high precision at the time of manufacturing the projector. At this time, with a predetermined optical axis (normally the optical axis of the projecting lens) as the Z axis and two axes orthogonal therewith as the X axis and Y axis, focus adjustment includes adjustment in the Z-axial direction, the rotational direction centered on the X axis (the Xθ direction), and the rotational direction centered on the Y axis (the Yθ direction). Also, alignment adjustment includes adjustment in the X-axial direction, Y-axial direction, and the rotational direction (θ direction) on the X-Y face.

Accordingly, conventionally, an optical device which is directly fixed to the light flux incident end face of the cross-dichroic prism following positional adjustment of the light modulating device has been performed.

With such optical devices, the mutual positions of the light modulating devices and the focus positions as to the projecting lens can be adjusted with high precision through the cross-dichroic prism. Accordingly, at the time of assembling an optical apparatus such as a projector, the trouble for adjustment can be markedly reduced in comparison with cases wherein the cross-dichroic prism and the three light modulating devices are individually adjusted for position and fixed in the apparatus.

As for a structure of an optical device wherein the cross-dichroic prism and the light modulating devices are integrated, there is an arrangement wherein, as described in Japanese Unexamined Patent Application Publication No. 2000-221588, for example, modulating devices are stored in a holding frame with holes formed in the four corners thereof, pins with an adhesive agent applied thereto are inserted through the holes, and the end face of the pins and light flux incident end face of the cross-dichroic prism, and the side face of the pins and the holes of the holding frame, are mutually fixed by adhesion (the so-called pin-spacer type POP (Panel On Prism) structure).

Also, as described in Japanese Unexamined Patent Application Publication No. 10-10994, for example, there is also an arrangement wherein the light modulating devices are stored in a holding frame, while the light flux incident end face of the cross-dichroic prism is attached to a frame-shaped attaching member, and further, a plate-shaped intermediate frame is fixed to this attaching member by screwing, with the holding frame and intermediate frame member being mutually fixed by adhesion through wedge-shaped spacers (the so-called triangular spacer POP structure).

SUMMARY OF THE INVENTION

However, all of the conventional POP structures have a great number of parts and the structure is complicated, because the light modulating devices are fixed by adhesion to the light flux incident end face of the cross-dichroic prism through pins, attaching members, and spacers. Thus, there is the problem that manufacturing is relatively difficult. Such problems may consequently obstruct reduction in size of the optical device and lead to increased manufacturing costs.

Also, all of the conventional POP structures fix the light modulating devices to the light flux incident end face of the cross-dichroic prism through pins, attaching members, and so forth, and it is necessary that the light flux incident end face of the prism have sufficient area in order to fix the light modulating devices. Accordingly, the cross-dichroic prisms cannot be miniaturized. Such problems may consequently obstruct reduction in size of the optical device and lead to increased manufacturing costs.

Further, with pin-spacer type POP structures, adhesive agent remains on the pins and the light flux incident end face of the cross-dichroic prism at the time of replacing the light modulating devices due to flaws in manufacturing or malfunctioning, so that it becomes necessary to remove the adhesive agent or to replace the prism itself. Such problems may consequently lead to increases in manufacturing costs and poorer after-sales service.

Moreover, with conventional POP structures, the position of the light modulating devices as to the light flux incident end face of the cross-dichroic prism is relatively decided through holding members and pins or spacers. Accordingly, there is the problem that positional adjustment of the light modulating devices is relatively difficult, and that the effects which positional misalignment of the pins and spacers have on the positional misalignment of the light modulating devices is great. Such problems may consequently lead to increased manufacturing costs, and poorer image quality.

Accordingly, it is an object of the present invention to provide an optical device, a manufacturing method for the optical device, and a projector, capable of solving at least one of the above problems.

A projector according to a first aspect of the present invention includes an optical device integrally provided with a plurality of light modulating devices for modulating a plurality of color lights for each color light according to image information, and a color synthesizing optical element for synthesizing each color light modulated at the light modulating devices. The optical device can include a holding frame for holding the light modulating devices, having an opening on a portion corresponding to an image formation region of the light modulating devices, a base fixed to at least one end of a pair of end faces intersecting with a light flux incident end face of the color synthesizing optical element, and a holding member disposed between the holding frame and a side face of the base. The light modulating devices can be fixed to the side face of the base by the holding frame and the holding member.

The optical device according to the first aspect of the present invention can include the following operations and advantages. Pins and spacers configured as independent parts are not used unlike the conventional POP structures, so that the number of parts is small. Also, the structure is simple, and it is easy to manufacture. Accordingly, this can contribute to reduction in size of optical devices and optical apparatus employing this, and to reduction in manufacturing costs.

Further, the light modulating devices are not fixed to the light flux incident end face of the color synthesizing optical element unlike the conventional POP structures, and are fixed to the side face of a base fixed to an end face intersecting with the light flux incident end face of the color synthesizing optical element, so that space for fixing the light modulating devices to the light flux incident end face of the color synthesizing optical element becomes unnecessary. Accordingly, the size of the color synthesizing optical element can be reduced, and consequently, reduction in size of an optical device and an optical apparatus employing this, and reduction in manufacturing costs, can be achieved.

Also, the positions of the light modulating devices are not defined by the light flux incident end face of the color synthesizing optical element but rather defined by the base side face. Accordingly, the size of the color synthesizing optical element can be reduced. Thus, reduction in size of an optical device and an optical apparatus employing this, and reduction in manufacturing costs, can be achieved. Further, in the event of employing this optical device in a projector, the back-focus of the projecting lens can be shortened, so that a greater amount of light can be taken in by the projecting lens, thereby allowing a bright projected image to be obtained.

Further, the light modulating devices are not fixed to the light flux incident end face of the color synthesizing optical element but are fixed to the side face of a base fixed to an end face intersecting with the light flux incident end face of the color synthesizing optical element, so that the light flux incident end face of the color synthesizing optical element is not scratched by removing the light modulating devices in the event that replacing the light modulating devices becomes necessary at the time of manufacturing or following manufacturing. Also, even in the event that the light modulating devices and the color synthesizing optical element are fixed by adhesion, there is no need to scrape off adhesive agent adhering to the light flux incident end face of the color synthesizing optical element following removing the light modulating devices. Accordingly, this can contribute to reduction in manufacturing costs of the optical device and an optical apparatus employing this, and to improved after-sales service.

Moreover, the position of the light modulating devices is determined only by the positional relation between the holding member and base, without pins or spacers introduced therein, so that positional adjustment of the light modulating devices is easy, and the positional misalignment of the light modulating devices following positional adjustment can be reduced. Accordingly, this can contribute to reduction in manufacturing costs of the optical device and projector employing this, and to improved image quality.

Note that "fixed to the base side face" can mean that the holding member is fixed to the base side face without position adjusting members such as spacers or pins being introduced therein. Accordingly, cases wherein a sapphire substrate or metal plate or the like for improving thermal dissipation is introduced between the base side face and holding member are also encompassed by the first aspect of the present invention.

With the first aspect of the present invention, preferably, holes are formed in at least two places of the holding frame, and the holding member comprises a rectangular plate-shaped member with an opening formed at a position corresponding to the opening of the holding frame, and pins to be inserted into the holes in the four corners of the holding frame, provided protruding from the rectangular plate-shaped member. With such a configuration, pins for fixing the holding frame to the holding member are provided, so that the number of parts is fewer in comparison with the conventional POP structures, and also, the structure is simple, and manufacturing is easy.

Also, the holding member may be configured of a material having light transmittance. A light-transmissive resin such as acrylic material or the like, for example, can be given as such a material. Thus, with the holding member formed of a light-transmissive material, using a photo-curing adhesive agent to fix the holding frame and the holding member, and the holding member and the base, enables these to be fixed easily. Accordingly, this can improve manufacturing efficiency of the optical device and an optical apparatus employing this. Also, in the event that the holding member is formed of a resin such as acrylic material, polycarbonate containing carbon filler, polyphenylene sulfide, liquid crystal resin, or the like, the holding member can be easily manufactured by injection molding or the like, thus leading to marked reductions in costs. Also, the weight of the holding member can be reduced, thus promoting reduction in weight of the optical device and of the optical apparatus employing this.

On the other hand, the holding member may be configured of metal. As for such material, aluminum, magnesium, titanium, or alloys with these as primary materials, which are light in weight and have excellent thermal conductivity, can be given as examples. In the event of configuring the holding member of metal, the pins preferably have forms that the tip side is narrower than the base side thereof. Forming the pins thus allow the adhesive agent to be hardened in a short time even in the event of using photo-curing adhesive agent for fixing the holding frame and holding member, by irradiating light from the base side of the pin. Accordingly, the manufacturing efficiency of the optical device and the optical apparatus employing this can be improved. Also, in the event of configuring the holding member with metal, the holding frame and holding member are preferably fixed by a thermal-curing adhesive agent. Using a thermal-curing adhesive agent allows the adhesive agent to be hardened in a short time by the excellent thermal conductivity of the metal. Accordingly, the manufacturing efficiency of the optical device and the optical apparatus employing this can be improved.

Further, forming a notch for hot behavioral difference absorption on the rectangular plate-shaped member making up the holding member alleviates deformation of the external form of the holding member even in the event that thermal stress due to heat generated at the optical device is applied to the holding member. Accordingly, the positional misalignment of the light modulating devices due to heat can be avoided. Particularly, in the event that this optical device is used in a projector, the position of the light modulating devices following positional adjustment can be held at a suitable state, so that pixel misalignment of the projected image can be avoided, and high-quality images can be obtained.

With the optical device according to the first aspect of the present invention, the holding member preferably comprises a rectangular plate-shaped member with an opening formed at a position corresponding to the opening of the holding frame, and erected pieces with a general L-shape when viewed from the front, which are positioned at the corner portions of the rectangular plate-shaped member and provided in a protruding condition along the edge of the rectangular plate-shaped member, and hold the perimeter of the holding frame. With such a configuration, an erected piece for holding the holding frame is provided to the holding member, so that the number of parts is fewer in comparison with the conventional POP structures, and also, the structure is simple and manufacturing is easy. At this time, providing in a protruding condition the erected piece at the four corners of the rectangular plate-shaped member of the holding member alleviates effects of external force, so stable holding can be carried out.

On the other hand, providing the erected piece along at a pair of mutually parallel sides of the rectangular plate-shaped member, with generally the same length as the sides of the rectangular plate-shaped member, allows light leaking out from between the holding member and the light modulating devices to be shielded. Accordingly, in the event that this optical device is used with a projector, the light leaking within the optical devices can be prevented from being taken into the projecting lens which would cause deterioration of contrast of the projected image or fuzzy images, so images with high quality can be obtained.

Also, at this time, the holding member may be configured of a material having light transmittance. A light-transmissive resin such as acrylic material or the like, for example, can be given as such a material. Thus, with the holding member formed of a light-transmissive material, using a photo-curing adhesive agent to fix the holding frame and the holding member, and the holding member and the base, enables these to be fixed easily. Accordingly, the manufacturing efficiency of the optical device and the optical apparatus employing this can be improved. Also, in the event that the holding member is formed of a resin such as acrylic material, polycarbonate containing carbon filler, polyphenylene sulfide, liquid crystal resin, or the like, the holding member can be easily manufactured by injection molding or the like, thus leading to marked reductions in costs. Also, the weight of the holding member can be reduced, thus promoting reduction in weight of the optical device and of the optical apparatus employing this.

On the other hand, the holding member may be configured of metal. As for such material, aluminum, magnesium, titanium, or alloys with these as primary materials, which are light in weight and have excellent thermal conductivity, can be given as examples.

In the event of configuring holding members having such a form out of metal, manufacturing can be easily performed by sheet metal processing, thus leading to reductions in costs. Also, in the event of configuring the holding member of metal, the holding frame and the holding member are preferably fixed by a thermal-curing adhesive agent. Using a thermal-curing adhesive agent allows the adhesive agent to be hardened in a short time by the excellent thermal conductivity of the metal. Accordingly, the manufacturing efficiency of the optical device and the optical apparatus employing this can be improved.

Further, forming a notch for hot behavioral difference absorption on the rectangular plate-shaped member making up the holding member alleviates deformation of the external form of the holding member even in the event that thermal stress due to heat generated at the optical device is applied to the holding member. Accordingly, the positional misalignment of the light modulating devices due to heat can be avoided. Particularly, in the event that this optical device is used in a projector, the position of the light modulating devices can be held at a suitable state, so pixel misalignment of the projected image can be avoided, and high-quality images can be obtained.

With the optical device according to the first aspect of the present invention, the holding member preferably comprises an engaging groove to be engaged with a plate-shaped optical element. Thus providing a structure for holding the plate-shaped optical element to the holding member does not require a fixing mechanism for disposing the plate-shaped optical element between the light modulating device and color synthesizing optical element, thereby promoting reduction in costs, and reduction in size and weight of the optical device and the optical equipment employing this. As for such plate-shaped optical elements, polarizing plates, phase difference plates, optically-compensating plates, and so forth, can be given.

Also, with the optical device according to the first aspect of the present invention, the holding member preferably comprises a supporting face for fixing an optical element. Thus providing a structure for supporting the optical element to the holding member does not require a fixing mechanism for disposing the optical element between the light modulating device and color synthesizing optical element, thereby promoting reduction in costs, and reduction in size and weight of the optical device and the optical apparatus employing this.

Further, the optical device according to the first aspect of the present invention is preferably configured such that a first supporting face for fixing a first optical element and a second supporting face for fixing a second optical element are formed on the holding member, and the first supporting face and the second supporting face are configured so that the out-of-plane directional positions differ from one another. Thus providing a structure for the holding member to support a plurality of optical elements at different positions promotes reduction in costs, and reduction in size and weight of the optical device and the optical apparatus employing this. Also, as for optical elements fixed on the supporting face, polarizing plates, phase difference plates, optically-compensating plates, condenser lenses, and so forth, can be given.

With the optical device according to the first aspect of the present invention, the base can be fixed to both of a pair of end faces intersecting with a light flux incident end face of the color synthesizing optical element. At this time, forming a recessed portion at a portion of an end face of the base where the holding member is fixed by adhesion enables the light modulating device to be readily removed in the event that replacing the light modulating devices becomes necessary at the time of manufacturing or following manufacturing. In other words, a tool such as a screwdriver or the like can be inserted into the recessed portion formed on the base side face, so that the work of peeling the holding member and the color synthesizing optical element away from one another is facilitated. Accordingly, this can contribute to further reduction in manufacturing costs of the optical device and an optical apparatus employing this, and to further improvement in after-sales service.

Also, at this time, the side face of the base preferably protrudes out farther than a light flux incident end face of the color synthesizing optical element. With such a configuration, even in the event that adhesive agent overflows the face of junction in fixing the holding member and the base side face with adhesive agent, the overflowing adhesive agent can be received at this protrusion. Accordingly, the adhesive agent can be prevented from leaking out onto the light flux incident end face of the color synthesizing optical element. Thus, in the event of employing this optical element in an optical apparatus such as a projector or the like, this can contribute to further improvement in image quality.

With the optical device according to the first aspect of the present invention, an arrangement may be made wherein the base is fixed to only one of a pair of end faces intersecting with a light flux incident end face of the color synthesizing optical element, and a linking member for linking the holding members facing one another is provided near the other of the end faces. In the case of such a configuration, integrally forming at least two of the base, the holding member, and the linking member, allows further simplification of the structure and reduction in manufacturing steps. Thus, this can contribute to further reduction in size of the optical device and optical apparatus employing this, and further reduction in manufacturing costs. Also, in this case, approximating the thermal expansion coefficients of the integrally formed article and the color synthesizing optical apparatus assembled thereto acts to suppress warping due to heat. Accordingly, the position of the light modulating device can be held in a suitable state, so that pixel misalignment of the projected image can be avoided, and high-quality images can be obtained.

With the optical device according to the first aspect of the present invention, preferably, optical parts are attached to an optical parts housing and an attachment portion to be fixed to the optical parts housing is formed on at least one side of the base. Thus providing the attachment portion to the optical parts housing on the base allows the space around the optical device to be reduced. Accordingly, reduction in size and weight of the optical apparatus employing the optical device can be further promoted.

With the optical device according to the first aspect of the present invention, the holding frame preferably comprises a recessed frame member for storing the light modulating devices, and a supporting plate for pressing and fixing stored light modulating devices. With such a configuration for the holding frame, storage and fixing of the light modulating devices can be readily carried out, as well as stable holding and fixing of the light modulating devices. Also, the light modulating devices preferably comprise a pair of substrates, and a light-transmissive dust-proof plate fixed to at least one of the pair of substrates. In the event of employing the optical device in a projector, providing such a light-transmissive dust-proof plate can make any dust adhering to the surface of the light modulating devices to be less conspicuous on the projected screen. Accordingly, this can contribute to further improvement in image quality.

A according to a second aspect of the present invention includes an optical device integrally provided with a plurality of light modulating devices for modulating a plurality of color lights for each color light according to image information, and a color synthesizing optical element for synthesizing each color light modulated at the light modulating devices. The optical device can include a holding frame for holding the light modulating devices, having an opening on a portion corresponding to an image formation region of the light modulating devices, and a holding member directly fixed to a light flux incident end face of the color synthesizing optical element, wherein the holding frame is directly fixed to the holding member.

The optical device according to the second aspect of the present invention can include the following operations and advantages.

Pins and spacers configured as independent parts are not used unlike conventional POP structures, so that the number of parts is small. Also, the structure is simple and it is easy to manufacture. Accordingly, this can contribute to reduction in size of optical devices and an optical apparatus employing this, and to reduction in manufacturing costs.

Moreover, the position of the light modulating devices is determined only by the positional relation between the holding member and the light incident end face of the color synthesizing optical element, without pins or spacers introduced therein, so that positional adjustment of the light modulating devices is easy, and the positional misalignment of the light modulating devices following positional adjustment can be reduced. Accordingly, this can contribute to reduction in manufacturing costs of the optical device and a projector employing this, and to improved image quality.

Note that "directly fixed to" can mean that the members are fixed one to another without position adjusting members such as spacers or pins being introduced therebetween. Accordingly, cases wherein a sapphire substrate or metal plate or the like for improving thermal dissipation is introduced therebetween are also encompassed by the second aspect of the present invention.

With the optical device according to the second aspect of the present invention, preferably, holes are formed in at least two places of the holding frame, and the holding member comprises a rectangular plate-shaped member with an opening formed at a position corresponding to the opening of the holding frame, and pins to be inserted into the holes in the holding frame, provided protruding from the rectangular plate-shaped member. With such a configuration, pins for fixing the holding frame to the holding member are provided, so that the number of parts is fewer in comparison with the conventional POP structures, and also, the structure is simple, and manufacturing is easy.

Also, at this time, the holding member may be configured of a material having light transmittance. A light-transmissive resin such as acrylic material or the like can be given as an example of such a material. Thus, with the holding member formed of a light-transmissive material, using a photo-curing adhesive agent to fix the holding frame and the holding member, and the holding member and the light incident end face of the color synthesizing optical element, enables these to be fixed easily, thereby improving efficiency in manufacturing the optical device and thus an optical apparatus employing the optical device.

Also, in the event that the holding member is formed of a resin, such as acrylic material, polycarbonate containing carbon filler, polyphenylene sulfide, liquid crystal resin, or the like, the holding member can be easily manufactured by injection molding or the like, thus leading to marked reductions in costs. Also, the weight of the holding member can be reduced, thus promoting reduction in weight of the optical device and of the optical apparatus employing this.

On the other hand, the holding member may be configured of metal. As for such material, aluminum, magnesium, titanium, or alloys with these as primary materials, which are light in weight and have excellent thermal conductivity, can be given as examples.

In the event of configuring the holding member of metal, the pins preferably have forms that the tip side is narrower than the base side thereof. Forming the pins thus allows the adhesive agent to be hardened in a short time even in the event of using photo-curing adhesive agent for fixing the holding frame and holding member, by irradiating light from the base side of the pin. Accordingly, the manufacturing efficiency of the optical device and the optical apparatus employing this can be improved.

Also, in the event of configuring the holding member with metal, the holding frame and holding member are preferably fixed by a thermal-curing adhesive agent. Using a thermal-curing adhesive agent allows the adhesive agent to be hardened in a short time by the excellent thermal conductivity of the metal. Accordingly, the manufacturing efficiency of the optical device and the optical apparatus employing this can be improved.

Further, forming a notch for hot behavioral difference absorption on the rectangular plate-shaped member making up the holding member alleviates deformation of the external form of the holding member to be alleviated even in the event that thermal stress due to heat generated at the optical device is applied to the holding member. Accordingly, the positional misalignment of the light modulating devices due to heat can be avoided. Particularly, in the event that this optical device is used in a projector, the position of the light modulating devices following positional adjustment can be held at a suitable state, so that pixel misalignment of the projected image can be avoided, and high-quality images can be obtained.

With the optical device according to the second aspect of the present invention, the holding member preferably comprises a rectangular plate-shaped member with an opening formed at a position corresponding to the opening of the holding frame, and erected pieces with a general L-shape when viewed from the front, which are positioned at the corner portions of the rectangular plate-shaped member and provided in a protruding condition along the edge of the rectangular plate-shaped member, and hold the perimeter of the holding frame. With such a configuration, an erected piece for holding the holding frame is provided to the holding member, so that the number of parts is fewer in comparison with the conventional POP structures, and also, the structure is simple and manufacturing is easy.

At this time, providing in a protruding condition the erected piece at the four corners of the rectangular plate-shaped member of the holding member alleviates effects of external force, so that stable holding can be carried out.

On the other hand, providing the erected piece along at a pair of mutually parallel sides of the rectangular plate-shaped member, with generally the same length as the sides of the rectangular plate-shaped member, shields light leaking out from between the holding member and the light modulating devices to be shielded. Accordingly, in the event that this optical device is used with a projector, the light leaking within the optical devices can be prevented from being taken into the projecting lens which would cause deterioration of contrast of the projected image or fuzzy images, so that high quality images can be obtained.

Also, at this time, the holding member may be configured of a material having light transmittance. A light-transmissive resin such as acrylic material or the like can be given as an example for such a material. Thus, with the holding member formed of a light-transmissive material, using a photocuring adhesive agent to fix the holding frame and the holding member, and the holding member and the light incident end face of the color synthesizing optical element, enables these to be fixed easily. Accordingly, the manufacturing efficiency of the optical device and the optical apparatus employing this can be improved.

Also, in the event that the holding member is formed of a resin, such as acrylic material, polycarbonate containing carbon filler, polyphenylene sulfide, liquid crystal resin, or the like, the holding member can be easily manufactured by injection molding or the like, thus leading to marked reductions in costs. Also, the weight of the holding member can be reduced, thus promoting reduction in weight of the optical device and of the optical apparatus employing this.

On the other hand, the holding member may be configured of metal. As for such material, aluminum, magnesium, titanium, or alloys with these as primary materials, which are light in weight and have excellent thermal conductivity, can be given as examples. In the event of configuring holding members having such a form out of metal, manufacturing can be easily performed by sheet metal processing, thus leading to reductions in costs.

Also, in the event of configuring the holding member of metal, the holding frame and the holding member are preferably fixed by a thermal-curing adhesive agent. Using a thermal-curing adhesive agent allows the adhesive agent to be hardened in a short time by the excellent thermal conductivity of the metal. Accordingly, the manufacturing efficiency of the optical device and the optical apparatus employing this can be improved.

Further, forming a notch for hot behavioral difference absorption on the rectangular plate-shaped member making up the holding member alleviates deformation of the external form of the holding member to be alleviated even in the event that thermal stress due to heat generated at the optical device is applied to the holding member. Accordingly, the positional misalignment of the light modulating devices due to heat can be avoided. Particularly, in the event that this optical device is used in a projector, the position of the light modulating devices can be held at a suitable state, so that pixel misalignment of the projected image can be avoided, and high-quality images can be obtained.

With the optical device according to the second aspect of the present invention, the holding member preferably can include an engaging groove to be engaged with a plate-shaped optical element. Thus providing a structure for holding the plate-shaped optical element to the holding member does not require a fixing mechanism for disposing the plate-shaped optical element between the light modulating device and color synthesizing optical element, thereby promoting reduction in costs, and reduction in size and weight of the optical device and the optical apparatus employing this. As for such plate-shaped optical elements, polarizing plates, phase difference plates, optically-compensating plates, and so forth, can be given.

Also, with the optical device according to the second aspect of the present invention, the holding member preferably comprises a supporting face for fixing an optical element. Thus providing a structure for supporting the optical element to the holding member does not require a fixing mechanism for disposing the optical element between the light modulating device and color synthesizing optical element, thereby promoting reduction in costs, and reduction in size and weight of the optical device and the optical apparatus employing this.

Further, the optical device according to the second aspect of the present invention is preferably configured such that a first supporting face for fixing a first optical element and a second supporting face for fixing a second optical element are formed on the holding member, and the first supporting face and the second supporting face are configured so that the out-of-plane directional positions differ from one another. Thus, providing a structure for the holding member to support a plurality of optical elements promotes reduction in costs, and reduction in size and weight of the optical device and the optical apparatus employing this. Also, as for optical elements fixed on the supporting face, polarizing plates, phase difference plates, optically-compensating plates, condenser lenses, and so forth, can be given.

With the optical device according to the second aspect of the present invention, the holding member preferably can include a protruding portion at a face of contact with the color synthesizing optical element, with a partial gap formed between the color synthesizing optical element and the holding member by the color synthesizing optical element and the protruding portion. Such a configuration enables the light modulating device to be readily removed in the event that replacing the light modulating devices becomes necessary at the time of manufacturing or following manufacturing, using the gap formed between the color synthesizing optical element and the holding member. That is, a tool such as a screwdriver or the like can be inserted into the gap, so that the work of peeling the holding member and the color synthesizing optical element away from one another is facilitated. Accordingly, this can contribute to further reduction in manufacturing costs of the optical device and optical apparatus employing this, and to further improvement in after-sales service. Also, this gap forms an air path for cooling the light modulating devices and the optical elements such as the polarizing plate and the like disposed in the vicinity thereof, so that deterioration of the light modulating devices and the optical elements disposed in the vicinity thereof due to heat can be prevented, thereby contributing to improved image quality.

The optical device according to the second aspect of the present invention preferably can include a base fixed to at least one of a pair of end faces intersecting with a light flux incident end face of the color synthesizing optical element. The optical device can be attached to an optical parts housing disposed by the base, following a predetermined optical axis. An attachment portion to be fixed to the optical parts housing can be formed on the base. Thus, providing the attachment portion to the optical parts housing on the base allows the space around the optical device to be reduced. Accordingly, reduction in size and weight of the optical apparatus employing the optical device can be further promoted.

With the optical device according to the second aspect of the present invention, the holding frame preferably can include a recessed frame member for storing the light modulating devices, and a supporting plate for pressing and fixing stored light modulating devices. With such a configuration for the holding frame, storage and fixing of the light modulating devices can be readily carried out, as well as stable holding and fixing of the light modulating devices. Also, the light modulating devices preferably comprise a pair of substrates, and a light-transmissive dust-proof plate fixed to at least one of the pair of substrates. In the event of employing the optical device in a projector, providing such a light-transmissive dust-proof plate can make any dust adhering to the surface of the light modulating devices be less conspicuous on the projected screen. Accordingly, this can contribute to further improvement in image quality.

A projector according to a third aspect of the present invention includes an optical device integrally provided with a plurality of light modulating devices for modulating a plurality of color lights for each color light according to image information, and a color synthesizing optical clement for synthesizing each color light modulated at the light modulating devices. The optical device can include a holding frame for holding the light modulating devices, having an opening on a portion corresponding to an image formation region of the light modulating devices; a holding member directly fixed to a light flux incident end face of the color synthesizing optical element, having an erected piece formed so as to cover the side edge of the holding frame, and a supporting piece for supporting the face of the holding frame at the side of the color synthesizing optical element and spacers disposed between the holding frame and the erected piece of the holding member. The holding frame can be fixed to the holding member by the spacers.

With the optical device according to the third aspect of the present invention, the light flux incident end face of the color synthesizing optical element and the face of the holding member are fixed without position adjusting members such as pins or spacers introduced therebetween. That is to say, while the position of the light modulating devices are relatively fixed to the light flux incident end face of the color synthesizing optical element through spacers, no spacers exist between the holding member and the light flux incident end face of the color synthesizing optical element. Moreover, the spacers are disposed between the erected piece of the holding member formed so as to cover the side of the light modulating devices, and the holding frame for holding the light modulating devices. Accordingly, positional adjustment of the light modulating devices is easy, and the effects which positional misalignment of the spacers have on the positional misalignment of the light modulating devices following positional adjustment are relatively small. Accordingly, this can contribute to reductions in manufacturing costs and improve image quality of the optical device and the projector employing this.

Note that "directly fixed to" can mean that the members are fixed one to another without position adjusting members such as spacers or pins being introduced therebetween. Accordingly, cases wherein a sapphire substrate or metal plate or the like for improving thermal dissipation is introduced therebetween are also encompassed by the third aspect of the present invention.

With the optical device according to the third aspect of the present invention, the holding frame preferably can include a recessed frame member for storing the light modulating devices, and a supporting plate for pressing and fixing stored light modulating devices. With such a configuration for the holding frame, storage and fixing of the light modulating devices can be readily carried out, as well as stable holding and fixing of the light modulating devices.

On the other hand, with the optical device according to the third aspect of the present invention, the holding frame may be configured of a supporting member for supporting the light incident side of the light modulating device, with the light emitting side of the light modulating device being held by the holding member. Such a configuration enables simplification of the structure, and manufacturing also becomes easier. Accordingly, this can contribute to reduction in size of the optical device and optical apparatus employing this, and reduction in manufacturing costs thereof.

Also, at this time, providing the spacers between the light emitting face of the light modulating device and the face of the holding member at the side of the light modulating device enables adjusting of the position in the Z-axial direction of the light modulating device, and of the position in the rotational direction as to the X-axis and Y-axis.

With the optical device according to the third aspect of the present invention, the holding member may be configured of a material having light transmittance. A light-transmissive resin such as acrylic material or the likecan be given as an example for such a material. Thus, with the holding member formed of a light-transmissive material, using a photo-curing adhesive agent to fix the holding frame and the holding member, and the holding member and the light incident end face of the color synthesizing optical element, enables these to be fixed easily. Accordingly, the manufacturing efficiency of the optical device and the optical apparatus employing this can be improved.

Also, in the event that the holding member is formed of a resin, such as acrylic material, polycarbonate containing carbon filler, polyphenylene sulfide, liquid crystal resin, or the like, the holding member can be easily manufactured by injection molding or the like, thus leading to marked reductions in costs. Also, the weight of the holding member can be reduced, thus promoting reduction in weight of the optical device and of the optical apparatus employing this.

On the other hand, the holding member may be configured of metal. As for such material, aluminum, magnesium, titanium, or alloys with these as primary materials, which are light in weight and have excellent thermal conductivity, can be given as examples.

In the event of configuring the holding member of metal, the holding frame and the holding member are preferably fixed by a thermal-curing adhesive agent. Using a thermal-curing adhesive agent allows the adhesive agent to be hardened in a short time by the excellent thermal conductivity of the metal. Accordingly, the manufacturing efficiency of the optical device and the optical apparatus employing this can be improved.

With the optical device according to the third aspect of the present invention, the holding member preferably can include a protruding portion at a face of contact with the color synthesizing optical element, with a partial gap formed between the color synthesizing optical element and the holding member by the color synthesizing optical element and the protruding portion. Such a configuration enables the light modulating device to be readily removed in the event that replacing the light modulating devices becomes necessary at the time of manufacturing or following manufacturing, using the gap formed between the color synthesizing optical element and the holding member. In other words, a tool such as a screwdriver or the like can be inserted into the gap, so that the work of peeling the holding member and the color synthesizing optical element away from one another is facilitated. Accordingly, this can contribute to further reduction in manufacturing costs of the optical device and an optical apparatus employing this, and to further improvement in after-sales service. Also, this gap forms an air path for cooling the light modulating devices and the optical elements such as the polarizing plate and the like disposed in the vicinity thereof, so that deterioration of the light modulating devices or the optical elements disposed in the vicinity thereof due to heat can be prevented, thereby contributing to improved image quality.

The optical device according to the third aspect of the present invention preferably can include a base fixed to at least one of a pair of end faces intersecting with a light flux incident end face of the color synthesizing optical element. The optical device can be attached to an optical parts housing by the base, following a predetermined optical axis, and an attachment portion to be fixed to the optical parts housing can be formed on the base. Thus providing the attachment portion to the optical parts housing on the base allows the space around the optical device to be reduced. Accordingly, reduction in size and weight of the optical apparatus employing the optical device can be further promoted.

With the optical device according to the third aspect of the present invention, the light modulating devices can preferably includes a pair of substrates, and a light-transmissive dust-proof plate fixed to at least one of the pair of substrates. In the event of employing the optical device in a projector, providing such a light-transmissive dust-proof plate can make any dust adhering to the surface of the light modulating devices be less conspicuous on the projected screen. Accordingly, this can contribute to further improvement in image quality.

A projector according to a fourth aspect of the present invention includes an optical device integrally provided with a plurality of light modulating devices for modulating a plurality of color lights for each color light according to image information, and a color synthesizing optical element for synthesizing each color light modulated at the light modulating devices. The optical device can include a holding frame for holding the light modulating devices, having an opening on a portion corresponding to an image formation region of the light modulating devices, a base fixed to at least one of a pair of end faces intersecting with a light flux incident end face of the color synthesizing optical element, a holding member directly fixed to the base, having an erected piece formed so as to cover the side edge of the holding frame, and a supporting piece for supporting the face of the holding frame at the side of the color synthesizing optical element, and spacers disposed between the holding frame and the erected piece of the holding member. The holding frame can be fixed to the holding member by the spacers.

The optical device according to the fourth aspect of the present invention can have the following operations and advantages.

The light modulating devices are not fixed to the light flux incident end face of the color synthesizing optical element unlike conventional POP structures, and are fixed to the side face of a base fixed to an end face intersecting with the light flux incident end face of the color synthesizing optical element, so that space for fixing the light modulating devices to the light flux incident end face of the color synthesizing optical element becomes unnecessary. Accordingly, the size of the color synthesizing optical element can be reduced, and consequently, reduction in size of optical devices and an optical apparatus employing this, and reduction in manufacturing costs, can be achieved.

Also, the positions of the light modulating devices are not stipulated by the light flux incident end face of the color synthesizing optical element but rather stipulated by the base side face. Accordingly, the size of the color synthesizing optical element can be reduced. Thus, reduction in size of optical devices and an optical apparatus employing this, and reduction in manufacturing costs, can be achieved. Further, in the event of employing this optical device in a projector, the back-focus of the projecting lens can be shortened, so a greater amount of light can be taken in by the projecting lens, thereby allowing a bright projected image to be obtained.

Further, the light modulating devices are not fixed to the light flux incident end face of the color synthesizing optical element but are fixed to the side face of a base fixed to an end face intersecting with the light flux incident end face of the color synthesizing optical element, so that the light flux incident end face of the color synthesizing optical element is not scratched by removing the light modulating devices in the event that replacing the light modulating devices becomes necessary at the time of manufacturing or following manufacturing. Also, even in the event that the light modulating devices and the color synthesizing optical element are fixed by adhesion, there is no need to scrape off adhesive agent adhering to the light flux incident end face of the color synthesizing optical element following removing of the light modulating devices. Accordingly, this can contribute to reduction in manufacturing costs of the optical device and an optical apparatus employing this, and to improved after-sales service.

Further yet, the side face of the base and the face of the holding member are fixed without position adjusting members such as pins or spacers introduced therebetween. While the position of the light modulating devices are relatively fixed to the side face of the base through spacers, no spacers exist between the holding member and the light flux incident end face of the color synthesizing optical element. Moreover, the spacers are disposed between an erected piece of the holding member formed so as to cover the side edge of the light modulating device, and a holding frame for holding the light modulating device. Accordingly, positional adjustment of the light modulating devices is easy, and the effects which positional misalignment of the spacers have on the positional misalignment of the light modulating devices following positional adjustment are relatively small. Accordingly, this can contribute to reductions in manufacturing costs and improve image quality of the optical device and the projector employing this.

Note that "fixed directly to the base side face" can mean that the holding member is fixed to the base side face without position adjusting members such as spacers or pins being introduced therein. Accordingly, cases wherein a sapphire substrate or metal plate or the like for improving thermal dissipation is introduced between the base side face and holding member are also encompassed by the fourth aspect of the present invention.

With the optical device according to the fourth aspect of the present invention, the holding frame preferably comprises a recessed frame member for storing the light modulating devices, and a supporting plate for pressing and fixing stored light modulating devices. With such a configuration for the holding frame, storage and fixing of the light modulating devices can be readily carried out, as well as stable holding and fixing of the light modulating devices.

On the other hand, with the optical device according to the fourth aspect of the present invention, the holding frame may be configured of a supporting member for supporting the light incident side of the light modulating device, with the light emitting side of the light modulating device being held by the holding member. Such a configuration enables simplification of the structure, and manufacturing also becomes easier. Accordingly, this can contribute to reduction in size of the optical device and an optical apparatus employing this, and to reduction in manufacturing costs thereof.

Also, at this time, providing the spacers between the light emitting face of the light modulating device and the face of the holding member at the side of the light modulating device enables adjusting of the position in the Z-axial direction of the light modulating device, and of the position in the rotational direction as to the X-axis and Y-axis.

With the optical device according to the fourth aspect of the present invention, the holding member may be configured of a material having light transmittance. A light-transmissive resin, such as acrylic material or the like can be given as an example for such a material. Thus, with the holding member formed of a light-transmissive material, using a photo-curing adhesive agent to fix the holding frame and the holding member, and the holding member and the base, enables these to be fixed easily. Accordingly, the manufacturing efficiency of the optical device and the optical apparatus employing this can be improved.

Also, in the event that the holding member is formed of a resin, such as acrylic material, polycarbonate containing carbon filler, polyphenylene sulfide, liquid crystal resin, or the like, the holding member can be easily manufactured by injection molding or the like, thus leading to marked reductions in costs. Also, the weight of the holding member can be reduced, thus promoting reduction in weight of the optical device and of the optical apparatus employing this.

On the other hand, the holding member may be configured of metal. As for such material, aluminum, magnesium, titanium, or alloys with these as primary materials, which are light in weight and have excellent thermal conductivity, can be given as examples.

Also, in the event of configuring the holding member of metal, the holding frame and the holding member are preferably fixed by a thermal-curing adhesive agent. Using a thermal-curing adhesive agent allows the adhesive agent to be hardened in a short time by the excellent thermal conductivity of the metal. Accordingly, the manufacturing efficiency of the optical device and the optical apparatus employing this can be improved.

With the optical device according to the fourth aspect of the present invention, the base may be fixed to both of a pair of end faces intersecting with a light flux incident end face of the color synthesizing optical element.

At this time, forming a recessed portion at a portion of an end face where the holding member is fixed by adhesion enables the light modulating device to be readily removed in the event that replacing the light modulating devices becomes necessary at the time of manufacturing or following manufacturing. In other words, a tool such as a screwdriver or the like can be inserted into the recessed portion formed on the base side face, so the work of peeling the holding member and the color synthesizing optical element away from one another is facilitated. Accordingly, this can contribute to further reduction in manufacturing costs of the optical device and optical apparatus employing this, and to further improvement in after-sales service.

Also, at this time, the side face of the base preferably protrudes out farther than a light flux incident end face of the color synthesizing optical element. With such a configuration, even in the event that adhesive agent overflows the face of junction in fixing the holding member and the base side face with adhesive agent, the overflowing adhesive agent can be received at this protrusion. Accordingly, the adhesive agent can be prevented from leaking out onto the light flux incident end face of the color synthesizing optical element. Thus, in the event of employing this optical element in an optical apparatus such as a projector or the like, this can contribute to further improvement in image quality.

With the optical device according to the fourth aspect of the present invention, the base may be fixed to only one of a pair of end faces intersecting with a light flux incident end face of the color synthesizing optical element, with a linking member for linking the holding members facing one another being provided near the other of the end faces. In the event of such a configuration, integrally forming at least two of the base, the holding member, and the linking member, enables further simplification of the structure and shortening of the manufacturing steps. Thus, this can contribute to further reduction in size of the optical device and an optical apparatus employing this, and further reduction in manufacturing costs. Also, in this case, approximating the thermal expansion coefficients of the integrally formed article and the color synthesizing optical element assembled thereto suppresses warping due to heat. Accordingly, the position of the light modulating device can be held in a suitable state, so that pixel misalignment of the projected image can be avoided, and high-quality images can be obtained.

With the optical device according to the fourth aspect of the present invention, preferably, optical parts making up an optical apparatus are attached to an optical parts housing disposed following a predetermined optical axis, and an attachment portion fixed to the optical parts housing is formed on at least one side of the base. Thus, providing the attachment portion to the optical parts housing on the base allows the space around the optical device to be reduced. Accordingly, reduction in size and weight of the optical apparatus employing the optical device can be further promoted.

With the optical device according to the fourth aspect of the present invention, the light modulating devices preferably comprise a pair of substrates, and a light-transmissive dust-proof plate fixed to at least one of the pair of substrates. In the event of employing the optical device in a projector, providing such a light-transmissive dust-proof plate can make any dust adhering to the surface of the light modulating devices be less conspicuous on the projected screen. Accordingly, this can contribute to further improvement in image quality.

A first optical device manufacturing method according to the present invention is a manufacturing method for an optical device integrally provided with a plurality of light modulating devices for modulating a plurality of color lights for each color light according to image information, and a color synthesizing optical element for synthesizing each color light modulated at the light modulating devices. The method can include a base fixing step for fixing a base to at least one end face of a pair of end faces intersecting with a light flux incident end face of the color synthesizing optical element, a step for mounting the plurality of light modulating devices each to a holding frame, a holding frame mounting step for attaching the holding frame to a holding member using an adhesive agent, a holding member mounting step for attaching the holding member to the base side face using an adhesive agent, a position adjusting step for adjusting the position of the plurality of light modulating devices in the state that the adhesive agent is unhardened, and an adhesive agent hardening step for hardening the adhesive agent following the position adjusting step. In the position adjusting step, with a predetermined optical axis as a Z axis and two axes orthogonally intersecting the Z axis as an X axis and Y axis, adjustment in the Z-axial direction and rotational direction centered on the X axis and Y axis can be performed between the holding frame and the holding member. Adjustment in the X-axial direction, Y-axial direction and rotational adjustment in the X-Y plane can be performed between the holding member and the base.

A second optical device manufacturing method according to the present invention is a manufacturing method for an optical device integrally provided with a plurality of light modulating devices for modulating a plurality of color lights for each color light according to image information, and a color synthesizing optical element for synthesizing each color light modulated at the light modulating devices. The method can include a step for mounting the plurality of light modulating devices each to a holding frame, a holding frame mounting step for attaching the holding frame to a holding member using an adhesive agent, a holding member mounting step for attaching the holding member to a light flux incident end face of the color synthesizing optical element, using an adhesive agent, a position adjusting step for adjusting the position of the plurality of light modulating devices in the state that the adhesive agent is unhardened, and an adhesive agent hardening step for hardening the adhesive agent following the position adjusting step. In the position adjusting step, with a predetermined optical axis as a Z axis and two axes orthogonally intersecting the Z axis as an X axis and Y axis, adjustment in the Z-axial direction and rotational direction centered on the X axis and Y axis can be performed between the holding frame and the holding member. Adjustment in the X-axial direction, Y-axial direction and rotational direction in the X-Y plane is performed between the holding member and a light flux incident end face of the color synthesizing optical element.

According to such a manufacturing method, the position of the light modulating device in the X-axial direction, Y-axial direction, and rotational direction in the X-Y plane, is decided by the positional relation of the holding member and base alone, without introducing pins or spacers therebetween, so that the positional adjustment of the light modulating device is easy and positional misalignment of the light modulating devices following positional adjustment can be reduced. Accordingly, this can contribute to reduction in manufacturing costs of the optical device and projector employing this, and to improved image quality.

With these manufacturing methods, adjustment in the Z-axial direction and rotational direction centered on the X axis and Y axis may be performed with a step for inserting spacers coated with adhesive agent between the light modulating devices and the holding member being provided before the position adjusting step, so as to carry out adjustment between the holding frame and the holding member by the spacers.

BRIEF DESCRIPTION OF THE DRAWINGS

The invention will be described with reference to accompanying drawings wherein like numerals reference like elements, and wherein.

DETAILED DESCRIPTION OF PREFERRED EMBODIMENTS

An embodiment according to the present invention will be described below with reference to the drawings.

Figure 1:
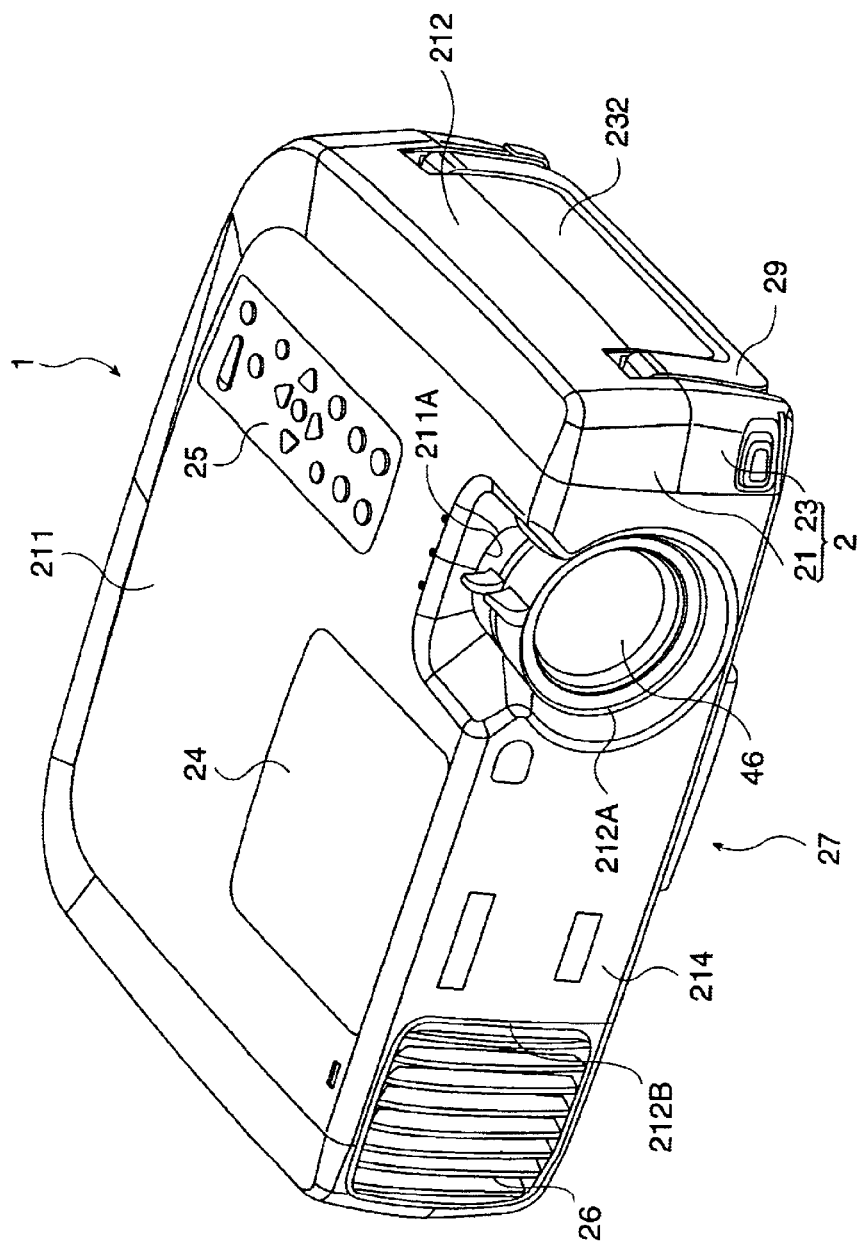
FIG. 1 is an overall perspective view from above of a projector according to an embodiment of the present invention.
Figure 2:
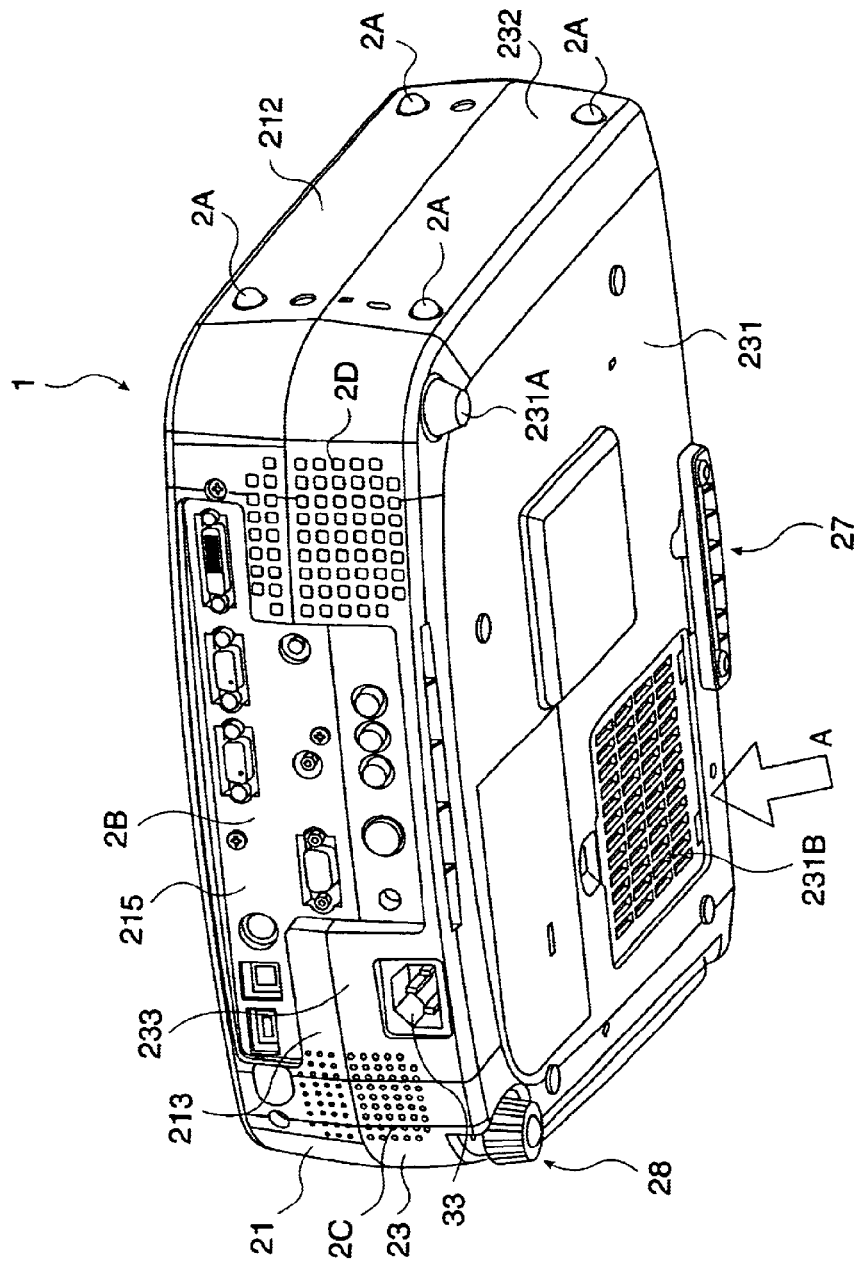
FIG. 2 is an overall perspective view from below of a projector according to an embodiment of the present invention.
Figure 3:
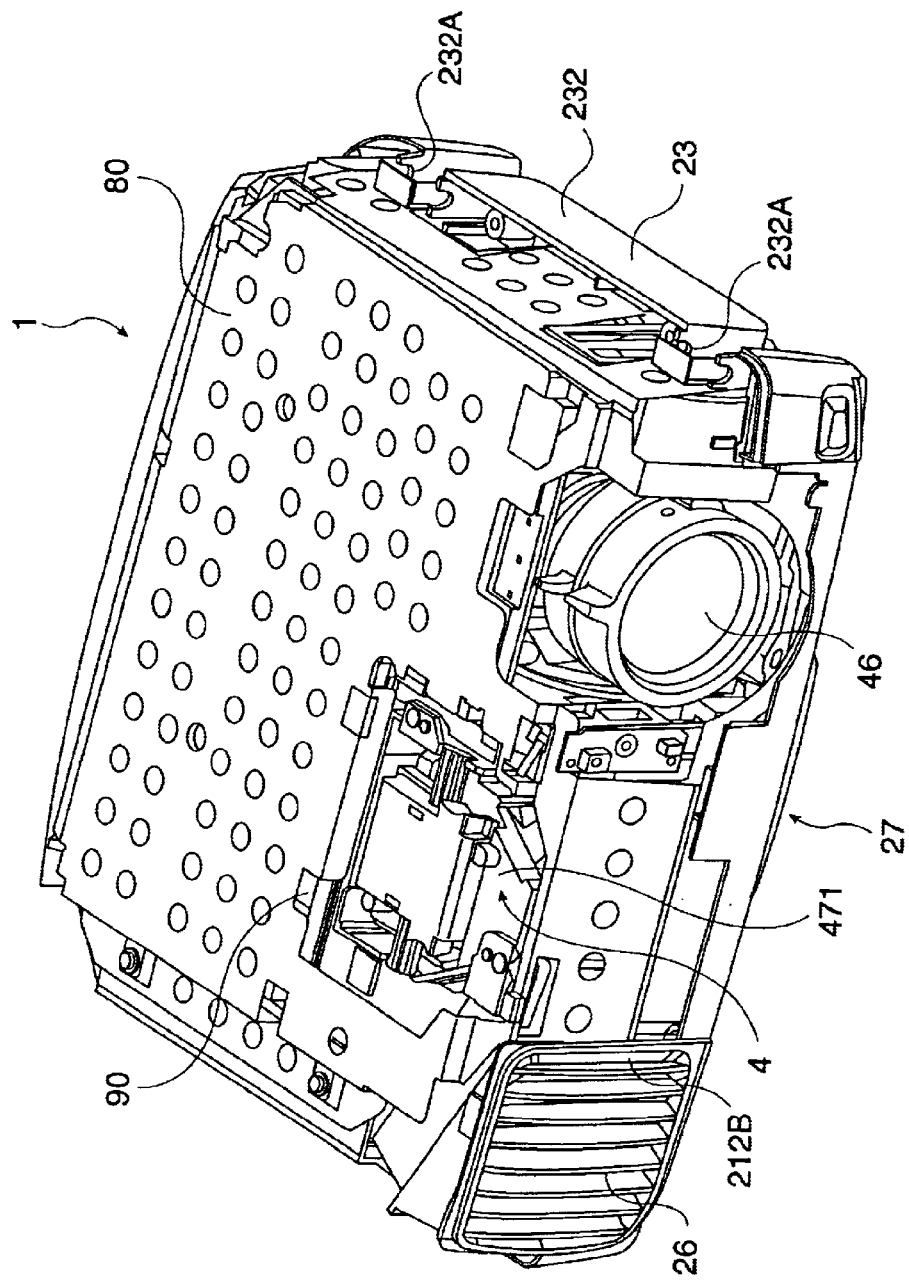
FIG. 3 is a perspective view illustrating the inside of a projector relating to an embodiment of the present invention, and specifically is a view of the projector, wherein an upper case of the projector has been removed from the state shown in FIG. 1.
Figure 4:
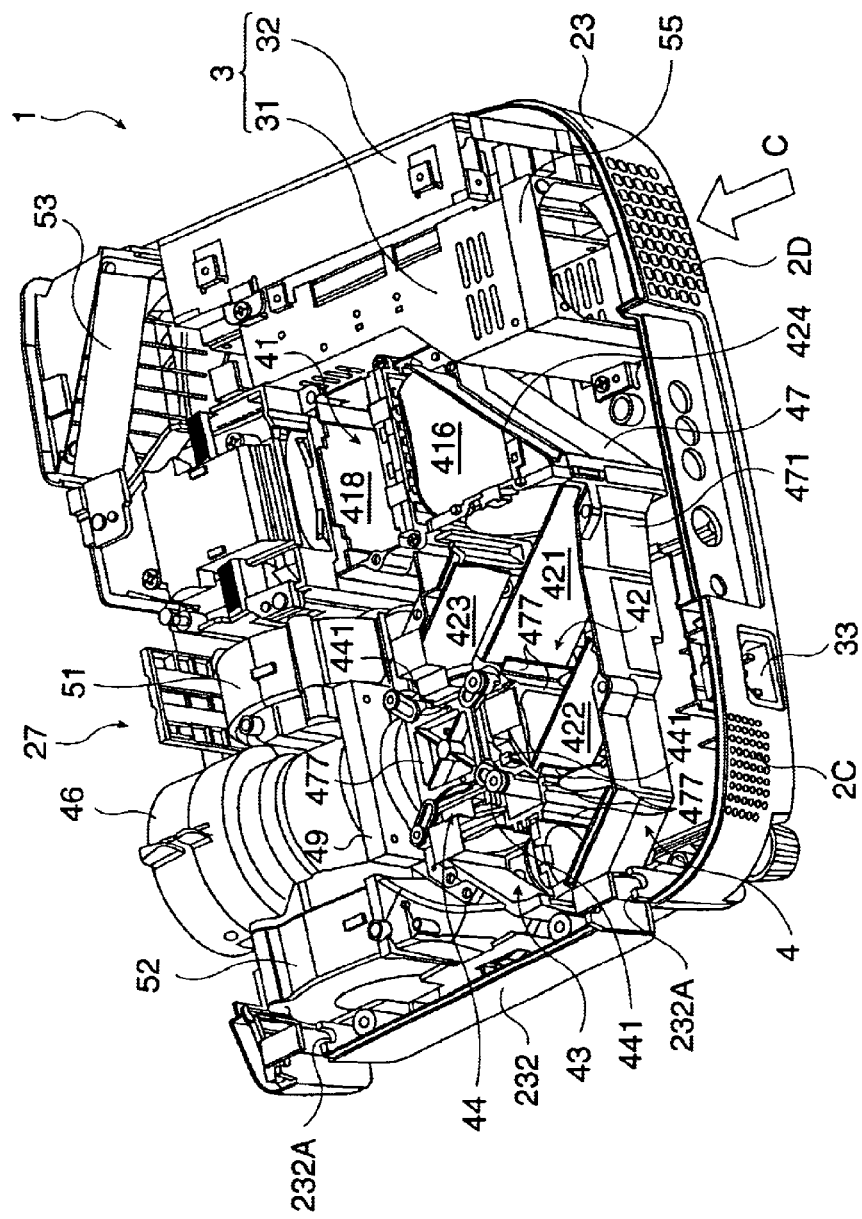
FIG. 4 is a perspective view illustrating the inside of a projector relating to an embodiment of the present invention, and specifically is a view of the projector viewed from the back thereof, wherein a shield plate, a driver board, and an upper housing have been removed from the state shown in FIG. 3.
Figure 5:
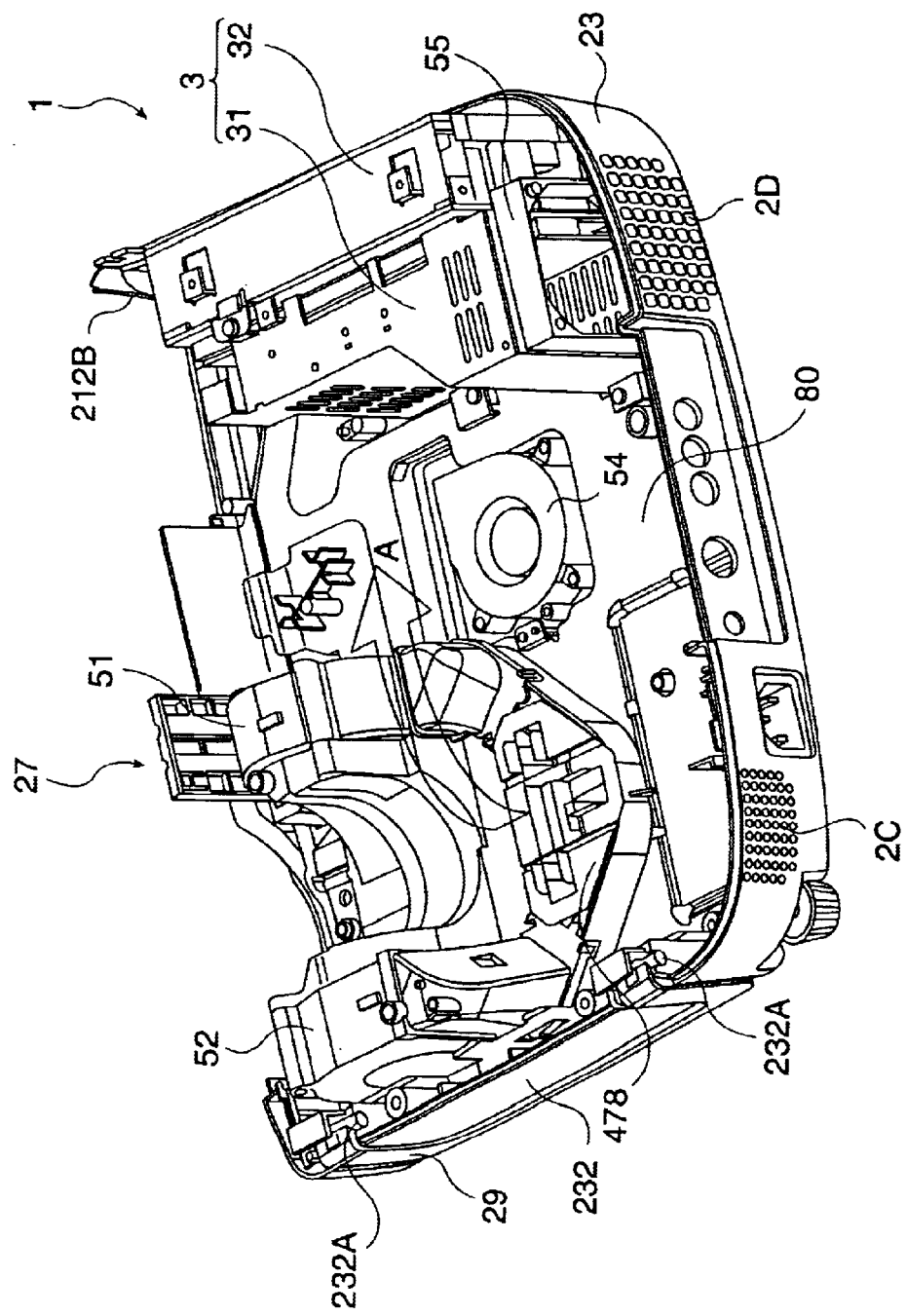
FIG. 5 is a perspective view illustrating the inside of a projector relating to an embodiment of the present invention, and specifically is a view of the projector, wherein an optical unit has been removed from the state shown in FIG. 4.

FIG. 1 is an overall perspective view of an exemplary projector 1 according to the first embodiment as viewed from above. FIG. 2 is an overall perspective view of the projector 1 as viewed from below. FIG. 3 through FIG. 5 are perspective views of the interior of the projector 1. Specifically, FIG. 3 is a diagram wherein an upper case 21 of the projector 1 has been removed from the state shown in FIG. 1, FIG. 4 is a diagram with a shield plate 80, a driver board 90, and an upper housing 472 removed from the state shown in FIG. 3 as viewed from the rear side, and FIG. 5 is a diagram wherein an optical unit 4 has been removed from the state shown in FIG. 4. The parts 4, 21, 80, 90, and 472, which make up the projector, will be described below in detail.

In FIG. 1 through FIG. 5, the projector 1 has an external case 2, an electric power source unit 3 stored in the external case 2, and an optical unit 4 disposed in the external case 2 as well, having a U-shaped flat form, with an overall generally rectangular parallelepiped shape.

The external case 2 can include an upper case 21 and a lower case 23, each formed of resin. The cases 21 and 23 are mutually fixed by screws. It should be noted that the external case 2 is not restricted to resin, and may be formed of metal. Also, arrangements may be made wherein a part of the external case is formed of resin and the other part formed of metal. For example, the upper case 21 may be formed of resin, and the lower case 23 formed of metal.

The upper case 21 is formed of an upper portion 211, a side portion 212 provided on the perimeter thereof, a back portion 213, and a front portion 214.

A lamp cover 24 is detachably attached to the front side of the upper portion 211, by fitting in. Also, a notch portion 21 IA is provided to the side of the lamp cover 24 at the upper portion 211 with the upper portion of a projecting lens 46 exposed therefrom, so that zoom operation and focusing operation of the projecting lens 46 can be performed manually by levers. An operating panel 25 is provided at the back side of the notch portion 211A.

The front portion 214 has a round hole opening 212A which connects to the notch portion 211A of the upper case 21, and the projecting lens 46 is positioned corresponding to the round hole opening 212A. A vent 212B formed to the lower case 23 side is positioned at the opposite side of the round hole opening 212A on the front portion 214. The vent 212B is positioned to the front of the internal electric power source unit 3. The vent 212B is provided with a venting louver 26 which vents cooling air to the direction away from the image projection region, i.e., to the left side in FIG. 1, and also has light shielding functions (the vent louver 26 is actually attached to the lower case 23).

The lower case 23 is formed of a bottom portion 231 and a side portion 232 and a back portion 233 provided on the perimeter thereof.

A position adjusting groove 27 for performing positioning of the projected image by adjusting the inclination of the entire projector 1 is provided at the front side of the bottom portion 231. Also, a position adjusting mechanism 28 for adjusting the inclination of the projector 1 in a different direction is provided at one corner portion of the rear side of the bottom portion 231, with a rear foot 231 A provided at the other corner. Note that the rear foot 231A is not capable of positional adjustment. Further, an air inlet 231B for cooling air is provided on the bottom portion 231.

An attachment portion 232A for rotatably attaching a horseshoe-shaped handle 29 is provided to the other side portion 232.

Side feet 2A (FIG. 2) which serve as feet in the event of standing the projector 1 up with the handle 29 on the top are provided to the side portions 212 and 232 of the upper case 21 and the lower case 23, on one side of such an external case 2.

Also, provided on the back side for the external case 2 is an interface portion 2B which opens straddling the back portion 213 of the upper case 21 and the back portion 233 of the lower case 23, with an interface cover 215 being provided within this interface portion 2B, and an interface board which is omitted in the drawings having various types of connectors mounted thereupon being positioned on the inner side of the interface cover 215. Speaker holes 2C and an air inlet 2D are provided to the left and right sides of the interface portion 2B, straddling the back portions 213 and 233. Of these, the air inlet 2D is positioned at the back of the internal electric power source unit 3.

The electric power source unit 3 can include an electric power source 31 and a lamp driving circuit (ballast) 32 disposed to the side of the electric power source 31, as shown in FIG. 4. The electric power source 31 supplies electric power supplied through an electric power source cable to the lamp driving circuit 32 and driver board 90 (FIG. 3) and so forth, and comprises an inlet connector 33 (FIG. 2) where the electric power source cable is plugged in. The lamp driving circuit 32 can supply electric power to a light source lamp 411 of the optical unit 4.

Figure 6:
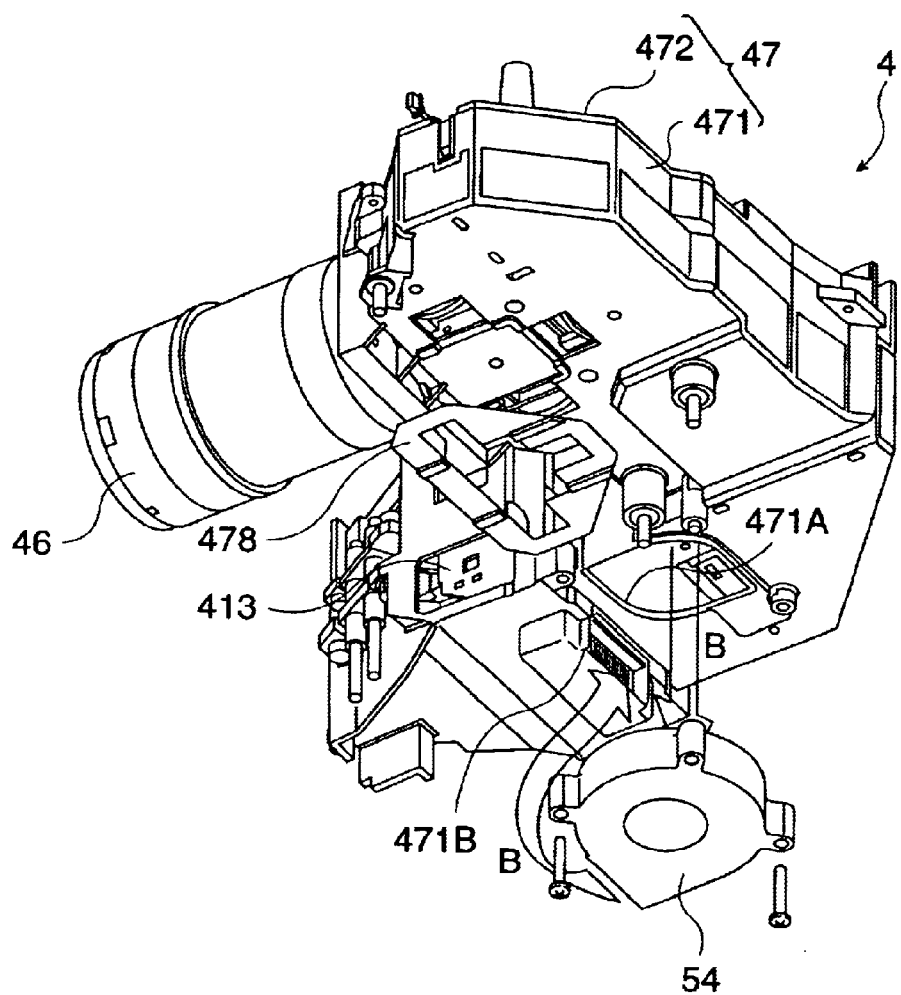
FIG. 6 is a perspective view from below of an optical unit according to an embodiment of the present invention.
Figure 7:
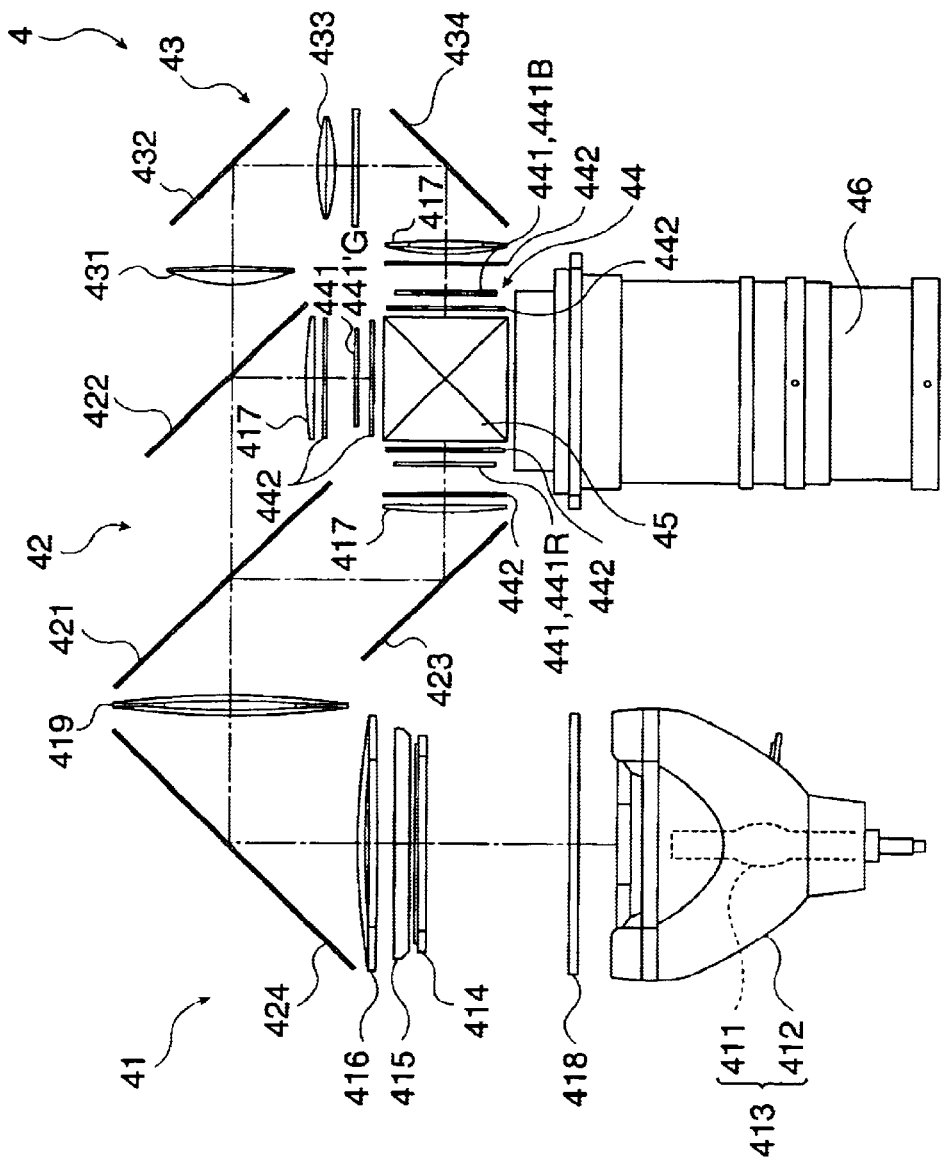
FIG. 7 is a plan view schematically illustrating an optical system of a projector according to an embodiment of the present invention.

The optical unit 4 is a unit for optically processing light flux emitted from the light source lamp 411 and forming an optical image corresponding to image information, as shown in FIG. 4, FIG. 6, and FIG. 7, and comprises an integrator illumination optical system 41, a color separating optical system 42, a relay optical system 43, an electro-optical device 44, a cross-dichroic prism 45 serving as a color synthesizing optical system (FIG. 7), and a projecting lens 46 serving as a projecting optical system.

The electric power source unit 3 and the optical unit 4 are surrounded by an aluminum shield plate 80 (FIG. 3 and FIG. 5), including above and below, and accordingly electromagnetic noise is prevented from leaking out externally from the electric power source unit 3.

In FIG. 4 and FIG. 7, the integrator illumination optical system 41 is an optical system acting so as to approximately uniformly illuminate the image formation region of the three liquid crystal panels 441 (liquid crystal panels 441R, 441G, and 441B denoted for each color light red, green, and blue) making up the electro-optical device 44, and comprises a light source device 413, a first lens array 418, a second lens array 414 including a UV filter, a polarization converting element 415, a first condenser lens 416, a reflecting mirror 424, and a second condenser lens 419.

Of these, the light source device 413 has a light source lamp 411 serving as an radial light source for emitting radial light rays, and a reflector 412 for reflecting the radial light emitted from the light source lamp 411. As for the light source lamp 411, halogen lamps, metal-halide lamps, or high-pressure mercury lamps are often used. A paraboloid mirror is used for the reflector 412. An ellipsoidal mirror may be used in conjunction with a collimating lens (concave lens), other than the paraboloid mirror.

The first lens array 418 has a structure wherein small lenses having an approximately rectangular outline as viewed from the optical axis direction are arrayed in matrix fashion. Each of the small lenses divides the light flux emitted from the light source lamp 411 into a plurality of partial light fluxes. The outline form of the small lenses is set so as to be a figure similar to the form of the image formation region of the liquid crystal panel 441. For example, in the event that the aspect ratio (the ratio of horizontal and vertical dimensions) of the image formation region of the liquid crystal panel 441 is 4:3, the aspect ratio of the small lenses is also 4:3.

The second lens array 414 has a configuration generally the same as that of the first lens array 418, having a configuration wherein small lenses are arrayed in matrix fashion. This second lens array 414 functions to form the images of the small lenses of the first lens array 418 onto the liquid crystal panel 441 along with the first condenser lens 416 and the second condenser lens 419.

The polarization converting element 415 is positioned between the second lens array 414 and the first condenser lens 416, and is formed into an integral unit with the second lens array 414. Such a polarization converting element 415 converts light from the second lens array 414 into one type of polarized light, whereby the usage efficiency of the light at the electro-optical device 44 is improved.

Specifically, each partial light converted into one type of polarized light by the polarization converting element 415 is approximately superimposed on the liquid crystal panels 441R, 441G, and 441B of the electro-optical device 44 in the end, by the first condenser lens 416 and the second condenser lens 419. With a projector using the type of liquid crystal panel which modulates polarized light, only one type of polarized light can be used, and approximately half of the light from the light source lamp 411 which emits random polarized light cannot be used.

Accordingly, the emitted light from the light source lamp 411 is sufficiently converted into one type of polarized light by using the polarization converting element 415, thereby raising the usage efficiency of the light at the electro-optical device 44. Such a polarization converting element 415 is introduced in, for example, Japanese Unexamined Patent Application Publication No. 8-304739.

The color separating optical system 42 can include two dichroic mirrors 421 and 422, and a reflecting mirror 423. The color separating optical system functions to divide the plurality of partial light fluxes emitted from the integrator illumination optical system 41 into the three color lights of red, green, and blue, with the dichroic mirrors 421 and 422.

The relay optical system 43 can include an incident side lens 431, relay lens 433, and reflecting mirrors 432 and 434. The relay optical system functions to guide the color light divided at the color separating optical system 42, the blue light, to the liquid crystal panel 441B.

At this time, at the dichroic mirror 421 of the color separating optical system 42, the blue color light component and the green color light component of the light flux emitted from the integrator illumination optical system 41 are transmitted, while the red color light component is reflected. The red color light reflected by the dichroic mirror 421 is reflected at the reflecting mirror 423, passes through as field lens 417 and has the polarization direction thereof aligned at a polarizing plate 442, and then reaches the red color liquid crystal panel 441R. This field lens 417 converts each partial light flux emitted from the second lens array 414 to light flux parallel to the center axis (primary ray) thereof. This is true for field lenses 417 provided at the light incident side of the other liquid crystal panels 441G and 441B, as well.

Of the blue light and green light which have been transmitted through the dichroic mirror 421, the green light is reflected by the dichroic mirror 422, passes through the field lens 417 and has the polarization direction thereof aligned at the polarizing plate 442, and then reaches the green color liquid crystal panel 441G. On the other hand, the blue light is transmitted by the dichroic mirror 422, passes through the relay optical system 43, further passes through the field lens 417 and has the polarization direction thereof aligned at the polarizing plate 442, and then reaches the blue color liquid crystal panel 441B. The reason that a relay optical system 43 is used for the blue light is in order to prevent deterioration of the usage efficiency of the light due to diffusion and the like of the light, because the optical path for the blue light is longer than the optical paths for the other color lights. That is to say, this is to transmit the partial light flux incident on the incident side lens 431, to the field lens 417 as it is.

The electro-optical device 44 can include liquid crystal panels 441R, 441G, and 441B, as three light modulating devices. The liquid crystal panels 441R, 441G, and 441B use polysilicon TFTs as switching devices for example, and each color light divided at the color separating optical system 42 is modulated according to image information by the liquid crystal panels 441R, 441G, and 441B, and the polarizing plates 442 at the light flux incident side and emitting side of these panels, thereby forming an optical image.

The cross-dichroic prism 45 serving as the color synthesizing element synthesize the images modulated for each color light emitted from the three liquid crystal panels 441R, 441G, and 441B, to form a color image. Now, the cross-dichroic prism 45 has a dielectric multi-layer film which reflects red light and a dielectric multi-layer film which reflects blue light formed along the interface of four right-angle prisms, in a general X shape, and the three color lights are synthesized by these dielectric multi-layer films. The color image synthesized by the cross-dichroic prism 45 is emitted from the projecting lens 46, and projected on a screen in an enlarged manner.

As shown in FIG. 4 and FIG. 6, the above-described optical systems 41 through 45 are stored inside an optical parts housing 47 formed of synthetic resin, serving as housing for the optical parts.

Now, the upper housing 472 and lower housing 471 are formed of metals which are light in weight and have excellent thermal conductivity such as aluminum, magnesium, titanium, or alloys thereof, or resins such as polycarbonate containing carbon filler, polyphenylene sulfide, liquid crystal resin, or the like.

The optical parts housing 47 can include a lower housing 471 having grooves for fitting in by sliding the above-described optical parts, 414 through 419, 421 through 423, 431 through 434, the polarizing plates 442 disposed at the light incident side of the liquid crystal panels 441R, 441G, and 441B, and an upper housing 472 having a lid shape, for closing off the opening at the top of the lower housing 471.

Also, a head portion 49 is formed at the light emitting side of the optical parts housing 47. The projecting lens 46 is fixed at the front side of the head portion 49, and the cross-dichroic prism 45 with the liquid crystal panels 441R, 441G, and 441B, is fixed at the back side.

As shown in FIG. 2 and FIG. 4 through FIG. 6, the projector 1 according to the present embodiment can include a panel cooling system A for primarily cooling the liquid crystal panels 441R, 441G, and 441B, a lamp cooling system B for primarily cooling the light source lamp 411, and an electric power source cooling system C for primarily cooling the electric power source 31.

First, description will be given regarding the panel cooling system A, with reference to FIG. 2, FIG. 4, and FIG. 5. With the panel cooling system A, a pair of sirocco fans 51 and 52 distributed on both sides of the projecting lens 46 are used. Cooling air drawn in through an air inlet 231 B on the lower face by the sirocco fans 51 and 52 cools the liquid crystal panels 441R, 441G, and 441B and the polarizing plates 442 (FIG. 7) on the light flux incident side and emitting side thereof upwards from the bottom, and then is drawn to an axial exhaust fan 53 side at a front corner while cooling the lower face of the driver board 90 (FIG. 3), and is vented from the vent 212B (FIG. 3) on the front side.

Next, description will be made regarding the lamp cooling system B, with reference to FIG. 4 through FIG. 6. With the lamp cooling system B, a sirocco fan 54 provided to the lower face of the optical unit 4 is used. The cooling air within a projector 1 drawn by the sirocco fan 54 enters into the optical parts housing 47 from an unshown opening provided on the upper housing 472, passes between the second lens array 414 (FIG. 7) and polarization converting element 415 (FIG. 7) and cools them, an then exits from a vent side opening 471A of the lower housing 471 and is suctioned by the sirocco fan 54, and is vented. The vented cooling air enters into the optical parts housing 47 again from the air inlet side opening 471B of the lower housing 471, enters into the light source device 413 (FIG. 7) and cools the light source lamp 411 (FIG. 7), subsequently exits from the optical parts housing 47, and is vented from the vent 212B (FIG. 3) by the axial vent fan 53.

Further, the electric power source cooling system C will be described with reference to FIG. 4. With the electric power source cooling system C, an axial intake fan 55 provided behind the electric power source 31 is used. The cooling air suctioned in from the air inlet 2D at the back side by the axial intake fan 55 cools the electric power source 31 and lamp driving circuit 32, and subsequently is vented from the vent 212B (FIG. 3) by the axial vent fan 53 as with the other cooling systems A and B.

The following is a description of the structure of the optical device with reference to FIG. 8 through FIG. 14.

Figure 8:
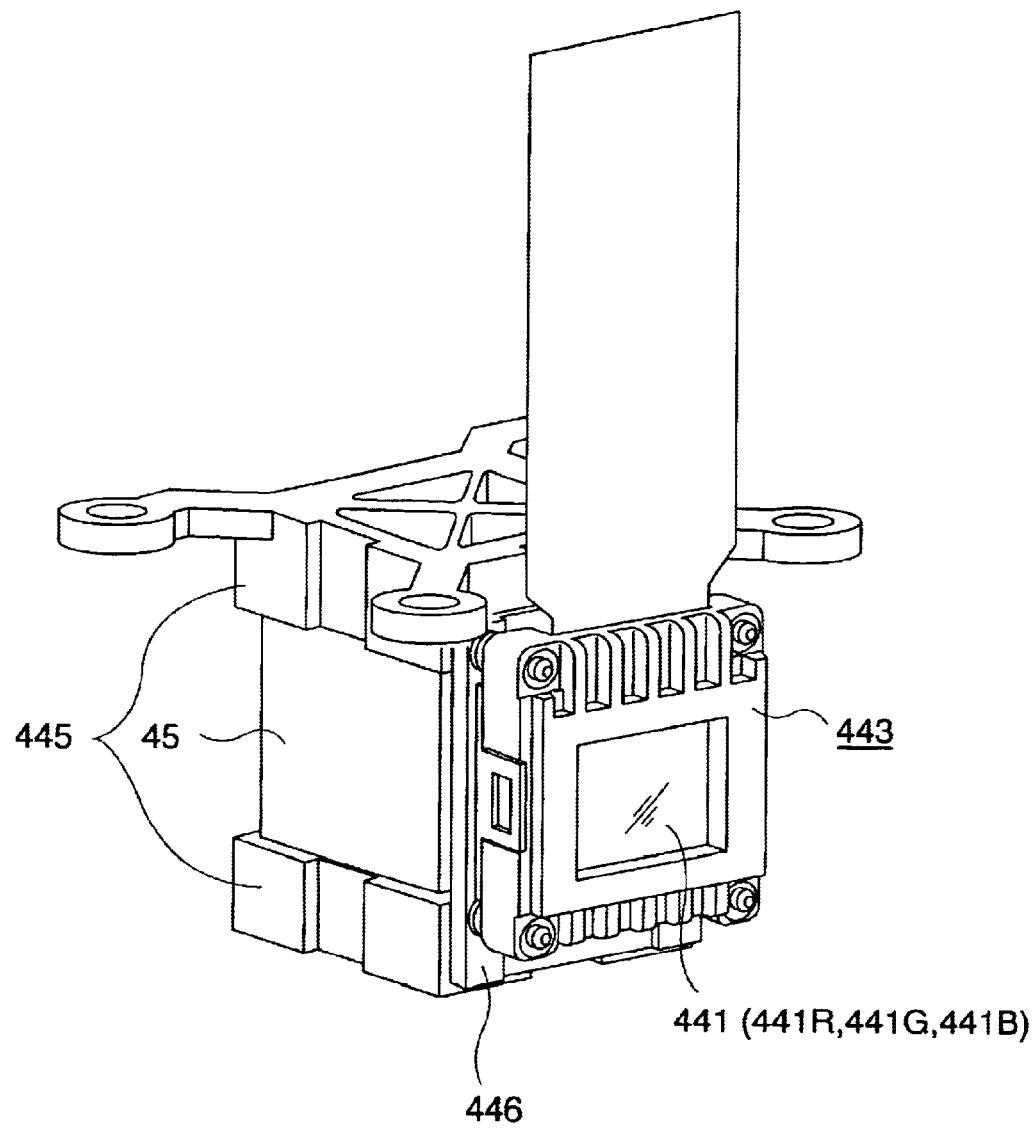
FIG. 8 is a perspective view from above of an optical system according to a first embodiment.

First, as shown in FIG. 8, the optical device can include a cross-dichroic prism 45, bases 445 fixed on both upper and lower faces of the cross-dichroic prism 45 (a pair of end faces intersecting with the light flux incident end face), the liquid crystal panels 441R, 441G, and 441B, a holding frame 443 for storing the liquid crystal panels 441R, 441G, and 441B, and a holding member 446 introduced between the holding frame 443 and the side face of the bases 445.

Note that in FIG. 8, only one each of the liquid crystal panel 441, holding frame 443, and holding member 446 are shown, in order to simplify the diagram. These components 441, 443, and 446 are actually also disposed on two other light flux incident end faces of the cross-dichroic prism 45. This is also true for FIG. 9, FIG. 15, FIG. 16 and FIG. 17.

Now, the bases 445, holding member 446, and holding frame 443 may be configured of resins, such as acrylic material, polycarbonate containing carbon filler, polyphenylene sulfide, liquid crystal resin, or the like, or metals which are light in weight and have excellent thermal conductivity, such as aluminum, magnesium, titanium, or alloys of these as the primary materials. With the present embodiment, each can include a magnesium alloy. Each of the components 445, 446, and 443 may be formed of separate materials, but forming with the same material yields high functional reliability, because the amount of dimensional change due to heat (expansion and shrinking) will be the same. Also, these components expanding and shrinking due to heat enables the effects on image quality of the projected image to be reduced. Also, taking such functional reliability and effects on the image quality of the projected image into consideration, the thermal expansion coefficients of the components 445, 446, and 443 are preferably as close as possible to the thermal expansion coefficients of the glass or the like making up the cross-dichroic prism 45.

The bases 445 are fixed on both upper and lower faces of the cross-dichroic prism 45, the perimeter forms thereof being somewhat larger than that of the cross-dichroic prism 45, and the side faces protruding out further than the side faces of the cross-dichroic prism 45.

Figure 9:
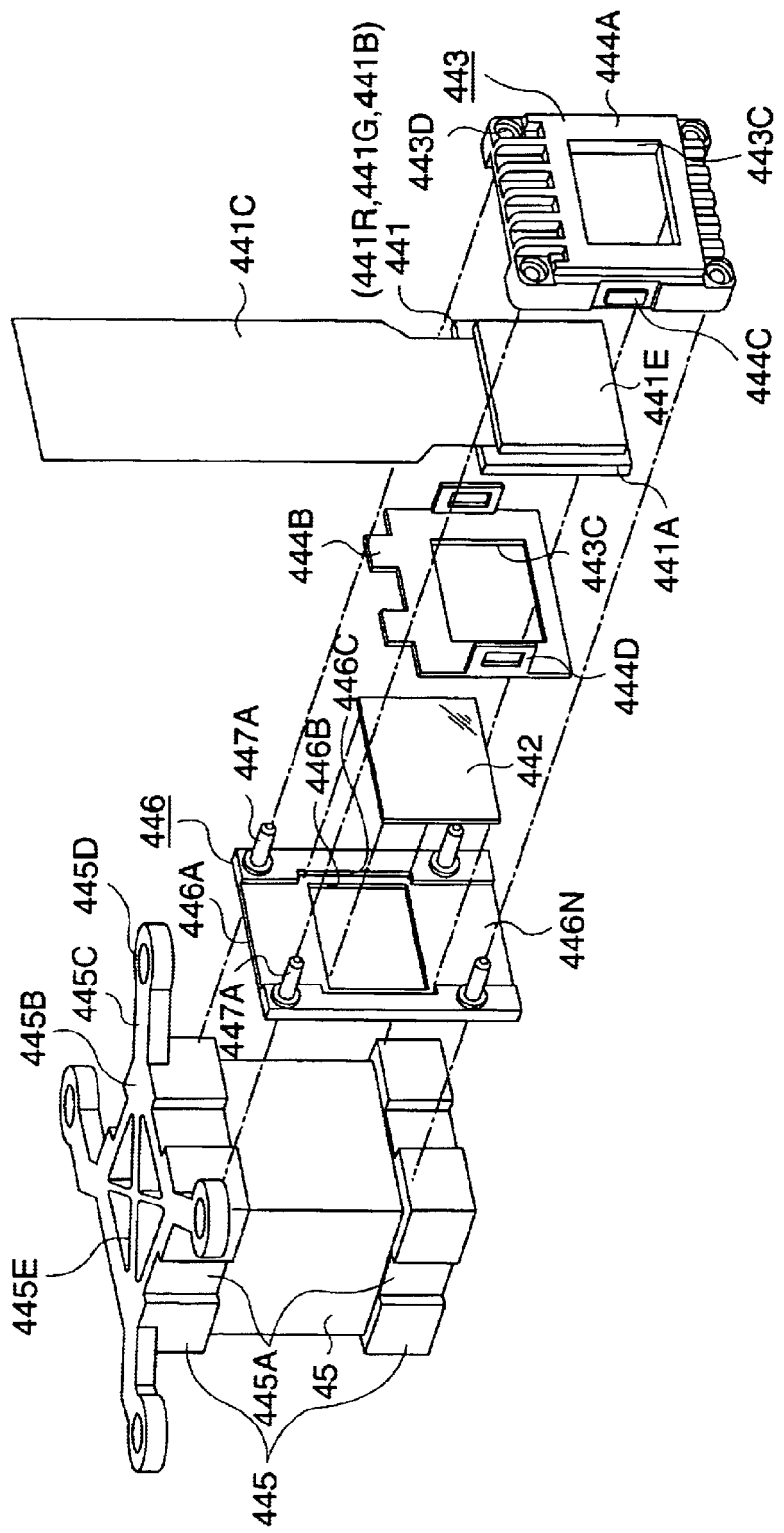
FIG. 9 is a disassembled perspective view representing the structure of an optical device according to the first embodiment.

Also, as shown in FIG. 9, recesses 445A are formed on opposing upper and lower side edges on the side faces of the base 445, so that a tool, such as a screwdriver or the like, can be inserted between the holding member 446 and bases 445 which are fixed by adhesion. Further, an attachment portion 445B is formed on the base 445 fixed on the upper face of the cross-dichroic prism 45, in order to fix the optical device to the lower housing 471.

Figure 13:
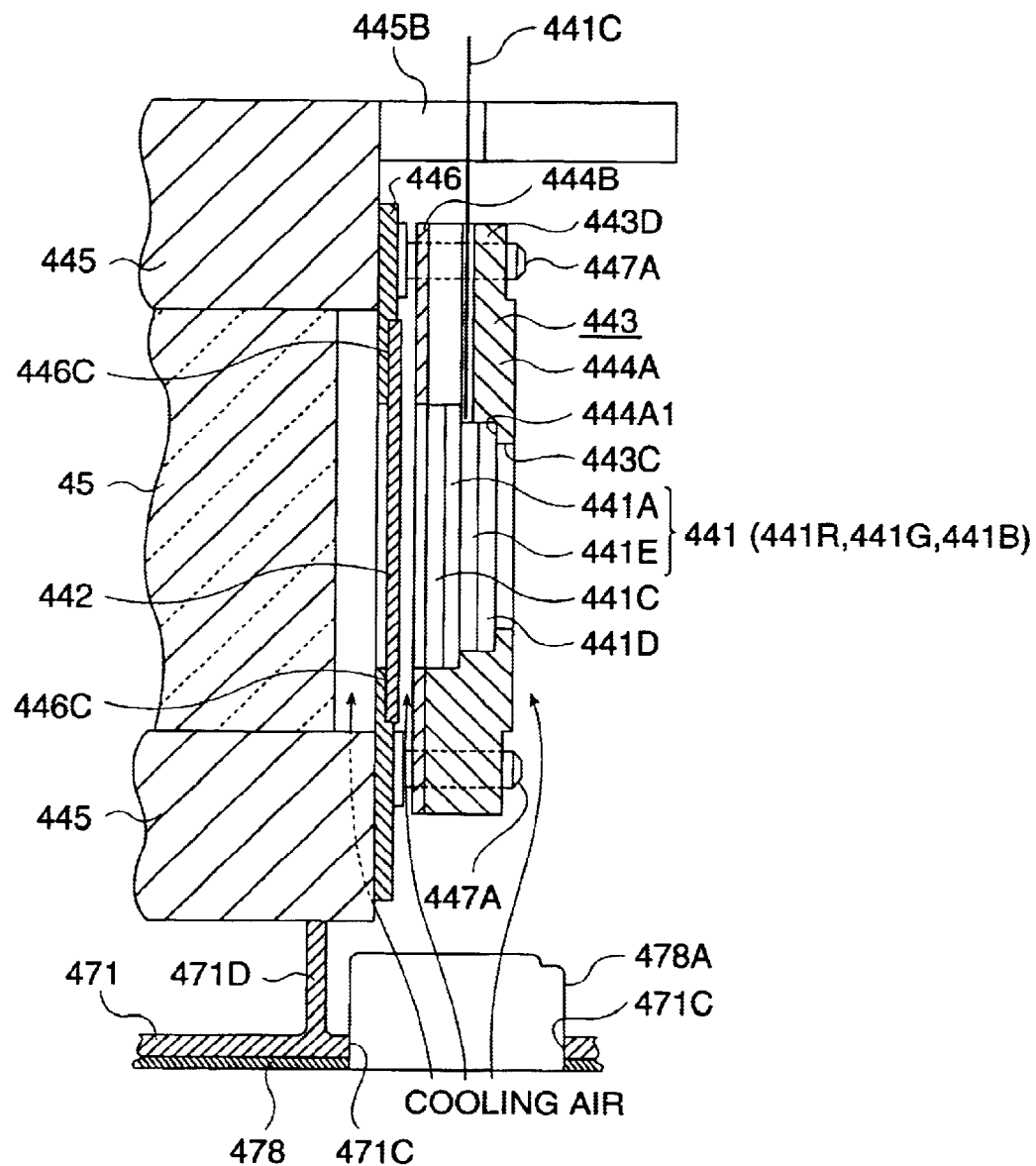
FIG. 13 is an enlarged view of the XIII portion shown in FIG. 12.

As shown in FIG. 13, the liquid crystal panel 441 has liquid crystal sealed in between a driving substrate (e.g., a substrate upon which are formed a plurality of line-shaped electrodes, electrodes making up pixels, and TFT devices electrically connected in between these) 441A and an opposing substrate (e.g., a substrate upon which is formed a common electrode) 441E, with a control cable 441C extending from between these glass substrates. Fixed to the driving substrate 441A and the opposing substrate 441E are light-transmissive dust-proof plates 441D to misalignment the position of the panel face of the liquid crystal panel 441 from the back-focus position of the projecting lens 46, so that dust adhering to the surface of the panel is optically inconspicuous. A material with good thermal conductivity is used for the light-transmissive dust-proof plate, such as sapphire, crystal, quartz, or the like. Though the present embodiment employs the light-transmissive dust-proof plate 441D, such a dust-proof plate is not indispensable. Also, an arrangement may be made wherein a light-transmissive dust-proof plate 441D is provided to only one substrate of the driving substrate 441A and the opposing substrate 441E. Further, a gap may be provided between the light-transmissive dust-proof plate 441D and the substrates 441A and 441E. This holds true for the following embodiments, as well. Note that in the drawings other than FIG. 13, the light-transmissive dust-proof plate 441D is omitted.

As shown in FIG. 13, the holding frame 443 is made up of a recessed frame member 444A having a storing portion 444A1 for storing the liquid crystal panels 441R, 441G, and 441B, and a supporting plate 444B which engages with the recessed frame member 444A and presses and fixes the stored liquid crystal panels 441R, 441G, and 441B. Also, the holding frame 443 grasps the perimeter of the light-transmissive dust-proof plate 441D fixed to the opposing substrate 441E of the liquid crystal panels 441R, 441G, and 441B. Also, the liquid crystal panels 441R, 441G, and 441B, are stored in a storing portion 444A1 of the holding frame 443. An opening 443C is provided at a position corresponding to the panel face of the stored liquid crystal panels 441R, 441G, and 441B, with holes 443D formed at the four corners thereof. Also, as shown in FIG. 9, fixing of the recessed frame member 444A and the supporting plate 444B is performed by engaging hooks 444D provided at the left and right sides of the supporting plate 444B, and hook engaging portions 444C provided at places corresponding to the recessed frame member 444A.

Now, the liquid crystal panels 441R, 441G, and 441B are exposed at the opening 443C of the holding frame 443, and this portion becomes the image formation region. That is to say, the color light of R, G, and B is introduced to this portion of the liquid crystal panels 441R, 441G, and 441B, and an optical image is formed according to image information.

Further, a shielding film (omitted in the drawings) is provided at the light flux emitting side end face of the supporting plate 444B, thereby preventing light reflected from the cross-dichroic prism 45 from being further reflected to the cross-dichroic prism 45 side, and preventing deterioration in contrast due to stray light.

The holding member 446 is for holding and fixing the holding frame 443 for storing the liquid crystal panels 441R, 441G, and 441B. As shown in FIG. 9, the holding member can include a rectangular plate-shaped member 446A, and pins 447A erected from the four corners of the rectangular plate-shaped member 446A. Now, the positions of the pins 447A do not need to be at the corners of the rectangular plate-shaped member 446A. The number of pins 447A is not restricted to four, with two or more being sufficient.

This holding member 446 is introduced between the bases 445 and the holding frame 443. The end face of the holding member 446 which is opposite to the pins 447A is fixed by adhesion to the side faces of the bases 445. Also, the holding member 446 and holding frame 443 are mutually fixed by adhesion, through the pins 447A of the holding member 446 and the holes 443D of the holding frame 443.

The rectangular plate-shaped member 446A has a rectangular opening 446B formed in the generally center portion thereof, and a recess 446N is formed along the upper and lower side edges thereof. At the time of mounting the liquid crystal panels 441R, 441G, and 441B, the opening 446B corresponds to the image formation region of the liquid crystal panels 441R, 441G, and 441B. Also, a shielding film (omitted in the drawings) is provided on the light flux emitting end face of the rectangular plate-shaped member 446A, in the same way as with the holding frame 443.

Also, an engaging groove 446C is formed so as to surround the opening 446B, and a polarizing plate 442 wherein a polarizing film has been applied onto a sapphire substrate using a transparent adhesive agent is fixed so as to be engaged with this engaging groove 446C, using double-faced tape or adhesion.

The pins 447A are with the diameter thereof at the rising portion from the rectangular plate-shaped member 446A being larger than the holes 443D formed on the holding frame 443, so that a gap is secured between the liquid crystal panels 441R, 441G, and 441B and the holding member 446 at the time of mounting the liquid crystal panels 441R, 441G, and 441B.

In the event that such a structure does not exist, i.e., in the event that the diameter of the pin 447A is formed generally the same from the base toward the tip, the gap cannot be secured at the time of mounting the holding frame 443 to the holding member 446, so that the adhesive agent for fixing the holding frame 443 and the holding member 446 spread to the end face of the holding frame 443 due to surface tension, and adheres to the display face of the liquid crystal panel 441.

The following is a detailed description of the manufacturing method for the optical device, with reference to FIG. 9.

First, the bases 445 are fixed to the upper and lower faces of the cross-dichroic prism 45, using adhesive agent (base fixing step). Further, the polarizing plate 442 is fixed by double-face tape or adhesion so as to engage with the engaging grooves 446C of the holding member 446 (polarizing plate fixing step). The liquid crystal panels 441R, 441G, and 441B are stored in the storing portion 444A 1 of the recessed frame member 444A of the holding frame 443. Subsequently, the supporting plate 444B of the holding frame 443 is attached from the liquid crystal panel insertion side of the recessed frame member 444A, thereby pressing and fixing liquid crystal panels 441R, 441G, and 441B so as to hold them. Note that attaching of the supporting plate 444B to the recessed frame member 444A can be performed by engaging the hooks 444D of the supporting plate 444B with the hook engaging portions 444C of the recessed frame member 444A (light modulating device holding step).

The pins 447A of the holding member 446 are inserted into the holes 443D of the holding frame 443 storing the liquid crystal panels 441R, 441G, and 441B (holding frame mounting step).

The end face of the holding member 446 opposite to the pins 447A is attached to the side face of the bases 445 (the light flux incident side face side of the cross-dichroic prism 45) with adhesive agent (holding member mounting step). At this time, the holding member 446 is attached to the side face of the bases by surface tension of the adhesive agent.

In a state with the adhesive agent unhardened, the positions of the liquid crystal panels 441R, 441G, and 441B are adjusted (position adjusting step). Following performing positional adjustment of the liquid crystal panels 441R, 441G, and 441B, the adhesive agent is hardened, and fixed (adhesive agent hardening step).

The optical device is manufactured by the above step procedures.

A thermal curing adhesive agent having excellent thermal conductivity or a photo-curing adhesive agent is preferably used for the adhesive agent used in the above manufacturing steps. As for such a thermal curing adhesive agent having excellent thermal conductivity or a photo-curing adhesive agent, there are acrylic or epoxy adhesive agents with silver palladium mixed in. Also, as for photo-curing adhesive agents, ultraviolet curing adhesive agents which get harden by irradiation of ultraviolet rays are commonly known. Manufacturing time can be reduced by using thermal curing adhesive agent in the event that one of the members to be fixed by adhesion is formed of metal, and by a photo-curing adhesive agent in the event that one is formed of a light-transmissive material. This is true for the other embodiments, as well.

With the present embodiment, the base 445, holding member 446, and holding frame 443 are formed of a magnesium alloy which has excellent thermal conductivity, hence using a thermal-curing adhesive agent allows the adhesive agent to be hardened in a shorter time, thereby enabling reduction in manufacturing time.

Positional adjustment of the liquid crystal panels 441R, 441G, and 441B in the position adjusting step above is performed as follows.

First, with regard to the liquid crystal panel 441G which faces the projecting lens 46 (FIG. 7) directly, alignment adjustment (X-axial direction, Y-axial direction, θ direction adjustment) is performed with the plane of contact between the side face of the bases 445 and the holding member 446 as a sliding face, and focus adjustment (Z-axial direction, Xθ direction, Xθ direction adjustment) is performed by sliding the portion of contact of the holding frame 443 and the holding member 446, i.e., the holding frame 443 through the pins 447A. That is to say, alignment adjustment can be made in a state wherein one of the base 445 and holding member 446 is fixed, by moving the other in the X-axial direction, Y-axial direction, and θ direction. Also, focus adjustment can be made in a state wherein one of the holding frame 443 and holding member 446 is fixed, by moving the other in the Z-axial direction, Xθ direction, and Yθ direction).

Following adjusting the liquid crystal panel 441G to a predetermined position, the adhesive agent is hardened with hot air, a hot beam, ultraviolet rays, and so forth.

Next, with the liquid crystal panel 441G of which positional adjustment and fixation have been completed as reference, positional adjustment and fixation are performed for the liquid crystal panels 441R and 441B, in the same manner as described above.

Now, the manufacturing of the optical device and the positional adjustment of the liquid crystal panel do not necessarily have to be performed in the above order. For example, in the event of using solder as an adhesive agent, an arrangement is sufficient wherein the parts are mounted without adhesive agent in the above manufacturing steps, and following the above positional adjustment, the base 445, the holding member 446, and the holding frame 443 are fixed with solder. This is true for optical devices according to other embodiments which are manufactured with the same method as the present embodiment.

Figure 10:
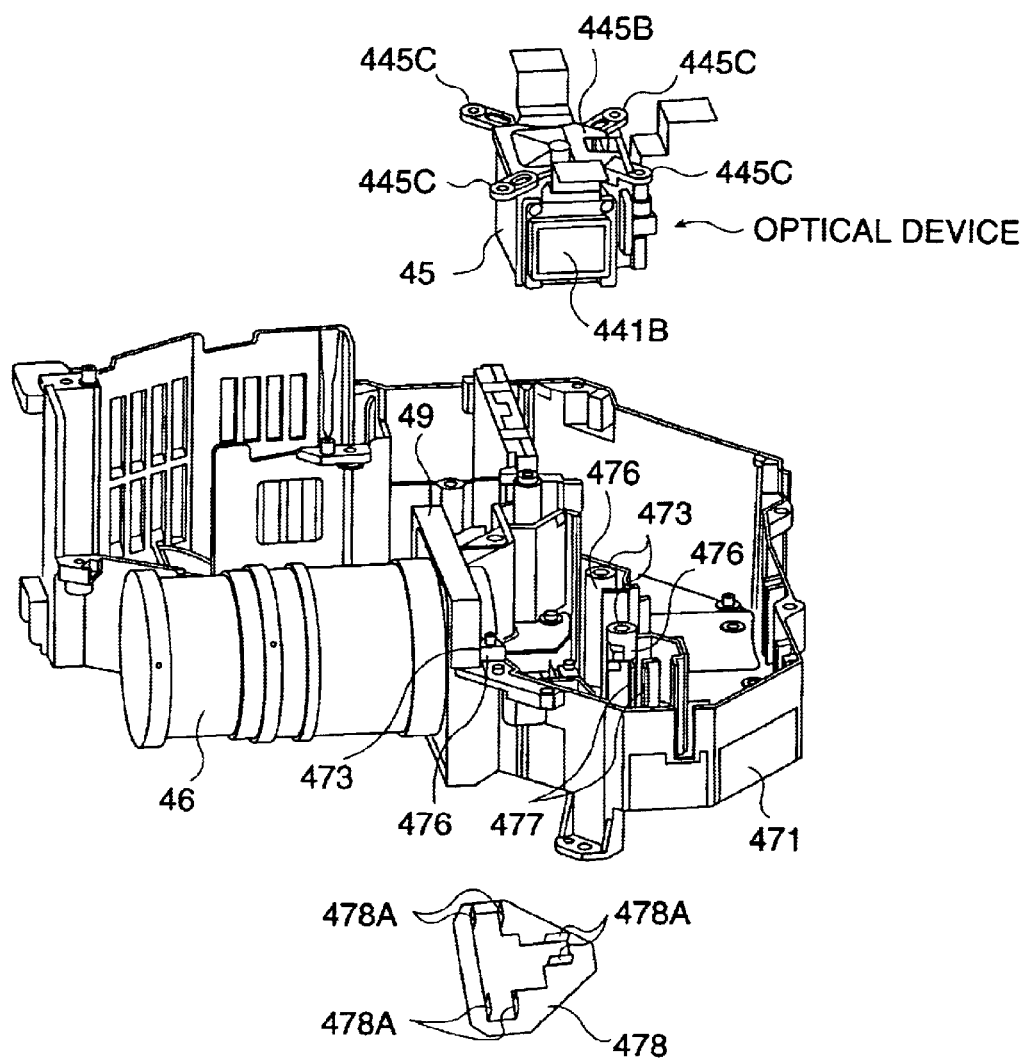
FIG. 10 is a perspective view illustrating the attachment position of an optical device according to an embodiment of the present invention.
Figure 11:
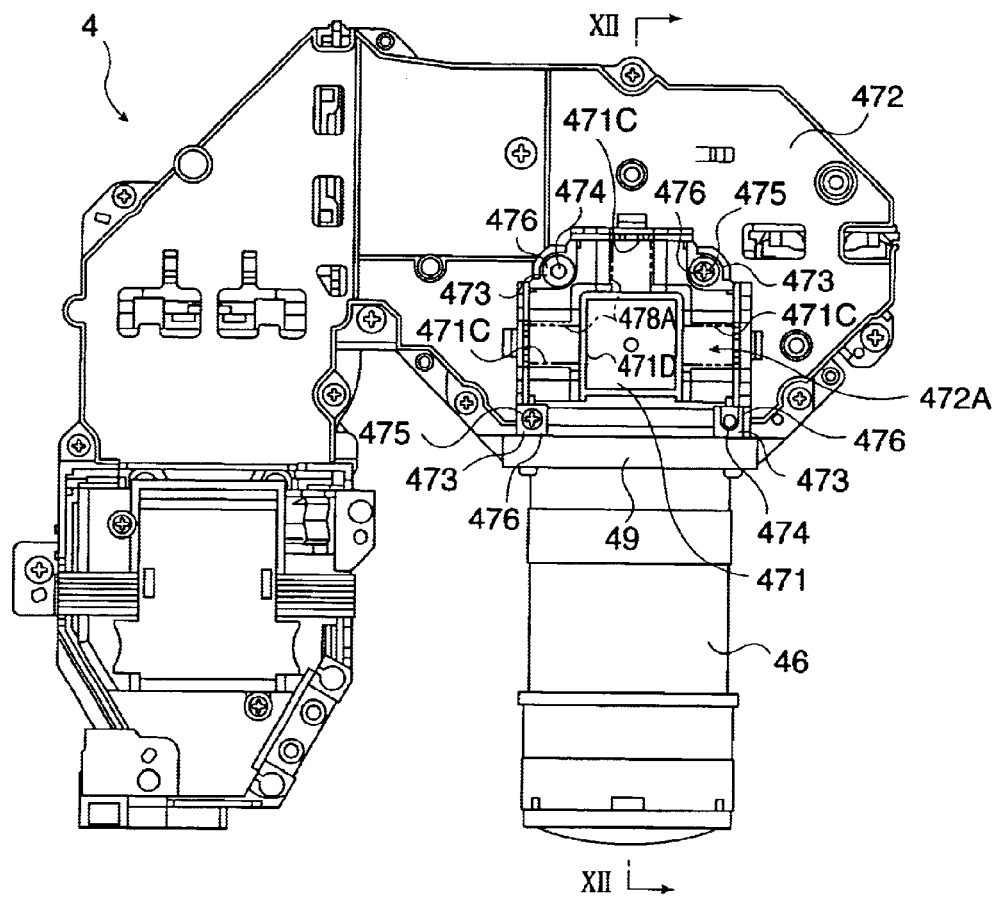
FIG. 11 is a plan view illustrating an optical unit according to an embodiment of the present invention.
Figure 14:
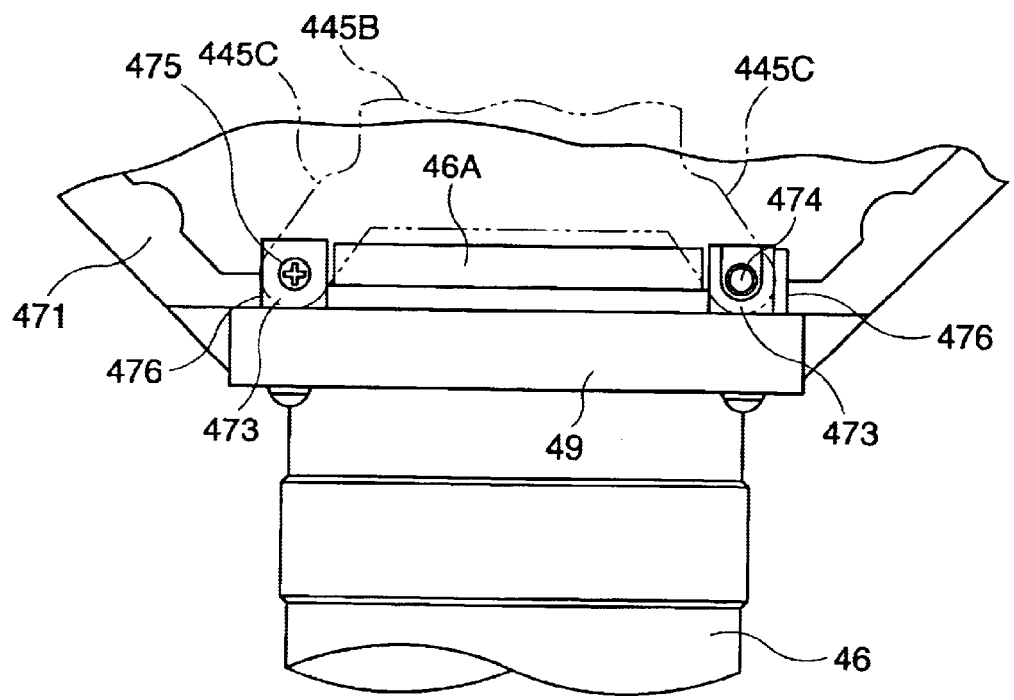
FIG. 14 is a plan view illustrating the principal portions of an optical unit according to an embodiment of the present invention in an enlarged manner.

The optical device configured of the liquid crystal panels 441R, 441G, and 441B and the cross-dichroic prism 45 integrated according to the above-described method is fixed to an attachment portion 473 of the lower housing 471 by an attachment portion 445B of the base 445 fixed to the upper face of the cross-dichroic prism 45 (a face orthogonal to the light flux incident face), as shown in FIG. 10, FIG. 11, and FIG. 14.

This attachment portion 445B has four arms 445C extending out in four directions in a plan view, as shown in FIG. 9. Also, as shown in FIG. 11 and FIG. 14, of the round holes 445D provided on each of the arms 445C, two round holes 445D on an approximately diagonal line are fit with positioning protrusions 474 provided on corresponding attachment portions 473, and the remaining two round holes 445D have screws 475 which are screwed to corresponding attachment portions 473 passed through. Also, as shown in FIG. 9, a holding portion 445E is provided at the square portion at the center of the attachment portion 445B, to facilitate grasping by a worker at the time of mounting or detaching.

On the other hand, as shown in FIG. 10 and FIG. 14, the attachment portion 473 of the lower housing 471 is provided on the top of four cylindrical or square-column bosses 476 continued in an approximately vertical direction of the lower housing 471. Accordingly, in the state that the attachment portion 445B of the base 445 is attached to the attachment portion 473 of the lower housing 471, the liquid crystal panels 441R, 441G, and 441B and the cross-dichroic prism 45 are disposed in a state of being hung on the lower side of the attachment portion 445B, and are stored within the optical parts housing 47 in a state of being slightly off of the bottom of the lower housing 471.

With such a lower housing 471, two bosses 476 at the projecting lens 46 side have an integrally-formed head portion 49 for fixing to the projecting lens 46. The bosses 476 have reinforcing functions so that the head portion 49 does not tilt even when the projecting lens 46 which is heavy is fixed to the head portion 49.

A plurality of holding pieces 477 along the vertical direction (shown in FIG. 4 and FIG. 10 represented by some of the holding pieces 477) are provided on the two bosses 476 distanced from the projecting lens 46 side, with grooves for fitting in a field lens 417, dichroic mirrors 421 and 422, an incident side lens 431, and relay lens 433, being formed between adjacent pairs of holding pieces 477. That is to say, these holding pieces 477 are also reinforced by the bosses 476 by being integrally formed by the bosses 476.

On the other hand, as shown in FIG. 11, a notch opening 472A is formed in the upper housing 472 at portions corresponding to the liquid crystal panels 441R, 441G, and 441B (FIG. 8) and the cross-dichroic prism 45 (FIG. 8), and the attachment portion 473 of the lower housing 471 is also exposed from this notch opening 472A. That is to say, the liquid crystal panels 441R, 441G, and 441B and the cross-dichroic prism 45 shown in FIG. 8 and others can be mounted to or detached from the attachment portion 473 along with the attachment portion 445B of the base 445 even in the state of the upper housing 472 being attached to the lower housing 471, by being fixed to the base 445 having the attachment portion 445B, beforehand.

Figure 12:
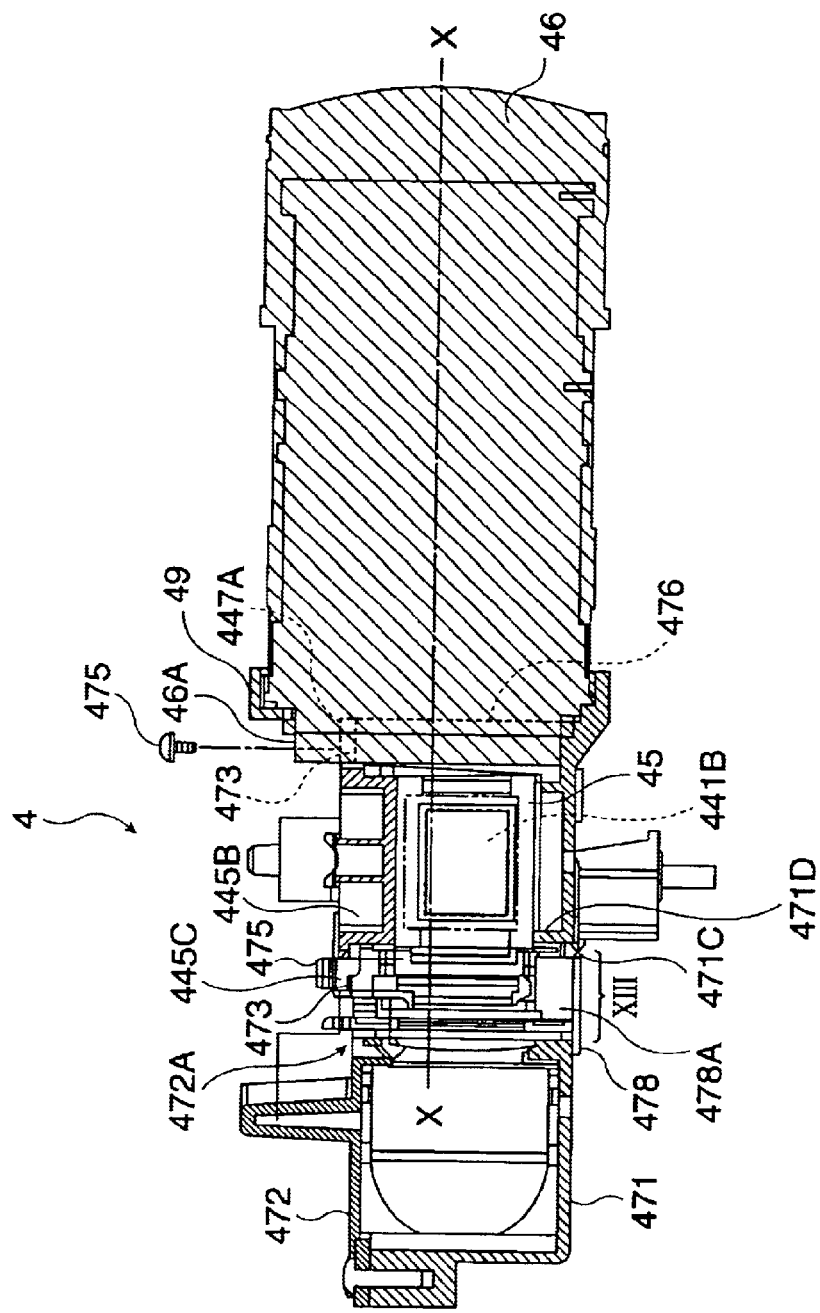
FIG. 12 is a cross-sectional view along line XII—XII in FIG. 11.

Also, particularly, the attachment portion 473 provided to the bosses 476 integrally formed with the head portion 49 is positioned above the center axis X—X of the projecting lens 46 shown in FIG. 12. Accordingly, as shown in FIG. 14, two arms 445C of the attachment portion 445B overlap the perimeter of the end portion 46A of the projecting lens 46 protruding from the head portion 49 to the cross-dichroic prism 45 side in a plan view, but arrangement is made such that there is no actual mutual interference.

The following is a description of the cooling structure of the optical device fixed to the optical parts housing 47 by the above-described attaching method.

As shown in FIG. 6 and FIG. 10 through FIG. 13, air inlet openings 471C are provided in three positions on the bottom of the lower housing 471, corresponding to the liquid crystal panels 441R, 441G, and 441B, so that the liquid crystal panels 441R, 441G, and 441B and the polarizing plates 442 disposed at the light incident sides and emitting sides thereof are cooled with the cooling air of the panel cooling system A (FIG. 2 and FIG. 5) flowing into the optical parts housing 47 from the air inlet openings 471C.

At this time, a flat and generally triangular plate-shaped flow straightening plate 478 is provided on the lower face of the lower housing 471, with pairs of erected pieces 478A (a total of six) provided on the flow straightening plate 478 protrude upwards from the air inlet openings 471C. In FIG. 11, the erected pieces 478A are drawn with chain double-dashed lines. The erected pieces 478A straighten the flow of the cooling air for cooling the liquid crystal panels 441R, 441G, and 441B and the polarizing plates 442, upwards from the bottom.

Further, in FIG. 11 through FIG. 13, an erected portion 471D rising from the bottom of the lower housing 471 is positioned on a perimeter of one of the air inlet openings 471C which is on the side of the cross-dichroic prism 45 and is parallel to the light flux incident face thereof, wherein the top portion thereof is in close proximity to the bottom face of the base 445 fixed to the lower face of the cross-dichroic prism 45 so that cooling air flowing upwards from the bottom side does not readily leak from the gap between the bottom of the lower housing 471 and the cross-dichroic prism 45, and rather flows into the gap between the liquid crystal panels 441R, 441G, and 441B and the cross-dichroic prism 45.

The present embodiment provides at least the following advantages.

Pins 447A for fixing the holding frame 443 to the holding member 446 are provided, and pins and spacers configured as independent parts are not used unlike conventional POP structures, so that the number of parts is small. Also, the structure is simple, and manufacturing is easy. This can contribute to reduction in size and reduction in manufacturing costs of the optical device and further the projector.

The liquid crystal panels 441R, 441G, and 441B are not fixed to the light flux incident end face of the cross-dichroic prism unlike conventional POP structures, and rather fixed to the side face of bases 445 fixed on the top and bottom faces of the cross-dichroic prism 45, so that the size of the light flux incident end face of the cross-dichroic prism 45 can be kept to approximately the same size of an image formation region of the liquid crystal panels 441R, 441G, and 441B or somewhat larger than that. Accordingly, the size of the cross-dichroic prism 45 can be reduced, and consequently, this can reduce the size and reduce the manufacturing costs of the optical device, and further, the projector.

Also, the positions of the liquid crystal panels 441R, 441G, and 441B are not defined by the position of the light flux incident end face of the cross-dichroic prism 45 unlike conventional arrangements, and rather defined by the side face of the bases 445. Accordingly, the size of the cross-dichroic prism 45 can be reduced by that much. Accordingly, the optical device and further the projector can be reduced in size and reduced in cost. Further, the back-focus of the projecting lens 46 can be shortened, so that a greater amount of light can be taken in by the projecting lens 46, and a bright projected image can be obtained.

Further, the liquid crystal panels 441R, 441G, and 441B are not fixed to the light flux incident end face of the cross-dichroic prism but rather fixed to the side face of the bases 445 fixed on the top and bottom faces of the cross-dichroic prism 45, so that in the event that there is the need to replace the liquid crystal panels 441R, 441G, and 441B during manufacturing or following manufacturing, the light flux incident end face of the cross-dichroic prism 45 is not scratched even in the event of removing these. Also, there is no need to scrape off adhesive agent fixed to the light flux incident end face. Accordingly, this can contribute to reduction in manufacturing costs of the optical device and the projector, and to improvement in after-sales service.

Further, the position of the liquid crystal panels 441R, 441G, and 441B is determined by the positional relation between the holding member 446 and the bases 445 without pins or spacers introduced, so that positional adjustment of the liquid crystal panels 441R, 441G, and 441B is easy, and positional misalignment of the liquid crystal panels 441R, 441G, and 441B following positional adjustment can be reduced. Accordingly, this can contribute to reduced manufacturing costs and improved image quality of the optical device and the projector.

There is no need to provide a separate mechanism for holding the polarizing plates between the liquid crystal panels 441R, 441G, and 441B and the cross-dichroic prism 45, because the polarizing plates 442 positioned at the light flux emitting side of the liquid crystal panels 441R, 441G, and 441B are fixed so as to engage with the engaging grooves 446C of the holding member 446. This can promote reduction in costs, and reduction in size and weight of the optical device, and further, the projector. Also, an arrangement may be made wherein phase difference plates (e.g., ¼ wavelength plate ½ wavelength plate, etc.) or optically-compensating plates (e.g., Fuji WV Film Wide View A (product name) sold by Fuji Photo Film Co., Ltd., etc.) are fixed to the engaging grooves 446C instead of the polarizing plates 442 or with the polarizing plates 442.

Due to the recesses 445A being provided to the side face of the bases 445 to which the holding member 446 is fixed by adhesion, and due to the recess 446N being provided to the rectangular plate-shaped member 446A of the holding member 446, these can be readily removed in the event that there is the need to replace the liquid crystal panels 441R, 441G, and 441B during manufacturing or following manufacturing due to some sort of trouble. That is to say, a tool such as a screwdriver or the like can be inserted to the recesses 445A and 446N, so that the bases 445 and holding member 446, and the holding member 446 and holding frame 443 can be easily peeled apart. Accordingly, this can contribute to further reduction in manufacturing costs of the optical device and the projector, and to improvement in after-sales service.

The perimeter forms of the bases 445 are larger than the perimeter form of the cross-dichroic prism 45, and accordingly, the side faces of the bases 445 protrude out farther than the side faces of the cross-dichroic prism 45, so that even in the event that adhesive agent flows out from the plane of contact when the holding member 446 is fixed to the side faces of the base 445 using thermal-curing adhesive agent or photo-curing adhesive agent, the overflowing adhesive agent can be caught with the protruding portion. Accordingly, adhesive agent can be prevented from flowing out onto the light flux incident end face of the cross-dichroic prism 45. Consequently, this can contribute to further improvement in image quality of the projector.

The attachment portion 445B for fixing the optical device made up of the liquid crystal panels 441R, 441G, and 441B and the cross-dichroic prism 45 to the lower housing 471 is formed integrally with the bases 445, so that the space around the optical device can be reduced. Accordingly, this can promote reduction in size and reduction in weight of the projector.

Also, the attachment portion 445B is attached to an attachment portion 473 attached on the top of bosses 476 on the front side of the optical device in the detaching direction, so that there is no need to remove screws 475 or insert a screwdriver for tightening again into the optical parts housing 47 in the event of replacing optical parts. Accordingly, there is no worry of damaging the field lens 417 and the like stored in the optical parts housing 47 with a screwdriver, and the replacing work is easy. Also, due to the attachment portion 445B being at the front side, the arms 445C of the attachment portion 445B extending out in four directions will not strike the field lens 417 or the like within the optical parts housing 47 at the time of replacing. Replacing work is easy from such a perspective, as well. Accordingly, this can contribute to reduction in manufacturing costs of the optical device and the projector, and to improvement in after-sales service.

The holding frame 443 comprises a recessed frame member 444A for storing the liquid crystal panels 441R, 441G, and 441B, and a supporting plate 444B for pressing and fixing the stored liquid crystal panels 441R, 441G, and 441B. Accordingly, the storing and fixing of the liquid crystal panels 441R, 441G, and 441B can be carried out easily, and also stable holding and fixing of the liquid crystal panels 441R, 441G, and 441B can be performed.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat, effects on the image quality of the projected image can be alleviated.

The bosses 476 on the projecting lens 46 side are integrally formed with the head portion 49, so that the head portion 49 can be reinforced with the bosses 476, and tilting due to fixation of the projecting lens 46 can be prevented even in the event that the head portion 49 is made correspondingly thinner. Accordingly, reduction in size of the optical parts housing 47, and further the optical unit 4, can be further promoted.

Further, the holding pieces 477 for holding the optical parts such as the field lens 417, dichroic mirrors 421 and 422, incident side lens 431, relay lens 433, and a polarizing plate 442 disposed on the light incident side of the liquid crystal panels 441R, 441G, and 441B, are also provided integrally with the bosses 476 on the side distanced from the projecting lens 46, and are accordingly reinforced, so that the holding pieces 477 and the surroundings can be made thinner, and reduction in size of the optical unit 4 can be promoted from this perspective as well.

The attachment portion 473 above the bosses 476 integrally formed with the head portion 49 is positioned on both sides of the projecting lens 46 in the radial direction and is provided distanced from the center axis X—X of the projecting lens 46 at the upper side (at the front side of the center axis X—X in the detaching direction ), so that the arms 445C of the attachment portion 445B and the end portion 46A of the projecting lens 46 penetrating through and protruding from the head portion 49 do not mutually interfere. The width and thickness of the arms 445C can be increased correspondingly. Accordingly, the supporting strength of the liquid crystal panels 441R, 441G, and 441B and cross-dichroic prism 45 can be improved.

Also, the end portion 46A of the projecting lens 46 protrudes from the head portion 49 and is closer to the cross-dichroic prism 45, so that the back-focus of the projecting lens 46 can be shortened. Accordingly, more light can be taken in by the projecting lens 46, and a bright projected image can be obtained.

Alignment adjustment (X-axial direction, Y-axial direction, θ direction adjustment) is performed with the plane of contact between the side faces of the bases 445 and the holding member 446 as a sliding face, and focus adjustment (Z-axial direction, Xθ direction, Yθ direction adjustment) is performed by sliding the holding frame 443 through the portion of contact of the holding frame 443 and the holding member 446, i.e., the pins 447A. Accordingly, the position of the liquid crystal panels 441R, 441G, and 441B are determined by the positional relation of the holding member 446 and base 445 alone, without pins or spacers introduced, so that positional adjustment of the liquid crystal panels 441R, 441G, and 441B is easy, and positional misalignment following positional adjustment can be reduced. Accordingly, this can contribute to reduction in the manufacturing costs of the optical device and further the projector, and to improved image quality.

The second embodiment according to the present invention will be described next. In the following description, parts and structures the same as with the first embodiment are denoted with the same reference numerals, and detailed description thereof will be omitted or simplified.

Figure 15:
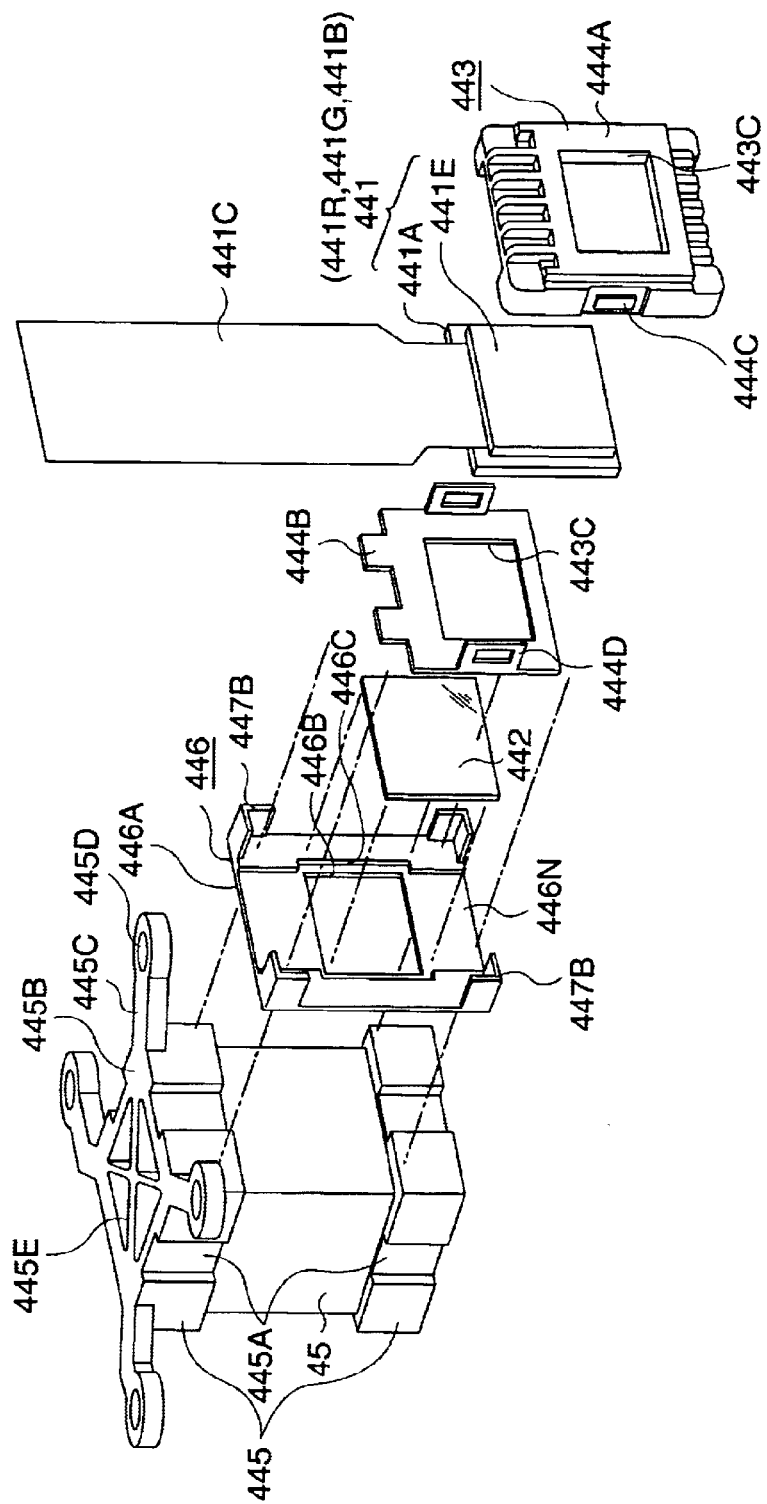
FIG. 15 is a disassembled perspective view representing the structure of an optical device according to a second embodiment.

With the optical device according to the first embodiment, the holding member 446 has pins 447A provided in a protruding condition from the four corners of the rectangular plate-shaped member 446A. Conversely, the optical device according to the second embodiment differs in the point that the holding member 446 has erected pieces 447B with a general L-shape when viewed from the front, as shown in FIG. 15. Other configurations and manufacturing methods are the same as the first embodiment.

Specifically, the erected pieces 447B are positioned at the four corners of the rectangular plate-shaped member 446A so as to extend following the edge of the rectangular plate-shaped member 446A, and are configured so as to hold the perimeter of the holding frame 443 storing the liquid crystal panels 441R, 441G, and 441B. The erected pieces 447B and the end faces of the liquid crystal panels 441R, 441G, and 441B attached to each other by a thermal-curing adhesive agent or a photo-curing adhesive agent. Now, there is no need for the position of erected pieces 447B to be at the corners of the rectangular plate-shaped member 446A. Also, the number of erected pieces 447B is not restricted to four, rather, two or more is sufficient.

According to such a second embodiment, the above advantages described in the description of the first embodiment can be obtained.

Also, the erected pieces 447B are formed on the four corners of the rectangular plate-shaped member 446A, so that the effects of external force are dispersed among the erected pieces, and stable holding can be carried out.

Also, the form of such erected prices 447B can be readily manufactured by sheet metal processing or mold forming, leading to reductions in costs.

The third embodiment according to the present invention will be described next.

In the following description, parts and structures the same as with the first embodiment are denoted with the same reference numerals, and detailed description thereof will be omitted or simplified.

Figure 16:
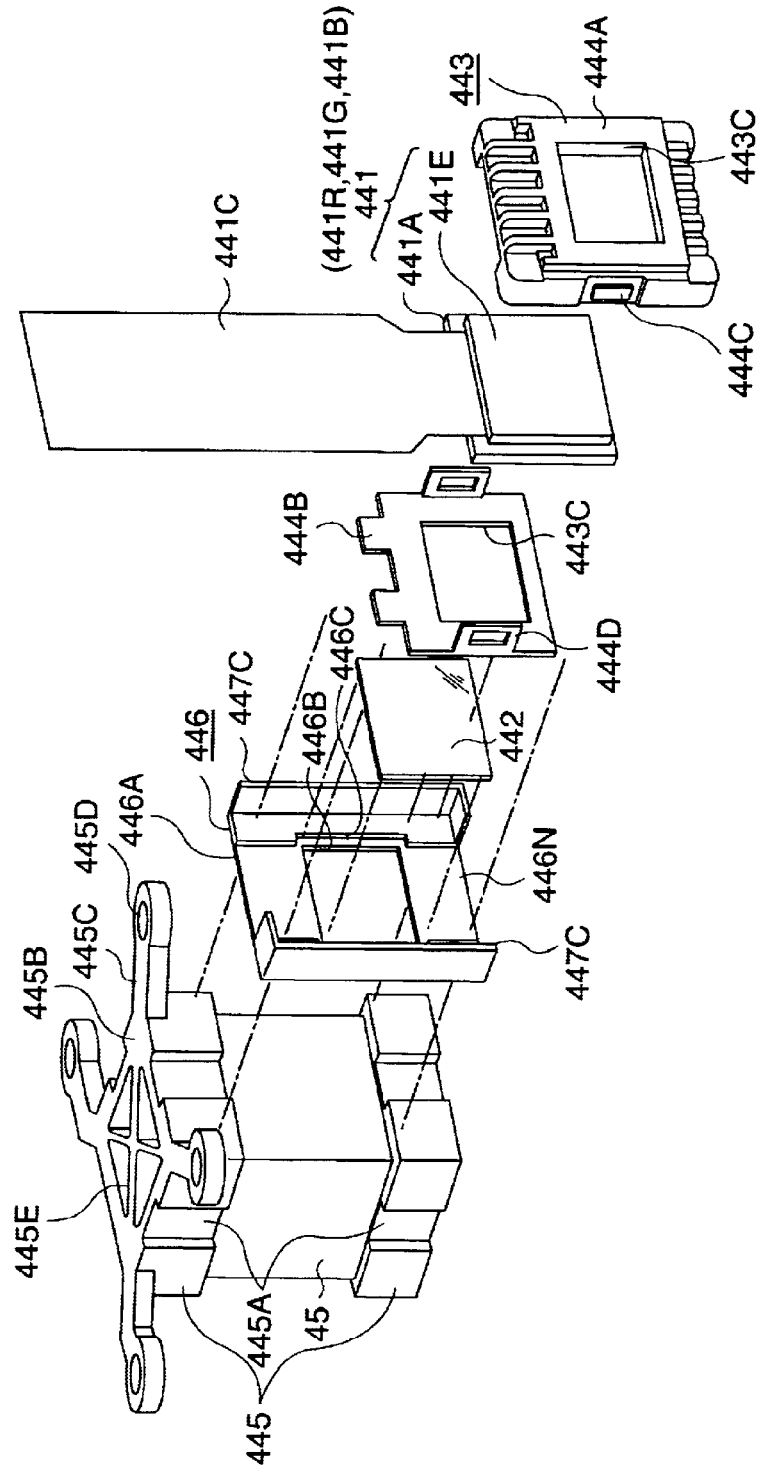
FIG. 16 is a disassembled perspective view representing the structure of an optical device according to a third embodiment.

With the optical device according to the first embodiment, the holding member 446 has pins 447A provided in a protruding condition from the four corners of the rectangular plate-shaped member 446A. Conversely, the optical device according to the third embodiment differs in the point that the holding member 446 has erected pieces 447C with a general L-shape when viewed from the front, as shown in FIG. 16. Other configurations and manufacturing methods are the same as with the first embodiment.

Specifically, the erected pieces 447C are positioned at the four corners of the rectangular plate-shaped member 446A so as to extend following the edge of the rectangular plate-shaped member 446A, and are configured so as to hold the perimeter of the holding frame 443 storing the liquid crystal panels 441R, 441G, and 441B. Also, the erected pieces 447C are provided along a pair of mutually parallel sides of the rectangular plate-shaped member 446A, wherein the parallel pair of sides of the erected pieces 447C have generally the same length as the sides of the rectangular plate-shaped member 446A. The erected pieces 447C and the end faces of the liquid crystal panels 441R, 441G, and 441B are attached to each other by a thermal-curing adhesive agent or a photo-curing adhesive agent.

According to such a third embodiment, the above advantages described in the description of the first embodiment can be obtained.

Also, the form of such erected prices 447C can be readily manufactured by sheet metal processing or mold forming, leading to reductions in costs.

Further, the parallel pair of sides of the erected pieces 447C have the same length as the sides of the rectangular plate-shaped member 446A, so that light leaking from between the holding member 446 and the holding frame 443 can be shielded. That is to say, deterioration in contrast of projected images or unclear images due to light that has leaked within the optical device and been taken into the projecting lens 46 can be prevented, so high-quality images can be obtained.

The fourth embodiment according to the present invention will be described next.

In the following description, parts and structures the same as the first embodiment are denoted with the same reference numerals, and detailed description thereof will be omitted or simplified.

With the first embodiment, bases 445 are fixed to both the top and bottom faces of the cross-dichroic prism 45 (both of a pair of end faces intersecting the light flux incident end face), with the holding member 446 being fixed by adhesion to the side faces of the bases 445. Further, a polarizing plate 442 is fixed to engaging grooves 446C of the holding member 446 by double-face tape or an adhesive agent.

Conversely, the fourth embodiment differs in the point that the holding member 446 is fixed by adhesion to the light flux incident end face of the cross-dichroic prism 45, and also, the base 445 is provided on only one of the pair of end faces intersecting with the light flux incident end face of the cross-dichroic prism 45. Further, the polarizing plate 442 is fixed to the light flux incident end face of the cross-dichroic prism 45 with double-face tape or an adhesive agent.

Figure 17:
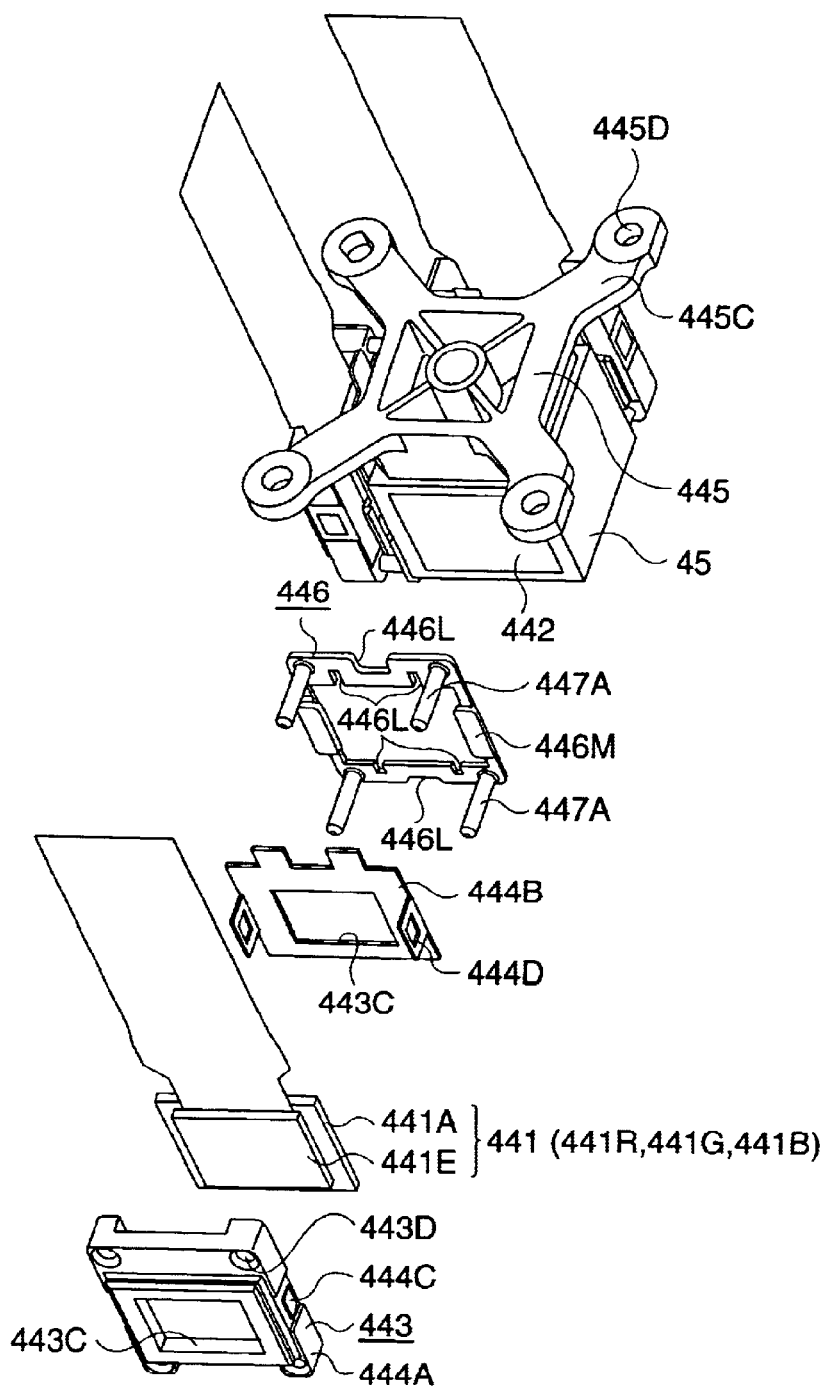
FIG. 17 is a disassembled perspective view representing the structure of an optical device according to a fourth embodiment.

Specifically, the holding member 446 has a rectangular plate-shaped member 446A, and pins 447A provided in a protruding condition from the four corners of the rectangular plate-shaped member 446A, as shown in FIG. 17.

A rectangular opening 446B is formed in the rectangular plate-shaped member 446A at the image formation region of the liquid crystal panels 441R, 441G, and 441B, and notches 446L for hot behavioral difference absorption are formed on the upper and lower edges of the rectangular plate-shaped member 446A and upper and lower edges of the opening 446B. Further, supporting faces 446M are formed on the left and right edges so that an optically-compensating plate (omitted in drawing) such as "Fuji WV Film Wide View A (product name)" sold by Fuji Photo Film Co., Ltd. can be attached. Installing such optically-compensating plates compensates for birefringence occurring at the liquid crystal panels 441R, 441G, and 441B, and minimizes retardation, whereby the viewing angle can be widened, and a high contrast ratio can be obtained.

Also, the polarizing plate 442 is fixed in generally to the center of the light flux incident end face of the cross-dichroic prism 45.

Also, while the holding member 446 is configured of a magnesium alloy with the first embodiment, a resin having light transmittance is used with the present embodiment. There is acrylic material as such a light-transmissive resin. However, this holding frame 443 may be formed of other materials, and may be configured of resins such as, for example, polycarbonate containing carbon filler, polyphenylene sulfide, liquid crystal resin, or the like, or metals which are light in weight and have excellent thermal conductivity such as aluminum, magnesium, titanium, or alloys with these metals as the primary material thereof.

Configurations other than those described above are the same as the first embodiment.

Next, a detailed description will be given regarding the manufacturing method for the optical device according to the present embodiment, with reference to FIG. 17.

First, the base 445 is fixed to the upper face of the cross-dichroic prism 45, using adhesive agent (base fixing step).

Also, the polarizing plate 442 is fixed by double-face tape or adhesion at the center of the light flux incident end face of the cross-dichroic prism 45 (polarizing plate fixing step).

Further, an optically-compensating plate is held and fixed by double-face tape or adhesion so as to engage with the supporting faces 446M of the holding member 446.

The liquid crystal panels 441R, 441G, and 441B are stored in the storing portion 444A1 of the recessed frame member 444A of the holding frame 443. Subsequently, the supporting plate 444B of the holding frame 443 is attached from the liquid crystal panel insertion side of the recessed frame member 444A, thereby pressing and fixing liquid crystal panels 441R, 441G, and 441B so as to hold them. Note that attaching of the supporting plate 444B to the recessed frame member 444A can be performed by engaging the hooks 444D of the supporting plate 444B with the hook engaging portions 444C of the recessed frame member 444A (light modulating device holding step).

The pins 447A of the holding member 446 are inserted into the holes 443D of the holding frame 443 storing the liquid crystal panels 441R, 441G, and 441B (holding frame mounting step).

The end face of the holding member 446 opposite to the pins 447A coated with adhesive agent is attached to the light flux incident side face side of the cross-dichroic prism 45(holding member mounting step). At this time, the holding member 446 is attached to the light flux incident end face of the cross-dichroic prism 45 by surface tension of the adhesive agent.

In a state with the adhesive agent unhardened, the position of the liquid crystal panels 441R, 441G, and 441B is adjusted (position adjusting step).

Following performing positional of adjustment of the liquid crystal panels 441R, 441G, and 441B, the adhesive agent is hardened, and fixed (adhesive agent hardening step).

Now, with the present embodiment, the holding member 446 is formed with a light-transmissive resin, so that using a photo-curing adhesive agent such as an ultraviolet curing adhesive agent enables the adhesive agent to be harden within a shorter time, and manufacturing time can be reduced.

Positional adjustment of the liquid crystal panels 441R, 441G, and 441B in the above-described position adjusting step is performed as follows.

First, with regard to the liquid crystal panel 441G which faces the projecting lens 46 directly, alignment adjustment (X-axial direction, Y-axial direction, θ direction adjustment) is performed with the plane of contact between the light flux incident end face of the cross-dichroic prism 45 and the holding member 446 as a sliding face, and focus adjustment (Z-axial direction, Xθ direction, Yθ direction adjustment) is performed by sliding the face of contact of the holding frame 443 and the holding member 446, i.e., sliding through the pins 447A. That is to say, alignment adjustment can be made in a state wherein the position of one of the cross-dichroic prism 45 and holding member 446 is fixed, by moving the other in the X-axial direction, Y-axial direction, and θ direction. Also, focus adjustment can be made in a state wherein the position of one of the holding frame 443 and holding member 446 is fixed, by moving the other in the Z-axial direction, Xθ direction, and Yθ direction.

Following adjusting the liquid crystal panel 441G to a predetermined position, the adhesive agent is hardened with hot air, a hot beam, ultraviolet rays, and so forth. Now, in the event of hardening the adhesive agent with light such as ultraviolet rays, hardening of the adhesive agent at the plate of contact of the holding frame 443 and the holding member 446 can be performed by irradiating light from the tip portion of the pins 447A of the holding member 446. Also, hardening of the adhesive agent at the plane of contact between the light flux incident end face of the cross-dichroic prism 45 and the holding member 446 can be performed by irradiating the light from six positions on the perimeter of the lower face side of the cross-dichroic prism 45 (opposite to the base 445).

Next, with the liquid crystal panel 441G of which positional adjustment and fixation has been completed as reference, positional adjustment and fixation is performed for the liquid crystal panels 441R and 441B, in the same manner as described above.

According to such a fourth embodiment, the following advantages can be realized.

Pins 447A for fixing the holding frame 443 to the holding member 446 are provided, and pins or spacers configured as independent parts are not used unlike the conventional POP structures, so that some or all of the above-described advantages described in the description of the first embodiment can be obtained.

Also, alignment adjustment (X-axial direction, Y-axial direction, θ direction adjustment) is performed with the plane of contact between the light flux incident end face of the cross-dichroic prism 45 and the holding member 446 as a sliding face, and focus adjustment (Z-axial direction, Xθ direction, Yθ direction adjustment) is performed by sliding the portion of contact of the holding frame 443 and the holding member 446, i.e., the holding frame 443 through the pins 447A. Accordingly, the position of the liquid crystal panels 441R, 441G, and 441B are determined by the positional relation of the holding member 446 and base 445 alone, without pins or spacers introduced, so that positional adjustment of the liquid crystal panels 441R, 441G, and 441B is easy, and positional misalignment following positional adjustment can be reduced. Accordingly, this can contribute to reduction in the manufacturing costs of the optical device and further the projector, and to improved image quality.

Further, the position of the liquid crystal panels 441R, 441G, and 441B is determined by the positional relation between the holding member 446 and the bases 445 without pins or spacers introduced, so that positional adjustment of the liquid crystal panels 441R, 441G, and 441B is easy, and positional misalignment of the liquid crystal panels 441R, 441G, and 441B following positional adjustment can be reduced. Accordingly, this can contribute to reduced manufacturing costs and improved image quality of the optical device and the projector.

The attachment portion 445B for fixing the optical device made up of the liquid crystal panels 441R, 441G, and 441B and the cross-dichroic prism 45 to the lower housing 471 is formed integrally with the bases 445, so that the space around the optical device can be reduced. Accordingly, this can promote reduction in size and reduction in weight of the projector.

Also, the attachment portion 445B is attached to an attachment portion 473 attached on the top of bosses 476 on the front side of the optical device in the detaching direction, so that there is no need to remove screws 475 or insert a screwdriver for tightening again into the optical parts housing 47 in the event of replacing optical parts. Accordingly, there is no worry of damaging the field lens 417 and the like stored in the optical parts housing 47 with a screwdriver, and the replacing work is easy. Also, due to the attachment portion 445B being at the front side, the arms 445C of the attachment portion 445B extending out in four directions will not strike the field lens 417 or the like within the optical parts housing 47 at the time of replacing. Replacing work is easy from such a perspective, as well. Accordingly, this can contribute to reduction in manufacturing costs of the optical device and the projector, and to improvement in after-sales service.

The holding frame 443 comprises a recessed frame member 444A for storing the liquid crystal panels 441R, 441G, and 441B, and a supporting plate 444B for pressing and fixing the stored liquid crystal panels 441R, 441G, and 441B. Accordingly, the storing and fixing of the liquid crystal panels 441R, 441G, and 441B can be carried out easily, and also stable holding and fixing of the liquid crystal panels 441R, 441G, and 441B can be performed.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bosses 476 on the projecting lens 46 side are integrally formed with the head portion 49, so that the head portion 49 can be reinforced with the bosses 476, and tilting due to fixation of the projecting lens 46 can be prevented even in the event that the head portion 49 is made correspondingly thinner. Accordingly, reduction in size of the optical parts housing 47, and further the optical unit 4, can be further promoted.

Further, the holding pieces 477 for holding the optical parts such as the field lens 417, dichroic mirrors 421 and 422, incident side lens 431, relay lens 433, and a polarizing plate 442 disposed on the light incident side of the liquid crystal panels 441R, 441G, and 441B, are also provided integrally with the bosses 476 on the side distanced from the projecting lens 46, and are accordingly reinforced, so that the holding pieces 477 and the surroundings can be made thinner, and reduction in size of the optical unit 4 can be promoted from this perspective as well.

The attachment portion 473 above the bosses 476 integrally formed with the head portion 49 is positioned on both sides of the projecting lens 46 in the radial direction and is provided distanced from the center axis X—X of the projecting lens 46 at the upper side (at the front side of the center axis X—X in the detaching direction), so that the arms 445C of the attachment portion 445B and the end portion 46A of the projecting lens 46 penetrating through and protruding from the head portion 49 do not mutually interfere. The width and thickness of the arms 445C can be increased correspondingly. Accordingly, the supporting strength of the liquid crystal panels 441R, 441G, and 441B and cross-dichroic prism 45 can be improved.

Also, the end portion 46A of the projecting lens 46 protrudes from the head portion 49 and is closer to the cross-dichroic prism 45, so that the back-focus of the projecting lens 46 can be shortened. Accordingly, more light can be taken in by the projecting lens 46, and a bright projected image can be obtained.

Further, with the present embodiment, the holding member 446 is formed of resin, so that the holding member 446 can be easily manufactured by injection molding or the like, thus leading to marked reductions in costs. Also, the weight of the holding member 446 can be reduced, thus yielding the advantage of promoting reduction in weight of the optical device and of the projector. The same advantages can be obtained by forming the holding member 446 of resin with the above-described three embodiments and the other following embodiments, as well.

Further, with the present embodiment, the holding member 446 is formed of a light-transmissive material, so that using a photo-curing adhesive agent for fixing the holding member 446 and the other parts allows these to be easily fixed. Accordingly, the manufacturing efficiency of the optical device and further the optical apparatus employing this can be improved. The same advantages can be obtained by configuring the holding member 446 of a light-transmissive material with the above-described three embodiments, and the other following embodiments, as well.

Further, notches 446L for hot behavioral difference absorption are formed on the rectangular plate-shaped member 446A making up the holding member 446, so that even in the event that stress is placed on the holding member 446 due to heat, deformation of the outer shape of the holding member 446 can be alleviated. Accordingly, positional misalignment of the liquid crystal panels 441R, 441G, and 441B due to heat can be avoided and these can be maintained at a suitable position; therefore, pixel misalignment of the projected image can be avoided, and a high-quality image can be obtained. The same advantages can be obtained by forming notches for hot behavioral difference absorption on the rectangular plate-shaped member 446A with the above-described three embodiments as well.

Moreover, supporting faces 446M for fixing an optically-compensating plate are formed on the holding member 446, so that a fixing structure for disposing the optically-compensating plate between the liquid crystal panels 441R, 441G, and 441B and the cross-dichroic prism 45 becomes unnecessary. Accordingly, reduction in costs, and reduction in size and weight of the optical device and further the projector can be promoted. Further, the optical element fixed to the supporting faces 446M is not restricted to an optically-compensating plate, and rather, a polarizing plate, phase difference plate (¼ wavelength plate, ½ wavelength plate, etc.), condenser lens, etc., may be fixed here. Also, with the present embodiment, the holding member 446 is formed of resin, but forming this with a material with relatively high heat conductivity such as metal or the like allows the heat of the optical element fixed to the supporting faces 446M to be efficiently dissipated through the holding member 446. Accordingly, deterioration due to heat of the optical element can be prevented, and this can contribute to high-quality images of the projector.

Moreover, projected images with a wide viewing angle and high contrast can be obtained by an optically-compensating plate being provided at the light emitting side of the liquid crystal panels 441R, 441G, and 441B. The same advantages can be obtained with the above-described three embodiments and the other following embodiments as well, by an optically-compensating plate being provided at the light emitting side of the liquid crystal panels 441R, 441G, and 441B.

Now, an arrangement may be made wherein, instead of the holding member 446 according to the present embodiment, a holding member 446 such as in the first through third embodiments (see FIG. 9, FIG. 15, FIG. 16) is used to fix the polarizing palate 442 or the like to engaging grooves 446C (see FIG. 9, FIG. 15, FIG. 16) on the holding member 446. In this case, the advantages obtained based on the holding member 446 of the first through third embodiments can be obtained instead of the advantages obtained based on the holding member 446 according to the present embodiment. Conversely, an arrangement may be made wherein, instead of the holding member 446 of the first through third embodiments, the holding member 446 according to the present embodiment is used to fix the optically-compensating plate to the supporting faces 446M. In this case, the advantages obtained based on the holding member 446 according to the present embodiment can be obtained instead of the advantages obtained based on the holding member 446 used for the optical devices of the first through third embodiments.

The fifth embodiment according to the present invention will be described next. In the following description, parts and structures the same as the fourth embodiment are denoted with the same reference numerals, and detailed description thereof will be omitted or simplified.

With the fourth embodiment, the polarizing plate 442 is fixed to the light flux incident end face of the cross-dichroic prism 45 directly with both-face tape or adhesive agent, and supporting faces 446M are formed on the left and right edges of the rectangular plate-shaped member 446A of the holding member 446 so that an optically-compensating plate can be attached.

Conversely, the fifth embodiment differs from the fourth embodiment in that two sets of supporting faces 446M and 446M1 are provided on the holding member 446, and that the polarizing plate 442 and the optically-compensating plate are fixed to the supporting faces 446M and 446M1. Other configurations and manufacturing methods are the same as the fourth embodiment.

Figure 18:
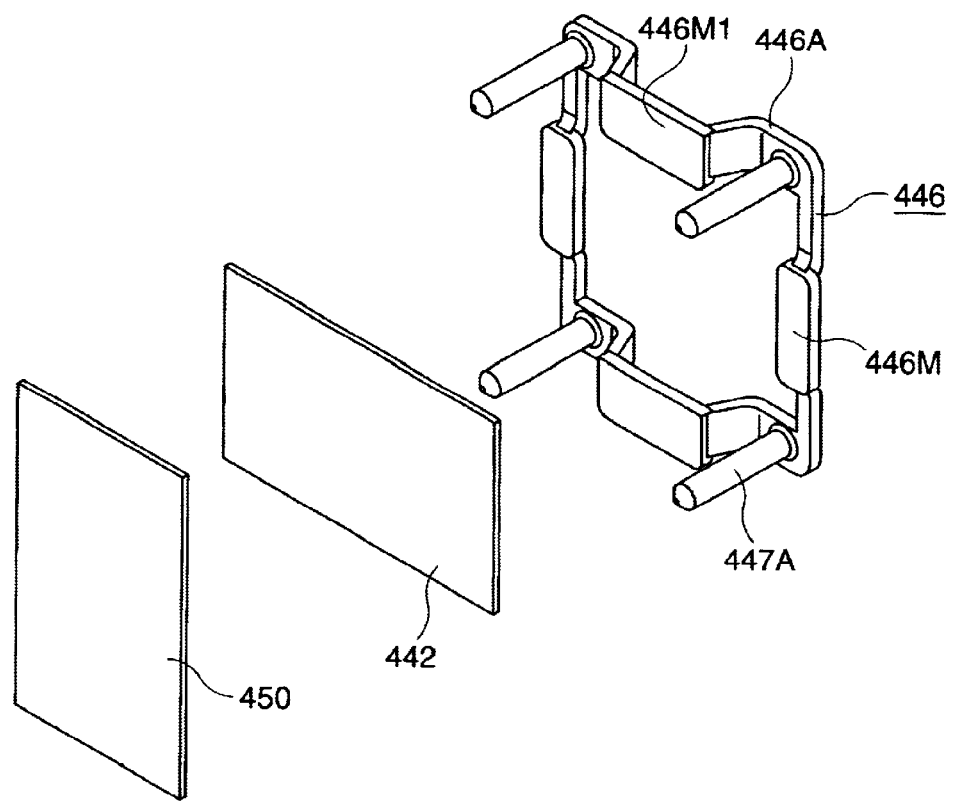
FIG. 18 is a disassembled perspective view illustrating the principal components of a fifth embodiment.

Specifically, as shown in FIG. 18, a first supporting face 446M and a second supporting face 446M1 are each formed on the left and right edges and the top and bottom edges of the rectangular plate-shaped member 446A of the holding member 446. The first supporting face 446M and second supporting face 446M1 are formed so that the height-wise dimensions of each from the rectangular plate-shaped member 446A (out-of-plane directional positions) are different.

Here, the polarizing plate 442 is fixed to the first supporting face 446M with double-face tape or an adhesive agent, and the optically-compensating plate 450 is similarly fixed to the second supporting face 446M1 with double-face tape or adhesive agent. The height-wise dimensions of the supporting face 446M and supporting face 446M1 differ from one another, so that the polarizing plate 442 and the optically-compensating plate 450 are fixed without interference therebetween.

According to such a fifth embodiment, there are the following advantages besides the advantages the same as the fourth embodiment.

The holding member 446 has two types of supporting faces 446M and 446M1 with different out-of-plane directional positions, so that two types of optical elements can be fixed in a state of not mutually interfering, without providing a fixing mechanism of separate parts. Thus, reduction in costs, and reduction in size and weight of the projector can be further promoted. Note that the optical elements to be fixed by the supporting faces 446M and 446M1 are not restricted to optically-compensating plates and polarizing plates, and may be phase difference plates (¼ wavelength plate, ½ wavelength plate, etc.), condenser lenses, etc.

A holding member 446 such as that of the present embodiment may be used as the holding member 446 in the first through third embodiments, and fix optically-compensating plates and the like to the supporting faces 446M. Using the holding member 446 according to the present embodiment allows the advantages obtained based on the holding member 446 according to the present embodiment to be obtained instead of the advantages obtained based on the holding member 446 used in these optical devices in the first through third embodiments.

The sixth embodiment according to the present invention will be described next. In the following description, parts and structures the same as the first embodiment are denoted with the same reference numerals, and detailed description thereof will be omitted or simplified. With the optical device according to the first embodiment, bases 445 are fixed to both the top and bottom faces of the cross-dichroic prism 45 (both of a pair of end faces intersecting the light flux incident end face), with the holding member being fixed by adhesion to the side faces of the bases 445.

Also, the cross-dichroic prism 45 is fixed in a state of being hung from the lower housing 471 by the base 445 fixed on the upper face thereof.

Also, the holding member 446 and holding frame 443 are mutually fixed by adhesion through pins 447A provided on the holding member 446 and holes 443D provided on the holding frame 443.

Further, the polarizing plate 442 is fixed to the engaging grooves 446C of the holding member 446 by double-face tape or adhesive agent.

Conversely, with the sixth embodiment, the base 445 is fixed only on the lower face of the cross-dichroic prism 45, and the cross-dichroic prism 45 is fixed to the lower housing 471 by the base 445 fixed to the lower face thereof.

Also, the holding member 446 is directly fixed by adhesion to the light flux incident end face of the cross-dichroic prism 45, and the holding frame 443 is fixed by adhesion to the holding member 446 with wedge-shaped spacers 448A introduced therebetween.

Further, the polarizing plate 442 is fixed to the light flux incident end face of the cross-dichroic prism 45 by double-face tape or adhesive agent.

Other configurations are the same as with the first embodiment.

Figure 19:
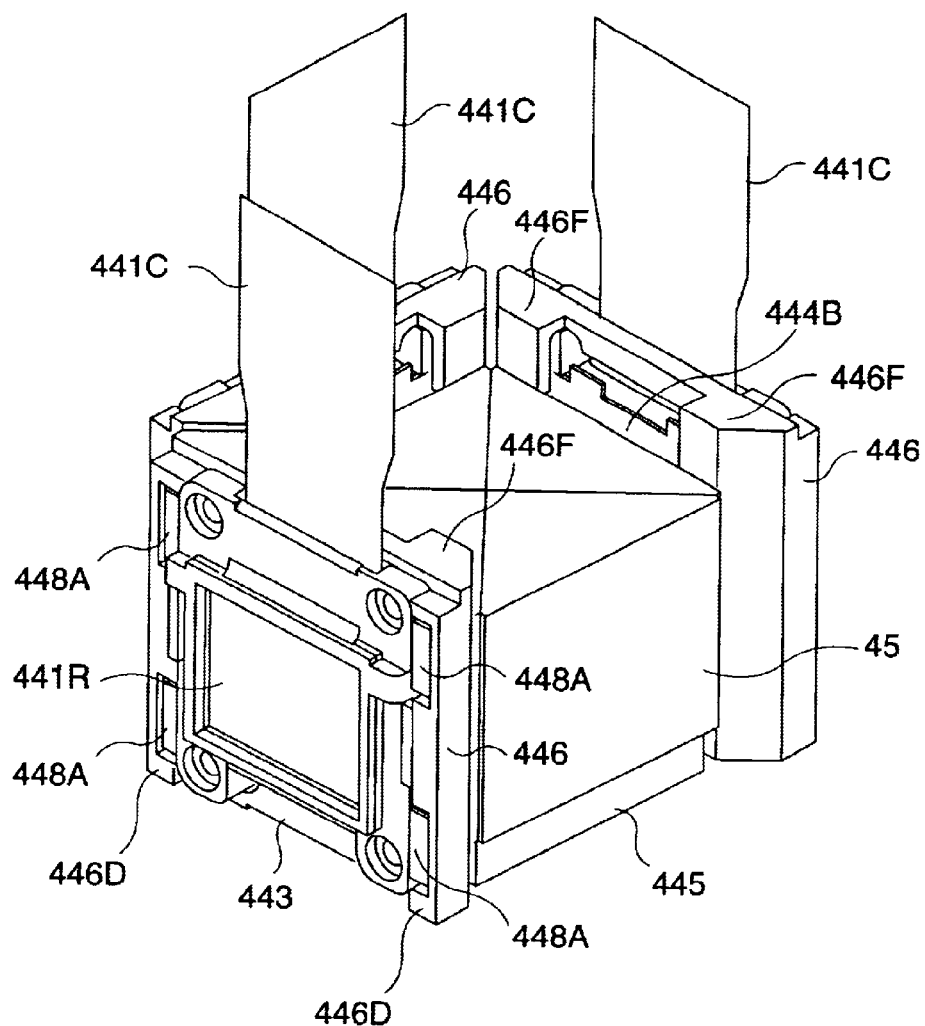
FIG. 19 is a perspective view representing the structure of an optical device according to a sixth embodiment.
Figure 20:
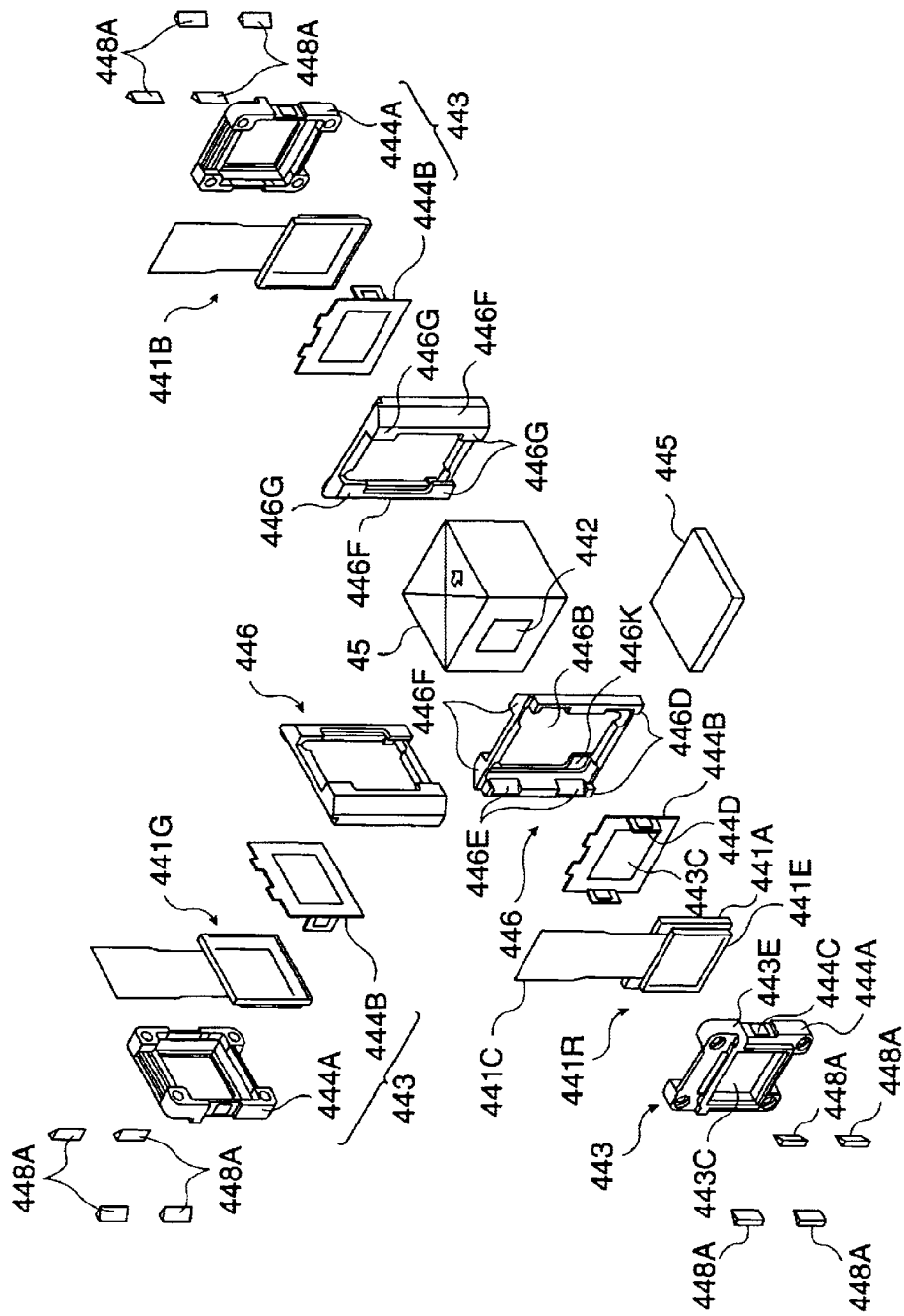
FIG. 20 is a disassembled view of FIG. 19.

Specifically, FIG. 19 is a perspective view of the state of attachment of the liquid crystal panels 441R, 441G, and 441B and cross-dichroic prism 45 according to the sixth embodiment, and FIG. 20 illustrates a disassembled view thereof. Here, the liquid crystal panels 441R, 441G, and 441B are attached to the cross-dichroic prism 45 mounted and fixed to the base 445, using the holding frame 443, holding member 446, and wedge-shaped spacers 448A.

The holding frame 443 differs somewhat with regard to the external view shown in the figure from the holding frame 443 (FIG. 9, etc.) according to the first embodiment, but the basic structure is the same as that described with the first embodiment, including the point that a light shielding film is provided on the light flux emitting side end face of the supporting plate 443B.

The holding member 446 is for holding the holding frame 443 where the liquid crystal panels 441R, 441G, and 441B are stored. The holding member 446 is fixed to the light flux incident end face of the cross-dichroic prism 45. Also, the holding member 446 has an opening 446B at approximately the center thereof. This opening 446B corresponds to the image formation region of the liquid crystal panels 441R, 441G, and 441B when the liquid crystal panels 441R, 441G, and 441B are mounted. A light shielding film (omitted in the drawings) is provided at the light flux emitting side end face of the holding member 446, as with the holding frame 443.

Erected pieces 446D formed so as to cover the side edges of the holding frame 443, and a supporting piece 446K for supporting the light emitting side face of the holding frame 443, are formed on the light incident side of the holding member 446. Also, protrusions 446F are provided to both left and right sides of the light emitting side face. These protrusions form a partial gap between the cross-dichroic prism 45 and the holding member 446. This gap forms an air path for cooling the liquid crystal panels 441R, 441G, and 441B and the optical elements such as the polarizing plate and the like disposed in the vicinity thereof.

Also, in the event that replacing the liquid crystal panels 441R, 441G, and 441B becomes necessary at the time of manufacturing or following manufacturing, a tool such as a screwdriver or the like can be inserted into the gap, thereby allowing peeling the holding member 446 and the cross-dichroic prism 45 away from one another. Contact faces 446G with the cross-dichroic prism 45 are provided on the upper and lower end portions of the protrusions 446F. The height of protrusion of the erected pieces 446D is approximately equal to the thickness of the holding frame 443, and the length of the erected pieces 446D in the height direction is approximately equal to the height of the holding frame 443. Also, the inner spacing of the erected pieces 446D is somewhat wider than the width of the holding frame 443. Also, a focus adjustment clearance is provided between the light emitting side face of the holding frame 443 and the light incident side face of the holding member 446. Further, inclined faces 446E are formed on the inner side of the erected pieces 446D of the holding member 446, so that wedge-shaped spacers 448A for fixing the holding frame 443 and the holding member 446 can be inserted between this inclined face 446E and the holding frame 443. The inclined faces 446E are formed horizontally symmetrical on the upper and lower ends of the left and right erected pieces 446D.

The wedge-shaped spacers 448A are used for positioning the liquid crystal panels 441R, 441G, and 441B and for fixing the holding frame 443 and holding member 446. Here, four wedge-shaped spacers 448A are used. As with the cases of the base 445, holding member 446, and holding frame 443, the wedge-shaped spacers 448A can be configured of resins such as acrylic material, polycarbonate containing carbon filler, polyphenylene sulfide, liquid crystal resin, or the like, or metals which are light in weight and have excellent thermal conductivity such as aluminum, magnesium, titanium, or alloys thereof. The wedge-shaped spacers 448A are used for attaching the holding frame 443 and holding member 446, and taking into consideration the dimensional change due to heat, a material with a thermal expansion coefficient close to that of the holding frame 443 and holding member 446, or a material with a thermal expansion coefficient between that of the holding frame 443 and holding member 446, is preferably used. Particularly, forming the holding frame 443, the holding member 446, and the spacers 448A, of the same material, is preferable. Also, it is preferable that the thermal expansion coefficient of the material making up the components 443, 446, and 448A, is as close as possible to that of the glass making up the cross-dichroic prism 45.

The base 445 is for mounting and fixing the cross-dichroic prism 45 in the center thereof. The base 445 is fixed to the lower housing 471 (FIG. 6) by screws or the like.

The following is a description of a first manufacturing method of the optical device according to the present embodiment.

First, the polarizing plate 442 is fixed to the cross-dichroic prism 45 (polarizing plate fixing step).

The cross-dichroic prism 45 with the polarizing plate 442 fixed thereto is fixed on the center of the base 445 (base fixing step).

Also, the liquid crystal panels 441R, 441G, and 441B are stored in the recessed frame member 444A of the holding frame 443. Subsequently, the supporting plate 444B of the holding frame 443 is attached from the liquid crystal panel insertion side of the recessed frame member 444A, thereby pressing and fixing liquid crystal panels 441R, 441G, and 441B so as to hold them. Note that attaching of the supporting plate 444B to the recessed frame member 444A can be performed by engaging the hooks 444D of the supporting plate 444B with the hook engaging portions 444C of the recessed frame member 444A (light modulating device holding step).

Next, the holding frame 443 storing the liquid crystal panels 441R, 441G, and 441B is stored between the left and right erected pieces 446D of the holding member 446, and brought into contact with the supporting piece 446K (holding frame mounting step).

The contact faces 446G of the holding member 446 are attached to the light flux incident end face of the cross-dichroic prism 45 with an adhesive agent (holding member mounting step). At this time, the holding member 446 is adhered to the light flux incident end face of the cross-dichroic prism 45 by surface tension of the adhesive agent.

Wedge-shaped spacers 448A coated with adhesive agent thereupon are inserted between the inclined faces 446E formed on the inner side face of the erected pieces 446D and the perimeter 443E of the holding frame 443 (spacer mounting step). At this time, the spacers 448A are attached to the inclined faces 446E and the perimeter face 443E of the holding frame 443, due to the surface tension of the adhesive agent.

Further, in a state with the adhesive agent at the contact face of the holding member 446 and the cross-dichroic prism 45 and the adhesive agent applied on the wedge-shaped spacers unhardened, the position of the liquid crystal panels 441R, 441G, and 441B is adjusted (position adjusting step).

Following performing positional adjustment of the liquid crystal panels 441R, 441G, and 441B, the adhesive agent is hardened (adhesive agent hardening step).

Positional adjustment of the liquid crystal panels 441R, 441G, and 441B as to the cross-dichroic prism 45 in the above position adjusting step is performed as follows.

First, with regard to the liquid crystal panel 441 which faces the projecting lens 46 (FIG. 7, etc.) directly, alignment adjustment (X-axial direction, Y-axial direction, θ direction adjustment) is performed with the plane of contact between the light flux incident end face of the cross-dichroic prism 45 and the holding member 446 as a sliding face, and focus adjustment (Z-axial direction, Xθ direction, Yθ direction adjustment) is performed by sliding the portion of contact of the holding frame 443 and the holding member 446. That is to say, alignment adjustment can be made in a state wherein one of the cross-dichroic prism 45 and holding member 446 is fixed, by moving the other in the X-axial direction, Y-axial direction, and θ direction. Also, focus adjustment can be made in a state wherein one of the holding frame 443 and holding member 446 is fixed, by moving the other in the Z-axial direction, Xθ direction, and Yθ direction. At this time, the wedge-shaped spacers 448A slide in the direction shown by the arrow in FIG. 21 in accordance with the movement of the holding frame 443 or the holding member 446. Following adjusting the liquid crystal panel 441G to a predetermined position, the adhesive agent is hardened with hot air, a hot beam, ultraviolet rays, or the like.

Next, positional adjustment and fixation of the liquid crystal panels 441R and 441B is performed with the liquid crystal panel 441G regarding which positional adjustment and fixing has been completed, as a reference.

Also, the optical device according to the present embodiment can be manufactured with a second manufacturing method such as described below.

First, the polarizing plate 442 is fixed to the cross-dichroic prism 45 (polarizing plate fixing step).

The cross-dichroic prism 45 with the polarizing plate 442 fixed thereto is fixed on the center of the base 445 (base fixing step).

Also, the liquid crystal panels 441R, 441G, and 441B arc stored in the recessed frame member 444A of the holding frame 443. Further, the supporting plate 444B is attached to the recessed frame member 444A from the light emitting side of the liquid crystal panels 441R, 441G, and 441B, thereby pressing and fixing the liquid crystal panels 441R, 441G, and 441B so as to hold them. Note that attaching of the supporting plate 444B to the recessed frame member 444A can be performed by engaging the hooks 444D of the supporting plate 444B with the hook engaging portions 444C of the recessed frame member 444A (light modulating device holding step).

The contact faces 446G of the holding member 446 are attached to the light flux incident end face of the cross-dichroic prism 45 using the adhesive agent (holding member adhesion step).

The holding frame 443 storing and holding the liquid crystal panels 441R, 441G, and 441B is stored between the left and right erected pieces 446D of the holding member 446, and brought into contact with the supporting piece 446K (holding frame mounting step).

Wedge-shaped spacers 448A coated with adhesive agent thereupon are inserted between the inclined faces 446E formed on the inner side face of the erected pieces 446D and the perimeter 443E of the holding frame 443 (spacer mounting step). At this time, the spacers 448A are attached to the inclined faces 446E and the perimeter 443E of the holding frame 443, due to the surface tension of the adhesive agent.

Further, in a state with the adhesive agent applied on the wedge-shaped spacers unhardened, the position of the liquid crystal panels 441R, 441G, and 441B is adjusted (position adjusting step).

Following performing positional adjustment of the liquid crystal panels 441R, 441G, and 441B, the adhesive agent is hardened (adhesive agent hardening step).

Positional adjustment of the liquid crystal panels 441R, 441G, and 441B in the position above adjusting step is performed as follows.

Figure 21:
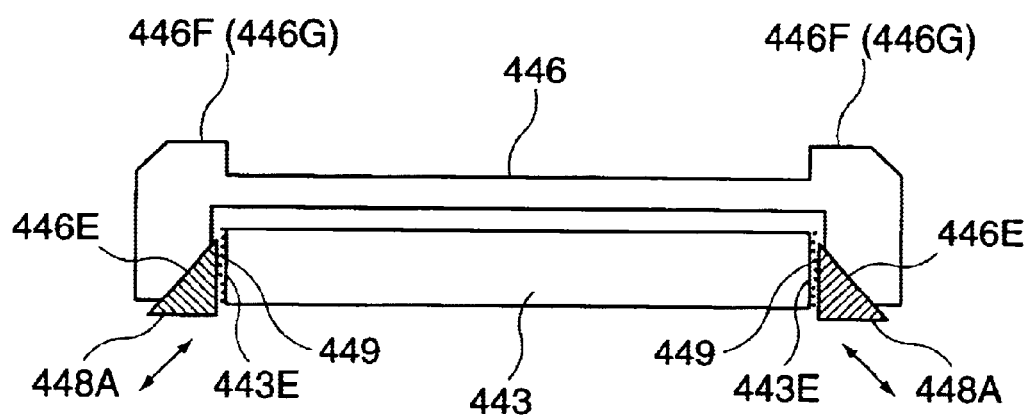
FIG. 21 is an explanatory diagram illustrating the placement and operations of wedge-shaped spacers in the sixth embodiment.

First, with regard to the liquid crystal panel 441G which faces the projecting lens 46 (FIG. 7, etc.) directly, alignment adjustment (X-axial direction, Y-axial direction, θ direction adjustment) and focus adjustment (Z-axial direction, Xθ direction, Yθ direction adjustment) is performed by sliding the portion of contact between the holding frame 443 and the holding member 446, i.e., the wedge-shaped spacers 448A in the direction of the arrows in FIG. 21. In other words, alignment adjustment and focus adjustment can be made by moving the holding frame 443 in the X-axial direction, Y-axial direction, θ direction, and Z-axial direction, Xθ direction, and Yθ direction. At this time, the wedge-shaped spacers 448A slide in the direction shown by the arrow in FIG. 21 in accordance with the movement of the holding frame 443. Following adjusting the liquid crystal panel 441G to a predetermined position, the adhesive agent is hardened with hot air, a hot beam, ultraviolet rays, or the like.

Next, positional adjustment and fixing of the liquid crystal panels 441R and 441B is performed with the liquid crystal panel 441G regarding which positional adjustment and fixing has been completed, as a reference.

With regard to the fixing of the holding frame 443 and the holding member 446 in the above two types of manufacturing methods, for example, first, temporary fixing can be made in spots with regard to the adhesive agent around the spacers 448A, and the adhesive agent is filled in the gap between the inclined faces 446E and the perimeter 443E of the holding frame 443 so as to fix permanently. By employing such a fixing method, the holding frame 443 and the holding member 446 can be securely fixed in a short time. Also, adhesive agent is filled in the gap-between the inclined faces 446E and the perimeter 443E of the holding frame 443, so that positional misalignment of the spacers 448A due to thermal stress or the like following positional adjustment can be prevented, and the positions of the liquid crystal panels 441R, 441G, and 441B are maintained at a suitable state.

Now, attaching of the liquid crystal panels 441R, 441G, and 441B to the cross-dichroic prism 45 does not necessarily have to be performed in the above order. For example, in the event of using solder as an adhesive agent, an arrangement is sufficient wherein the parts are mounted without adhesive agent in the above manufacturing steps, and following the positional adjustment, the cross-dichroic prism 45, holding member 446, spacers 448A, and holding frame 443 are fixed with solder. This is true for optical devices according to other embodiments which are manufactured with the same method as the present embodiment.

The liquid crystal panels 441R, 441G, and 441B and cross-dichroic prism 45 thus integrated are fixed to the lower housing 471 (FIG. 6) by screws or the like, using the base 445 on the bottom.

According to such a sixth embodiment, there are the following advantages.

The light flux incident end face of the cross-dichroic prism 45 and the face of the holding member 446 are fixed without position adjusting parts such as pins or spacers introduced therebetween. That is to say, while the positions of the liquid crystal panels 441R, 441G, and 441B are fixed relative to the light flux incident end face of the cross-dichroic prism 45 through the spacers 448A, no spacers exist between the holding member 446 and the light flux incident end face of the cross-dichroic prism 45. Moreover, the spacers are positioned between the erected pieces 446D of the holding member 446 formed so as to cover the side edge of the liquid crystal panels 441R, 441G, and 441B, and the holding frame 443 which holds the liquid crystal panels 441R, 441G, and 441B. Accordingly, positional adjustment of the liquid crystal panels 441R, 441G, and 441B is easy, and the effects that the positional misalignment of spacers 448A following positional adjustment have on the positional misalignment of the liquid crystal panels 441R, 441G, and 441B are relatively small. Accordingly, this can contribute to reduction in manufacturing costs and improved image quality of the optical device and further the projector employing this.

Also, according to the first manufacturing method of the optical device relating to the sixth embodiment, alignment adjustment (X-axial direction, Y-axial direction, θ direction adjustment) is performed with the plane of contact between the light flux incident end face of the cross-dichroic prism 45 and the holding member 446 as a sliding face, and focus adjustment (Z-axial direction, Xθ direction, Yθ direction adjustment) is performed by sliding the portion of contact of the holding frame 443 and the holding member 446. Accordingly, the position of the liquid crystal panels 441R, 441G, and 441B are determined by the positional relation of the holding member 446 and base 445 alone, without pins or spacers introduced, so that positional adjustment of the liquid crystal panels 441R, 441G, and 441B is easy, and positional misalignment following positional adjustment can be reduced. Accordingly, this can contribute to reduction in the manufacturing costs of the optical device and further the projector, and to improved image quality.

The holding frame 443 comprises a recessed frame member 444A for storing the liquid crystal panels 441R, 441G, and 441B, and a supporting plate 444B for pressing and fixing the stored liquid crystal panels 441R, 441G, and 441B. Accordingly, the storing and fixing of the liquid crystal panels 441R, 441G, and 441B can be carried out easily, and also stable holding and fixing of the liquid crystal panels 441R, 441G, and 441B can be performed.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat; effects on the image quality of the projected image can be alleviated.

Also, the holding member 446 has protrusions 446F at the face of contact with the cross-dichroic prism 45, and these protrusions and the cross-dichroic prism 45 form a partial gap whereby, in the event that replacing the liquid crystal panels 441R, 441G, and 441B becomes necessary at the time of manufacturing or following manufacturing, a tool such as a screwdriver or the like can be inserted into the gap, thereby allowing easy peeling of the holding member 446 and the cross-dichroic prism 45 away from one another. Accordingly, this can contribute to reduction in manufacturing costs of the optical device and further the projector, and to improvement in after-sales service. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

Also, erected pieces 446D of the holding member 446 are formed so as to cover the side edges of the holding frame. Accordingly, the light leaking out from between the holding frame 443 and the liquid crystal panels 441R, 441G, and 441B can be shielded. Accordingly, the light leaking out from between the holding member 446 and the holding frame 443 can be shielded. That is to say, deterioration in contrast of the projected image or unclear images due to light that has leaked within the optical device and been taken into the projecting lens 46 can be prevented by these erected pieces 446D, so that high-quality images can be obtained.

With the present embodiment, an arrangement may be made wherein the holding frame 443 and holding member 446 are fixed without using the spacers 448A. In this case, the erected pieces 446D of the holding member 446 and the perimeter of the holding frame 443 are made to face one another with a gap therebetween wherein focus adjustment is possible or a gap wherein both focus adjustment and alignment adjustment are possible, and following adjusting the position of the liquid crystal panels 441R, 441G, and 441G, the holding member 446 and the holding frame 443 are fixed with adhesive agent. Also, in the event of fixing the holding frame 443 and holding member 446 without using the spacers 448A, it is preferable that following fixing the holding frame 443 and holding member 446 with an adhesive agent or the like, these are made to face the light flux incident end face of the cross-dichroic prism 45, with adhesive agent being applied before adjusting the position of the liquid crystal panels 441R, 441G, and 441G, and positional adjustment is performed in a state that the adhesive agent is unhardened. Also, the adhesive agent may be applied following adjustment and hardened. Thus, fixing the holding frame 443 and holding member 446 without using the spacers 448A yields, in addition to the same advantages as the above (20) through (24), advantages as the above (1) and (5) described in the first embodiment.

The liquid crystal panels 441R, 441G, and 441B are not fixed to the light flux incident end face of the cross-dichroic prism unlike conventional POP structures, and rather fixed to the side face of bases 445 fixed on the top and bottom faces of the cross-dichroic prism 45, so that the size of the light flux incident end face of the cross-dichroic prism 45 can be kept to approximately the same size of an image formation region of the liquid crystal panels 441R, 441G, and 441B or somewhat larger than that. Further, the position of the liquid crystal panels 441R, 441G, and 441B is determined by the positional relation between the holding member 446 and the bases 445 without pins or spacers introduced, so that positional adjustment of the liquid crystal panels 441R, 441G, and 441B is easy, and positional misalignment of the liquid crystal panels 441R, 441G, and 441B following positional adjustment can be reduced. Accordingly, this can contribute to reduced manufacturing costs and improved image quality of the optical device and the projector.

The seventh embodiment according to the present invention will be described next.

In the following description, parts and structures the same as the sixth embodiment are denoted with the same reference numerals, and detailed description thereof will be omitted or simplified. With the optical device according to the sixth embodiment, attachment of the holding frame 443 to the holding member 446 is performed by two wedge-shaped spacers 448A each on the left and right sides.

Figure 22:
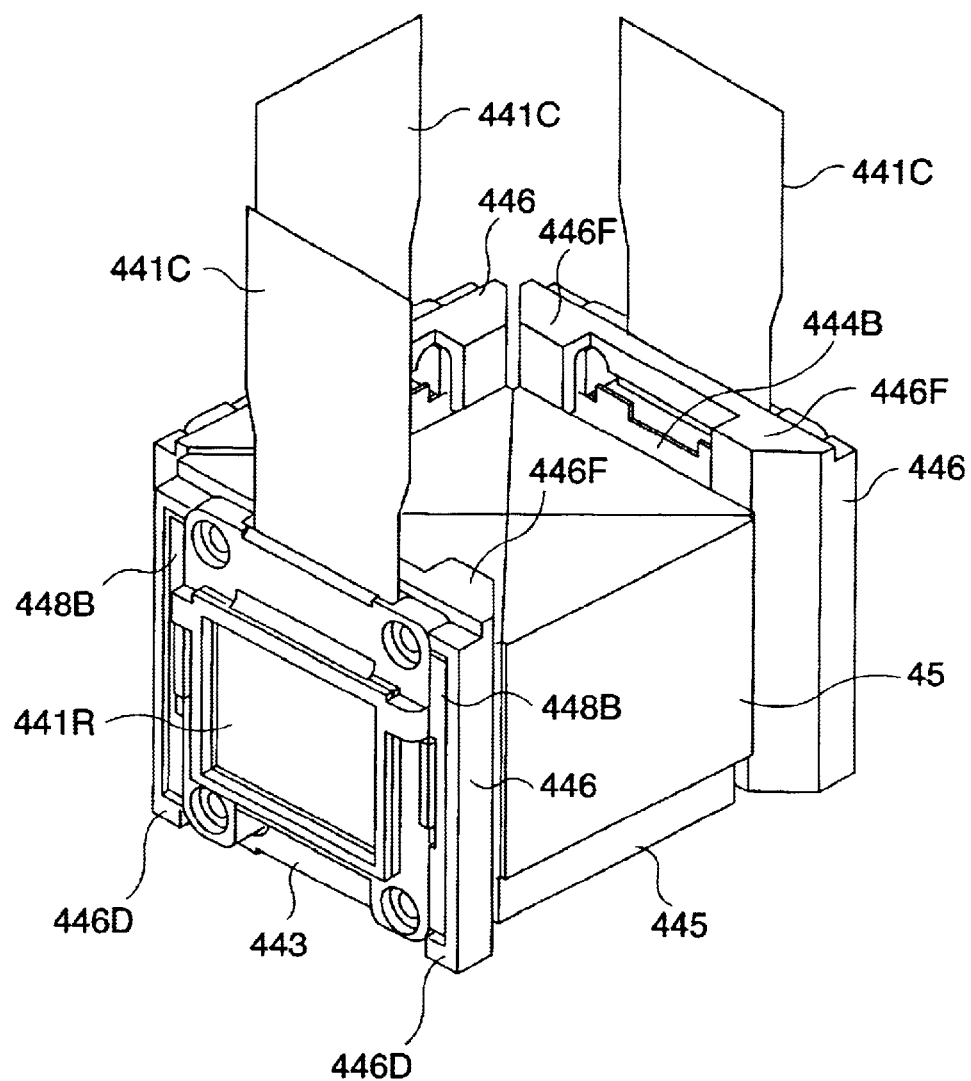
FIG. 22 is a perspective view representing the structure of an optical device according to a seventh embodiment.
Figure 23:
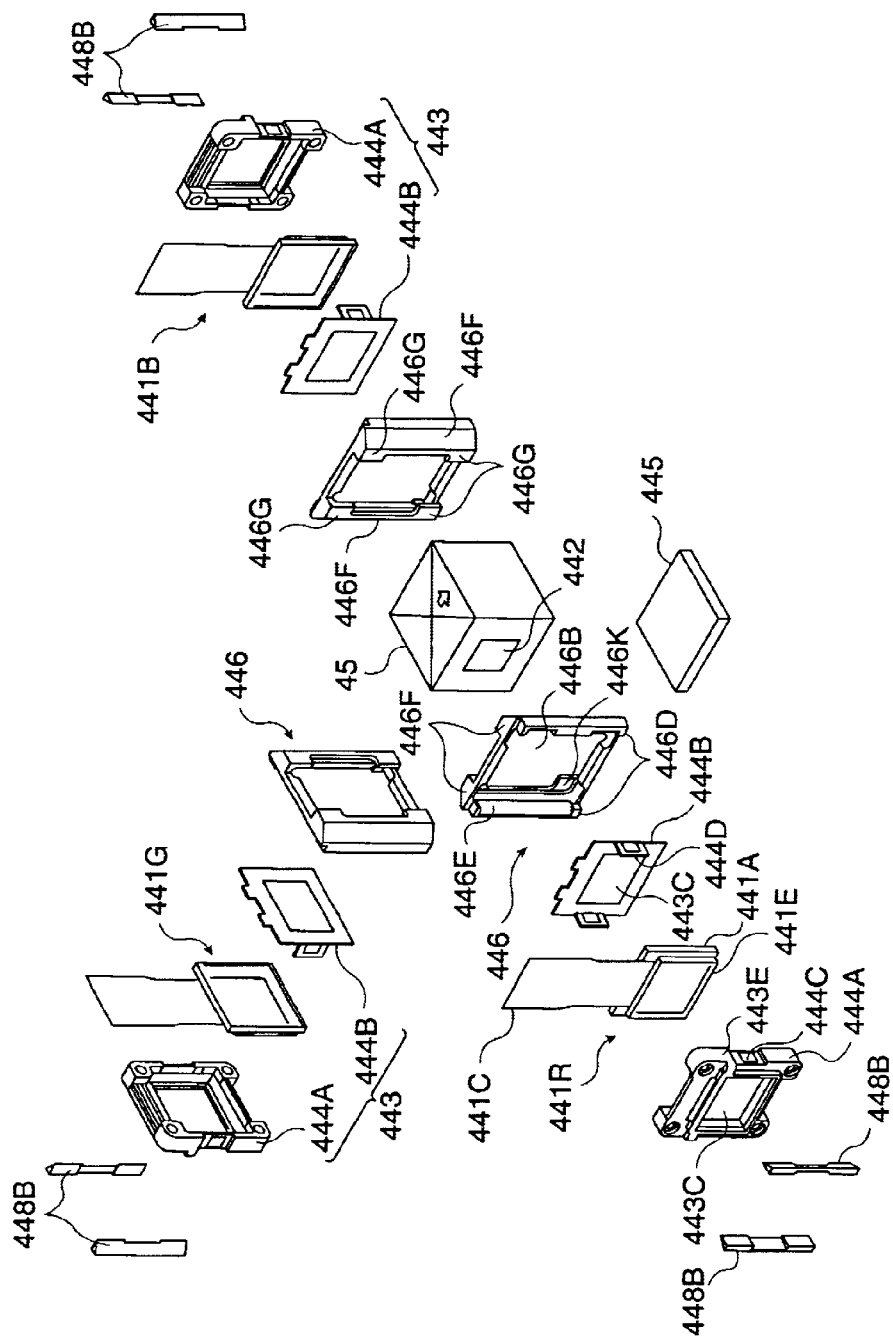
FIG. 23 is a disassembled view of FIG. 22.

Conversely, with the optical device according to the seventh embodiment, attachment of the holding frame 443 to the holding member 446 is performed by one wedge-shaped spacer 448B each on the left and right sides, as shown in FIG. 22 or FIG. 23. Specifically, a wedge-shaped spacer 448B is disposed over the entire length of the inclined face 446E of the erected piece 446D, forming the contact portion of the holding frame 443 and the holding member 446 at the top and bottom ends. Other configurations and manufacturing methods are the same as the sixth embodiment.

According to such a seventh embodiment, advantages the same as the sixth embodiment can be obtained. Also, the holding frame 443 and the holding member 476 are fixed by the minimally essential number of spacers 448B, so the number of parts is few, and the manufacturing costs of the optical device and further the projector can be reduced.

The eighth embodiment according to the present invention will be described next.

In the following description, parts and structures the same as the sixth embodiment are denoted with the same reference numerals, and detailed description thereof will be omitted or simplified.

With the sixth embodiment and seventh embodiment, fixing of the holding frame 443 to the holding member 446 is performed by a plurality of wedge-shaped spacers 448A or 448B.

Figure 24:
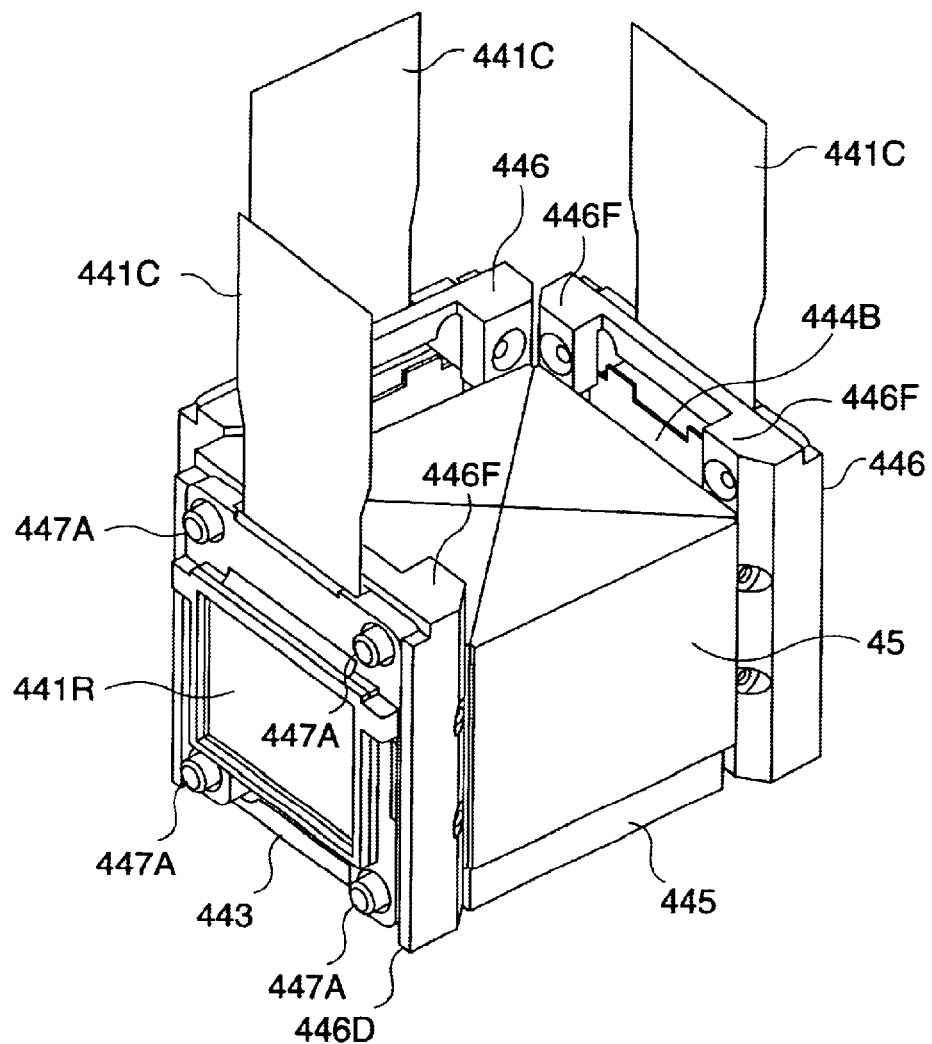
FIG. 24 is a perspective view representing the structure of an optical device according to an eighth embodiment.
Figure 25:
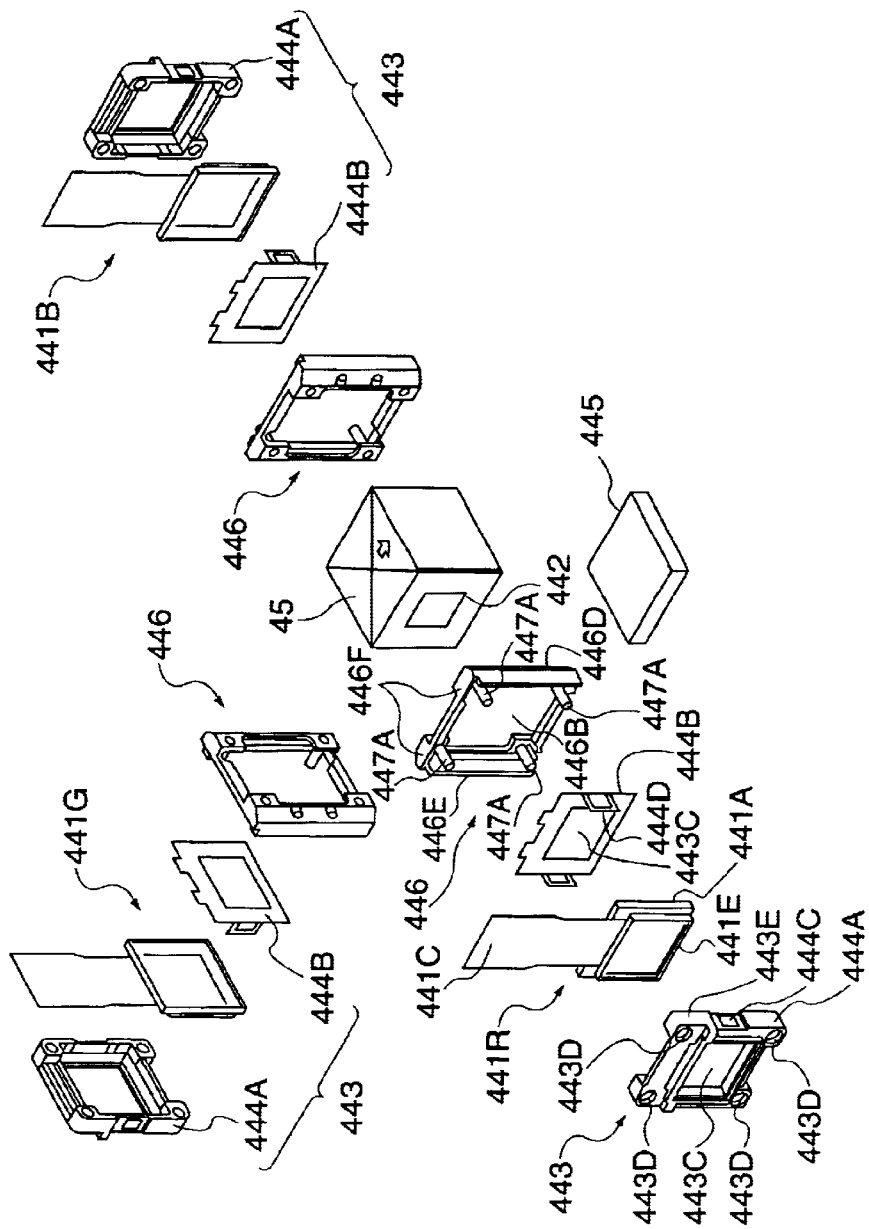
FIG. 25 is a disassembled view of FIG. 24.
Figure 26:
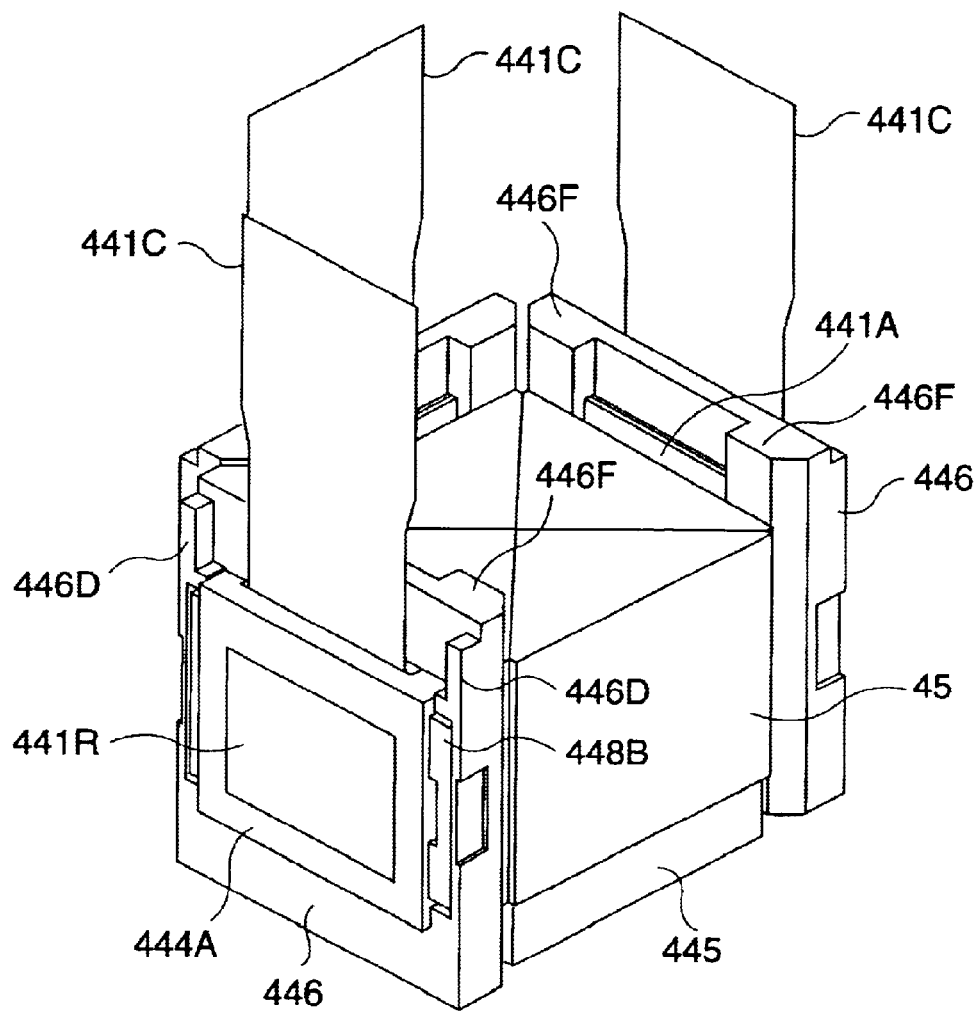
FIG. 26 is a perspective view representing the structure of an optical device according to a ninth embodiment.
Figure 27:
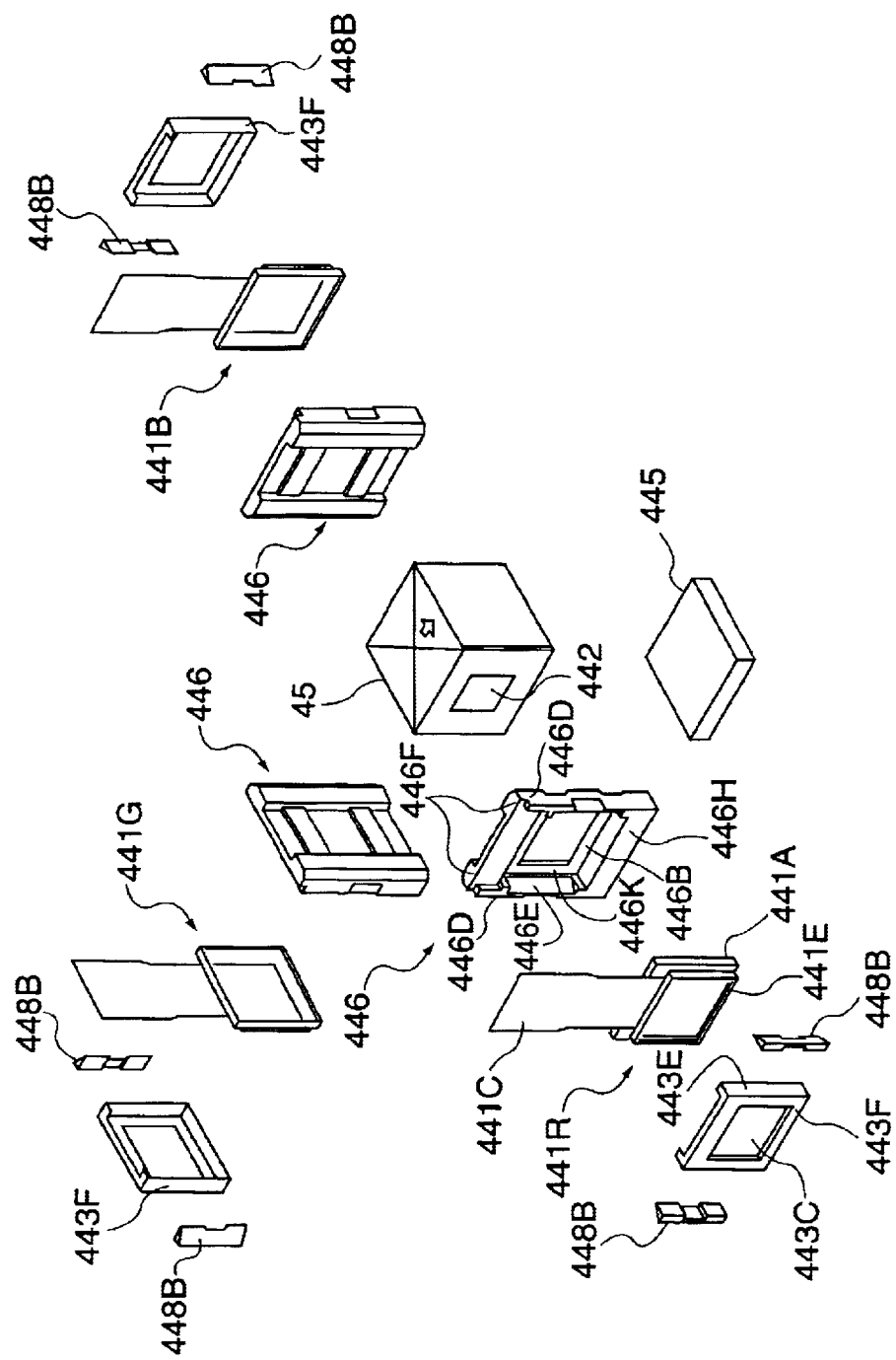
FIG. 27 is a disassembled view of FIG. 26.

Conversely, the eighth embodiment differs in that this fixing is performed by pins 447A provided in a protruding condition from the four corners of the face of the holding member 446 on the holding frame 443 side, and holes 443D formed in the four corners of the holding frame, as with the fourth embodiment and fifth embodiment, as shown in FIG. 24 or FIG. 25. Other configurations are the same as with the sixth embodiment. Now, the positions of the pins 447A do not need to be at the corners of the holding member 446. Also, the number of pins 447A is not restricted to four, with two or more being sufficient.

The manufacturing method of the optical devices according to the present embodiment is the same as that described with the fourth embodiment, except for the point that the step of holding and fixing and optically-compensating plate so as to engage with the supporting faces of the holding member does not exist.

According to such an eighth embodiment, the following advantages can be had.

Pins 447A for fixing the holding frame 443 to the holding member 446 are provided, and pins or spacers configured as independent parts are not used unlike the conventional POP structures, so that the number of parts is small. Also, the structure is simple, and manufacturing is easy. This can contribute to reduction in size and reduction in manufacturing costs of the optical device and further the projector.

Also, alignment adjustment (X-axial direction, Y-axial direction, θ direction) is performed with the face of contact between the light flux incident end face of the cross-dichroic prism 45 and the holding member 446 as a sliding face, and focus adjustment (Z-axial direction, Xθ direction, Yθ direction adjustment) is performed by sliding the portion of contact of the holding frame 443 and the holding member 446, i.e., the holding frame 443 through the pins 447A. Accordingly, the position of the liquid crystal panels 441R, 441G, and 441B are determined by the positional relation of the holding member 446 and base 445 alone, without pins or spacers introduced, so that positional adjustment of the liquid crystal panels 441R, 441G, and 441B is easy, and positional misalignment following positional adjustment can be reduced. Accordingly, this can contribute to reduction in the manufacturing costs of the optical device and further the projector, and to improved image quality.

The holding frame 443 comprises a recessed frame member 444A for storing the liquid crystal panels 441R, 441G, and 441B, and a supporting plate 444B for pressing and fixing the stored liquid crystal panels 441R, 441G, and 441B. Accordingly, the storing and fixing of the liquid crystal panels 441R, 441G, and 441B can be carried out easily, and also stable holding and fixing of the liquid crystal panels 441R, 441G, and 441B can be performed.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat, effects on the image quality of the projected image can be alleviated.

Also, the holding member 446 has protrusions 446F at the face of contact with the cross-dichroic prism 45, and these protrusions and the cross-dichroic prism 45 form a partial gap whereby, in the event that replacing the liquid crystal panels 441R, 441G, and 441B becomes necessary at the time of manufacturing or following manufacturing, a tool such as a screwdriver or the like can be inserted into the gap, thereby allowing easy peeling of the holding member 446 and the cross-dichroic prism 45 away from one another. Accordingly, this can contribute to reduction in manufacturing costs of the optical device and further the projector, and to improvement in after-sales service. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

Also, erected pieces 446D of the holding member 446 are formed so as to cover the side edges of the holding frame. Accordingly, the light leaking out from between the holding frame 443 and the liquid crystal panels 441R, 441G, and 441B can be shielded. Accordingly, the light leaking out from between the holding member 446 and the holding frame 443 can be shielded. That is to say, deterioration in contrast of the projected image or unclear images due to light that has leaked within the optical device and been taken into the projecting lens 46 can be prevented by these erected pieces 446D, so that high-quality images can be obtained.

The ninth embodiment according to the present invention will be described next.

In the following description, parts and structures the same as the seventh embodiment are denoted with the same reference numerals, and detailed description thereof will be omitted or simplified.

With the first embodiment through the eighth embodiment, the holding frame 443 for holding the liquid crystal panels 441R, 441G, and 441B is configured of a recessed frame member 444A for storing the liquid crystal panels 441R, 441G, and 441B, and a supporting plate 444B for pressing and fixing the stored liquid crystal panels 441R, 441G, and 441B.

Conversely, with the ninth embodiment, a holding frame 443F comprises a recessed frame for supporting the light incident side of the liquid crystal panels 441R, 441G, and 441B. The light emitting side thereof is not pressed and fixed by the supporting plate 444B, but rather directly stored and held in storing space 446H of the holding member 446. Other configurations are the same as the seventh embodiment.

Also, the manufacturing method of the optical device according to the present embodiment is the same as that described above with the sixth embodiment, except for the point that the light modulating device holding step in (c) ends with only storing the liquid crystal panels 441R, 441G, and 441B in the holding frame 443F configured of a recessed frame member.

According to such a ninth embodiment, the following advantages can be realized.

The holding frame 443F is configured without the supporting plate 444B, doing away with the need for the hook engaging portions for fixing the supporting plate 444B, and a plate member thinner than the recessed frame member 444A can be used and formed into a simple shape. Accordingly, the reduction in the number of parts and reduction in the number of assembly steps can be achieved, enabling reduction in manufacturing costs of the optical device and further the projector.

The light flux incident end face of the cross-dichroic prism 45 and the face of the holding member 446 are fixed without position adjusting parts such as pins or spacers introduced therebetween. That is to say, while the positions of the liquid crystal panels 441R, 441G, and 441B are fixed relative to the light flux incident end face of the cross-dichroic prism 45 through the spacers 448A, no spacers exist between the holding member 446 and the light flux incident end face of the cross-dichroic prism 45. Moreover, the spacers are positioned between the erected pieces 446D of the holding member 446 formed so as to cover the side edge of the liquid crystal panels 441R, 441G, and 441B, and the holding frame 443 which holds the liquid crystal panels 441R, 441G, and 441B. Accordingly, positional adjustment of the liquid crystal panels 441R, 441G, and 441B is easy, and the effects that the positional misalignment of spacers 448A following positional adjustment have on the positional misalignment of the liquid crystal panels 441R, 441G, and 441B are relatively small. Accordingly, this can contribute to reduction in manufacturing costs and improved image quality of the optical device and further the projector employing this.

Also, according to the first manufacturing method of the optical device relating to the sixth embodiment, alignment adjustment (X-axial direction, Y-axial direction, θ direction adjustment) is performed with the plane of contact between the light flux incident end face of the cross-dichroic prism 45 and the holding member 446 as a sliding face, and focus adjustment (Z-axial direction, Xθ direction, Yθ direction adjustment) is performed by sliding the portion of contact of the holding frame 443 and the holding member 446. Accordingly, the position of the liquid crystal panels 441R, 441G, and 441B are determined by the positional relation of the holding member 446 and base 445 alone, without pins or spacers introduced, so that positional adjustment of the liquid crystal panels 441R, 441G, and 441B is easy, and positional misalignment following positional adjustment can be reduced. Accordingly, this can contribute to reduction in the manufacturing costs of the optical device and further the projector, and to improved image quality.

Also, the holding member 446 has protrusions 446F at the face of contact with the cross-dichroic prism 45, and these protrusions and the cross-dichroic prism 45 form a partial gap whereby, in the event that replacing the liquid crystal panels 441R, 441G, and 441B becomes necessary at the time of manufacturing or following manufacturing, a tool such as a screwdriver or the like can be inserted into the gap, thereby allowing easy peeling of the holding member 446 and the cross-dichroic prism 45 away from one another. Accordingly, this can contribute to reduction in manufacturing costs of the optical device and further the projector, and to improvement in after-sales service. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality. Also, advantages based on the number of the spacers 448A described with the seventh embodiment can be obtained.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat, effects on the image quality of the projected image can be alleviated.

With the present embodiment, an arrangement may be made wherein the holding frame 443 and holding member 446 are fixed without using the spacers 448A. In this case, the erected pieces 446D of the holding member 446 and the perimeter of the holding frame 443F are made to face one another with a gap therebetween wherein focus adjustment is possible or a gap wherein both focus adjustment and alignment adjustment are possible, and following adjusting the position of the liquid crystal panels 441R, 441G, and 441G, the holding member 446 and the holding frame 443 are fixed with adhesive agent. It is preferable that the adhesive agent is applied before adjusting the position of the liquid crystal panels 441R, 441G, and 441G, and positional adjustment is performed in a state that the adhesive agent is unhardened. Also, the adhesive agent may be applied following adjustment and be hardened. Thus, fixing the holding frame 443F and holding member 446 without using the spacers 448A yields, in addition to the above advantages, the number of parts can be reduced in the first embodiment. Also, the structure is simple, and manufacturing is easy. This can contribute to reduction in size and reduction in manufacturing costs of the optical device and further the projector.

Further, the position of the liquid crystal panels 441R, 441G, and 441B is determined by the positional relation between the holding member 446 and the bases 445 without pins or spacers introduced, so that positional adjustment of the liquid crystal panels 441R, 441G, and 441B is easy, and positional misalignment of the liquid crystal panels 441R, 441G, and 441B following positional adjustment can be reduced. Accordingly, this can contribute to reduced manufacturing costs and improved image quality of the optical device and the projector.

The tenth embodiment according to the present invention will be described next.

In the following description, parts and structures the same as the sixth embodiment are denoted with the same reference numerals, and detailed description thereof will be omitted or simplified.

With the first embodiment through the eighth embodiment, the holding frame 443 for holding the liquid crystal panels 441R, 441G, and 441B is configured of a recessed frame member 444A for storing the liquid crystal panels 441R, 441G, and 441B, and a supporting plate 444B for pressing and fixing the liquid crystal panels 441R, 441G, and 441B.

Figure 28:
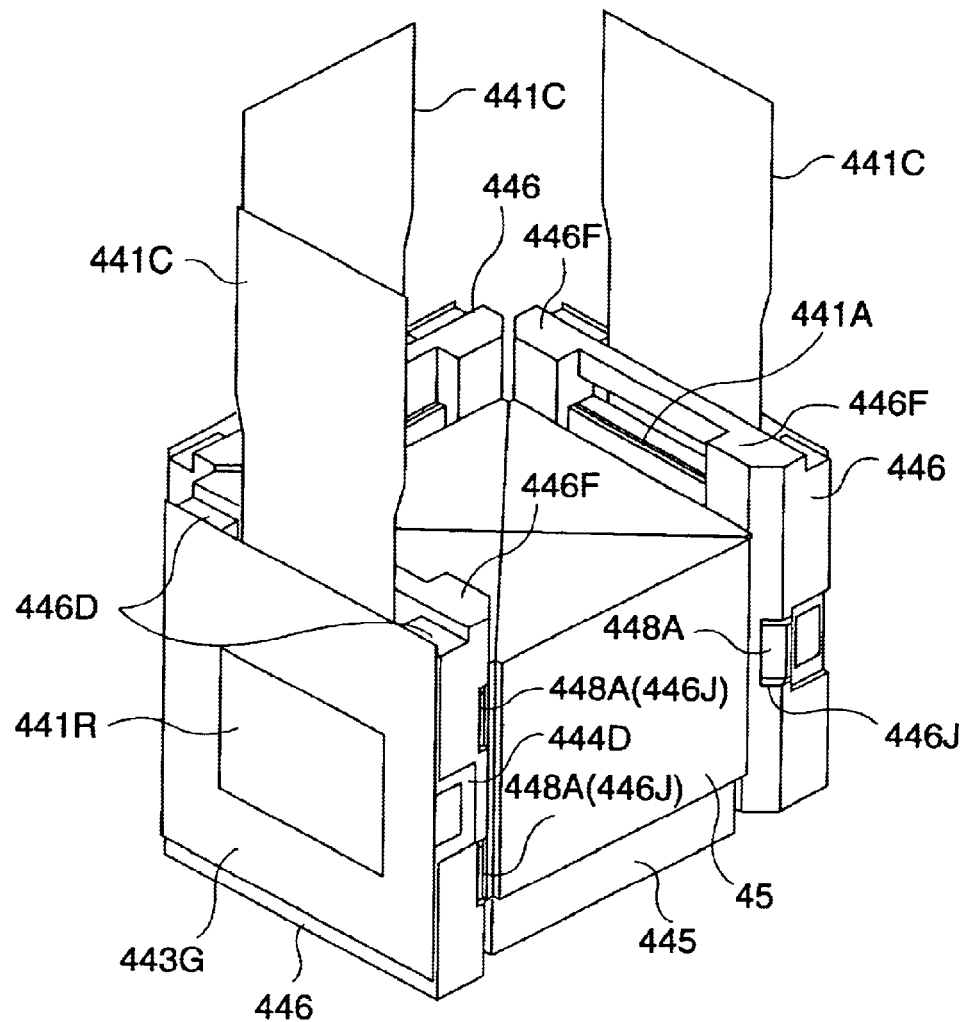
FIG. 28 is a perspective view representing the structure of an optical device according to a tenth embodiment.
Figure 29:
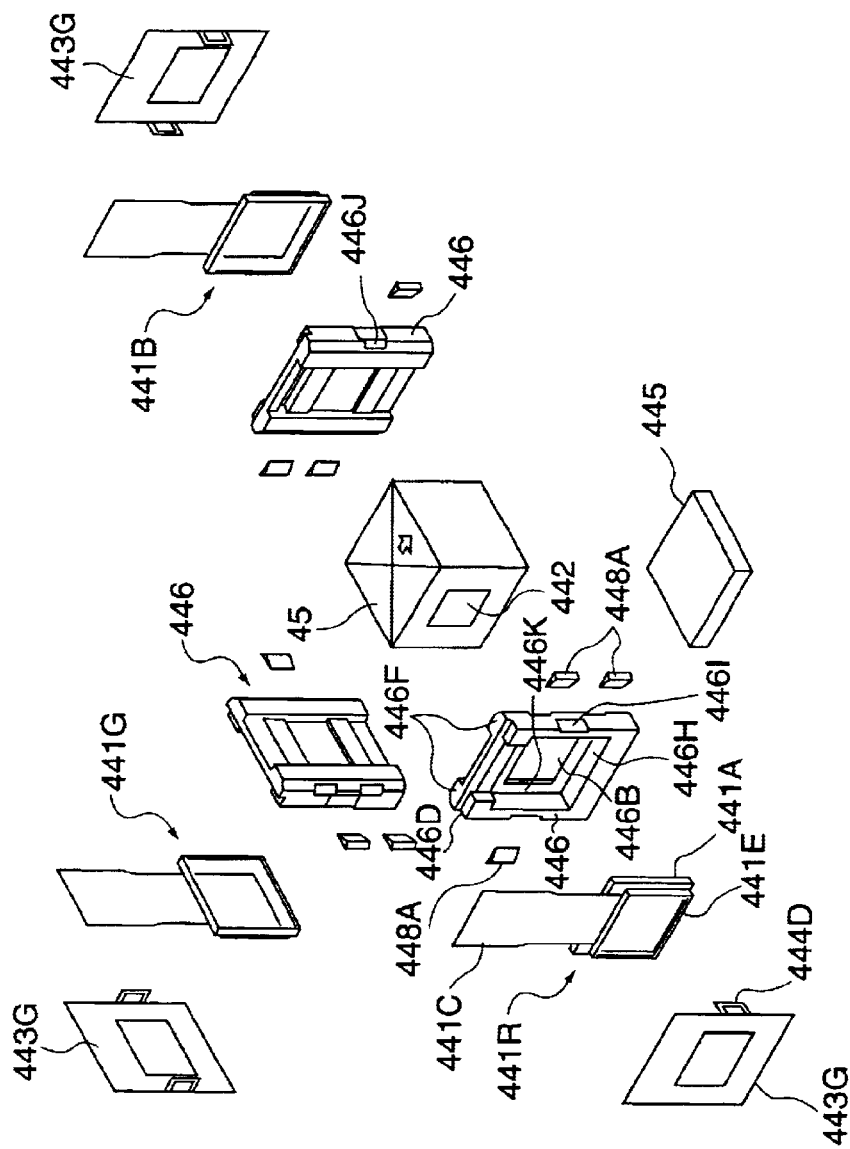
FIG. 29 is a disassembled view of FIG. 28.

Conversely, with the tenth embodiment, a holding frame 443G comprises a supporting plate for supporting the light incident side of the liquid crystal panels 441R, 441G, and 441B, as shown in FIG. 28 or FIG. 29.

The liquid crystal panels 441R, 441G, and 441B are stored and held in storing space 446H of the holding member 446, and the light incident side of the liquid crystal panels 441R, 441G, and 441B is pressed and fixed by the holding frame 443G configured of the supporting plate. The holding frame 443G configured of the supporting plate, and the holding member 446, are fixed by engaging of hooks 444D provided on the holding frame 443G and hook engaging portions 446I provided on the holding member 446.

Further, the holding member 446 according to the sixth embodiment has inclined faces 446E at the inner side of the erected pieces 446D for the spacers 448A to be inserted thereto (see FIG. 20), but the holding member 446 according to the present embodiment has no such inclined faces 446E. Instead, through holes 446J exposed on the left and right sides of the holding member 446 are provided on the erected pieces 446D of the holding member 446. The spacers 448A are inserted between the light emitting face of the liquid crystal panels 441R, 441G, and 441B, and the face of the holding member 446 at the side of the liquid crystal panels 441R, 441G, and 441B, from the outside of the holding member 446 through the through holes 446J. While three each of the spacers 448A and through holes 446J are provided, this may be two, four, or more.

Other configurations are the same as the sixth embodiment.

The manufacturing method for the optical device according to the present embodiment can be carried out as follows.

The polarizing plate 442 is fixed by adhesion to the light flux incident end face of the cross-dichroic prism 45 (polarizing plate fixing step).

The cross-dichroic prism 45 with the polarizing plate 442 fixed thereto is fixed on the center of the base 445 (base fixing step).

The contact faces 446G of the holding member 446 are attached to the light flux incident end face of the cross-dichroic prism 45 (holding member adhesion step).

The liquid crystal panels 441R, 441G, and 441B are stored in the storing space 446H of the holding member 446 (light modulating device holding step).

The holding frame 443G configured of the supporting plate is attached from the light incident side of the liquid crystal panels 441R, 441G, and 441B, the hooks 444D are engaged with the hook engaging portions 446C on the holding member 446, and the liquid crystal panels 441R, 441G, and 441B are pressed and fixed (holding frame mounting step).

Wedge-shaped spacers 448A with adhesive agent applied thereto are inserted into through holes 446J provided on the left and right side faces of the holding member 446, and moved while being brought into contact with both the face on the liquid crystal panels 441R, 441G, and 441B side of the holding member 446 and the light emitting face of the liquid crystal panels 441R, 441G, and 441B, thereby adjusting the position of the liquid crystal panels 441R, 441G, and 441B (position adjusting step).

Subsequently, the adhesive agent is hardened (adhesive agent hardening step).

According to such a tenth embodiment, the following advantages can be realized.

The light flux incident end face of the cross-dichroic prism 45 and the face of the holding member 446 are fixed without position adjusting members such as pins or spacers introduced between. That is to say, though the position of the liquid crystal panels 441R, 441G, and 441B is fixed relatively to the light flux incident end face of the cross-dichroic prism 45 with the spacers 448A introduced therebetween, but no spacers exist between the holding member 446 and the light flux incident end face of the cross-dichroic prism 45. Moreover, the spacers 448A are inserted between the light emitting face of the liquid crystal panels 441R, 441G, and 441B, and the face of the holding member 446 at the side of the liquid crystal panels 441R, 441G, and 441B, from the outside of the holding member 446, by the through holes 446J provided to the erected pieces 446D of the holding member 446. Accordingly, positional adjustment of the liquid crystal panels 441R, 441G, and 441B is easy, and the effects that the positional misalignment of spacers 448A following positional adjustment have on the positional misalignment of the liquid crystal panels 441R, 441G, and 441B are relatively small. Accordingly, this can contribute to reduction in manufacturing costs and improved image quality of the optical device and further the projector employing this.

Also, the holding frame 443G comprises a supporting plate alone, the liquid crystal panels 441R, 441G, and 441B are directly stored and held in storing space 446H of the holding member 446, and the light incident side of the liquid crystal panels 441R, 441G, and 441B is pressed and fixed by the holding frame 443G, so that the number of parts can be reduced, and the number of assembly steps can be reduced. Accordingly, the manufacturing costs of the optical device and further the projector can be reduced. Accordingly, positional adjustment of the liquid crystal panels 441R, 441G, and 441B is easy, and the effects that the positional misalignment of spacers 448A following positional adjustment have on the positional misalignment of the liquid crystal panels 441R, 441G, and 441B are relatively small. Accordingly, this can contribute to reduction in manufacturing costs and improved image quality of the optical device and further the projector employing this.

Also, the holding member 446 has protrusions 446F at the face of contact with the cross-dichroic prism 45, and these protrusions and the cross-dichroic prism 45 form a partial gap whereby, in the event that replacing the liquid crystal panels 441R, 441G, and 441B becomes necessary at the time of manufacturing or following manufacturing, a tool such as a screwdriver or the like can be inserted into the gap, thereby allowing easy peeling of the holding member 446 and the cross-dichroic prism 45 away from one another. Accordingly, this can contribute to reduction in manufacturing costs of the optical device and further the projector, and to improvement in after-sales service. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

Also, erected pieces 446D of the holding member 446 are formed so as to cover the side edges of the holding frame. Accordingly, the light leaking out from between the holding frame 443 and the liquid crystal panels 441R, 441G, and 441B can be shielded. Accordingly, the light leaking out from between the holding member 446 and the holding frame 443 can be shielded. That is to say, deterioration in contrast of the projected image or unclear images due to light that has leaked within the optical device and been taken into the projecting lens 46 can be prevented by these erected pieces 446D, so that high-quality images can be obtained.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat, effects on the image quality of the projected image can be alleviated.

The eleventh embodiment according to the present invention will be described next.

In the following description, parts and structures the same as the eighth embodiment are denoted with the same reference numerals, and detailed description thereof will be omitted or simplified.

With the eighth embodiment, the holding member 446 is fixed directly to the light flux incident end face of the cross-dichroic prism 45. Conversely, with the eleventh embodiment, a sapphire plate 451 with relatively high thermal conductivity is fixed to the light flux incident end face of the cross-dichroic prism 45, and the holding member 446 is fixed to the light flux incident end face of the cross-dichroic prism 45 across the sapphire plate.

Figure 30:
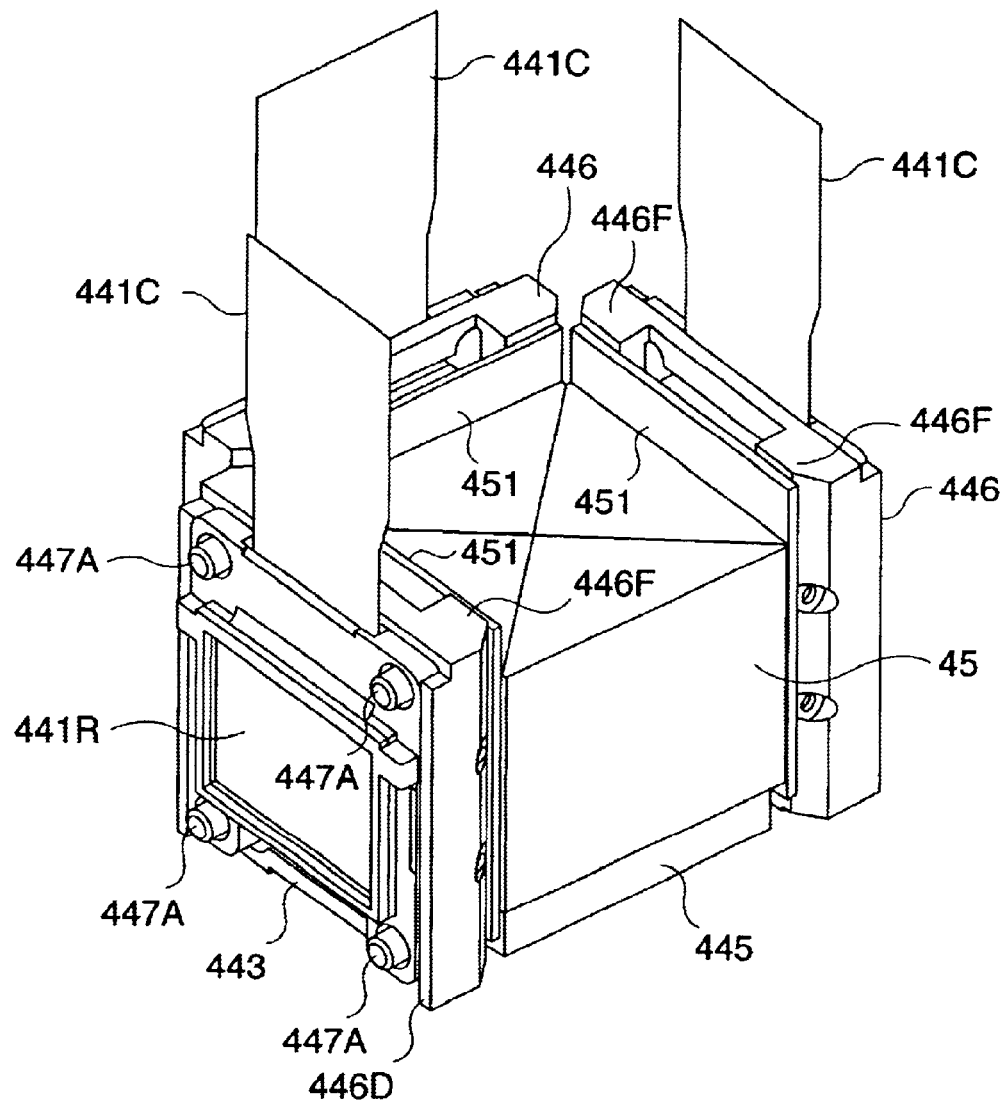
FIG. 30 is a perspective view representing the structure of an optical device according to an eleventh embodiment.
Figure 31:
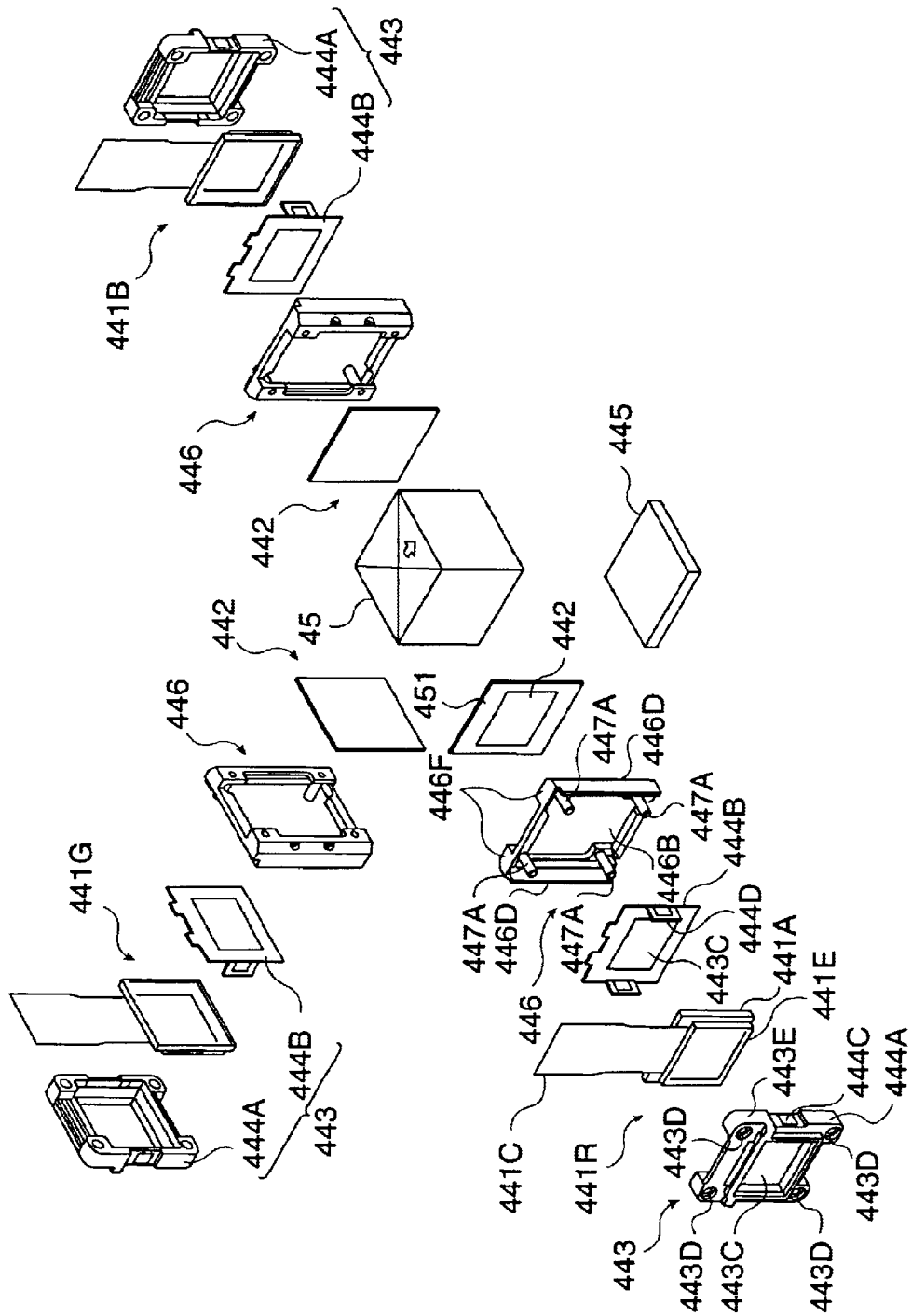
FIG. 31 is a disassembled view of FIG. 30.

Specifically, as shown in FIG. 30 or FIG. 31, a sapphire plate 451 is fixed by adhesion to almost the entire surface of the light flux incident end face of the cross-dichroic prism 45 using double-side tape or adhesive agent, and the polarizing plate 442 is bonded to the liquid crystal panel corresponding portion at the center portion of the sapphire plate 451 using double-side tape or adhesive agent. Also, the protrusions 446F of the holding member 446 are fixed to the sapphire plate 451 with an adhesive agent.

Figure 32:
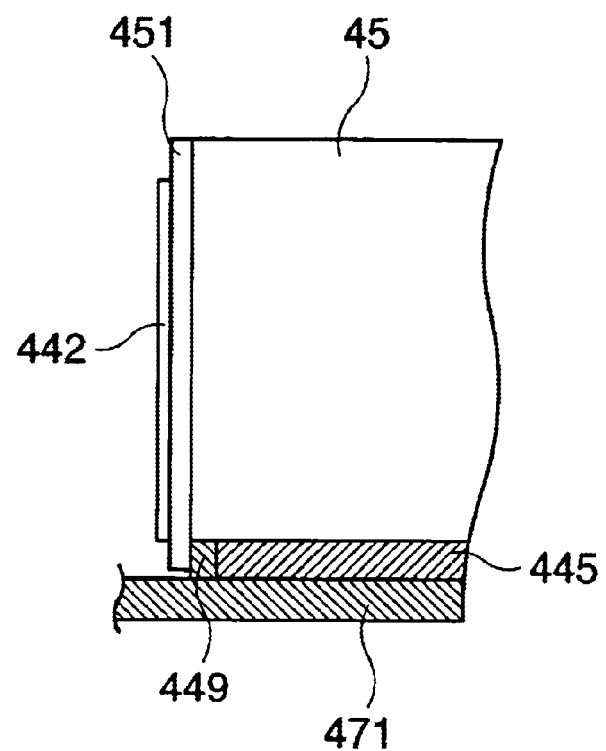
FIG. 32 is an explanatory view illustrating a sapphire plate and a base applied to a prism.

Further, as shown in FIG. 32, an adhesive agent 449 having excellent thermal conductivity is filled in the gap between the sapphire plate 451 and the base 445, joining these in a thermally conductible manner.

Other configurations are the same as the eighth embodiment.

Also, the manufacturing method for the optical device according to the present embodiment is the same as the eighth embodiment, except for the point that a sapphire plate 451 is fixed to the light flux incident end face of the cross-dichroic prism 45 using double-side tape or adhesive agent, and then the polarizing plate 442 is applied to the sapphire plate 451 using double-side tape or adhesive agent, and the point that the holding member 446 is fixed to the light flux incident end face of the cross-dichroic prism 45 across the sapphire plate.

As for the adhesive agent for adhesion of the interfaces of the cross-dichroic prism 45, sapphire plate 451, holding member 446, and base 445, a thermal-curing adhesive agent with excellent thermal conductivity, or a photo-curing adhesive agent is preferably, used, as described above.

Also, for the configuration for joining the base 445 and the sapphire plate 451 so as to enable thermal conduction, an arrangement may be made wherein a thermal-conductive sheet with carbon mixed in, or spacer members or the like formed of thermal-conductive material are introduced, so that the sapphire plate 451 is directly fixed to the lower housing 471, instead of filling the adhesive agent with thermal conductivity between these. In this case, in addition to adhesive agent with thermal conductivity, mechanical fixing using screws or the like, can also be used for adhesion of the thermal conductive sheets or the spacer members.

According to such an eleventh embodiment, the following advantages can be had, in addition to advantages the same as those of the eighth embodiment.

In addition to cooling using the air path between the cross-dichroic prism 45 and the liquid crystal panels 441R, 441G, and 441B, the heat in the vicinity of the liquid crystal panels 441R, 441G, and 441B and the polarizing plate can be conducted and dissipated in the order of the holding frame 443, pins 447A of the holding member 446, holding member 446, sapphire plate 451, base 445, and lower housing 471, so even in the event that the prism 45 is made of glass with a relatively low thermal conductivity such as BK7 or the like, the cooling capabilities of the liquid crystal panels 441R, 441G, and 441B and the polarizing plate 442 can be greatly improved. Accordingly, even in the event that the luminance of the projector is raised, deterioration of the liquid crystal panel can be suppressed, and stable images can be maintained.

Also, the configuration according to the present embodiment wherein the holding member 446 is fixed to the light flux incident end face of the cross-dichroic prism 45 with a sapphire plate introduced between, and the sapphire plate and the base are joined in a thermally conductible manner, can also be applied to the fourth through tenth embodiments. This enables advantages such as improved cooling capabilities, suppression of deterioration of the liquid crystal panel, and maintaining stable images, to be obtained with the fourth through tenth embodiments as well.

The twelfth embodiment according to the present invention will be described next. In the following description, parts and structures the same as the sixth embodiment are denoted with the same reference numerals, and detailed description thereof will be omitted or simplified.

Figure 33:
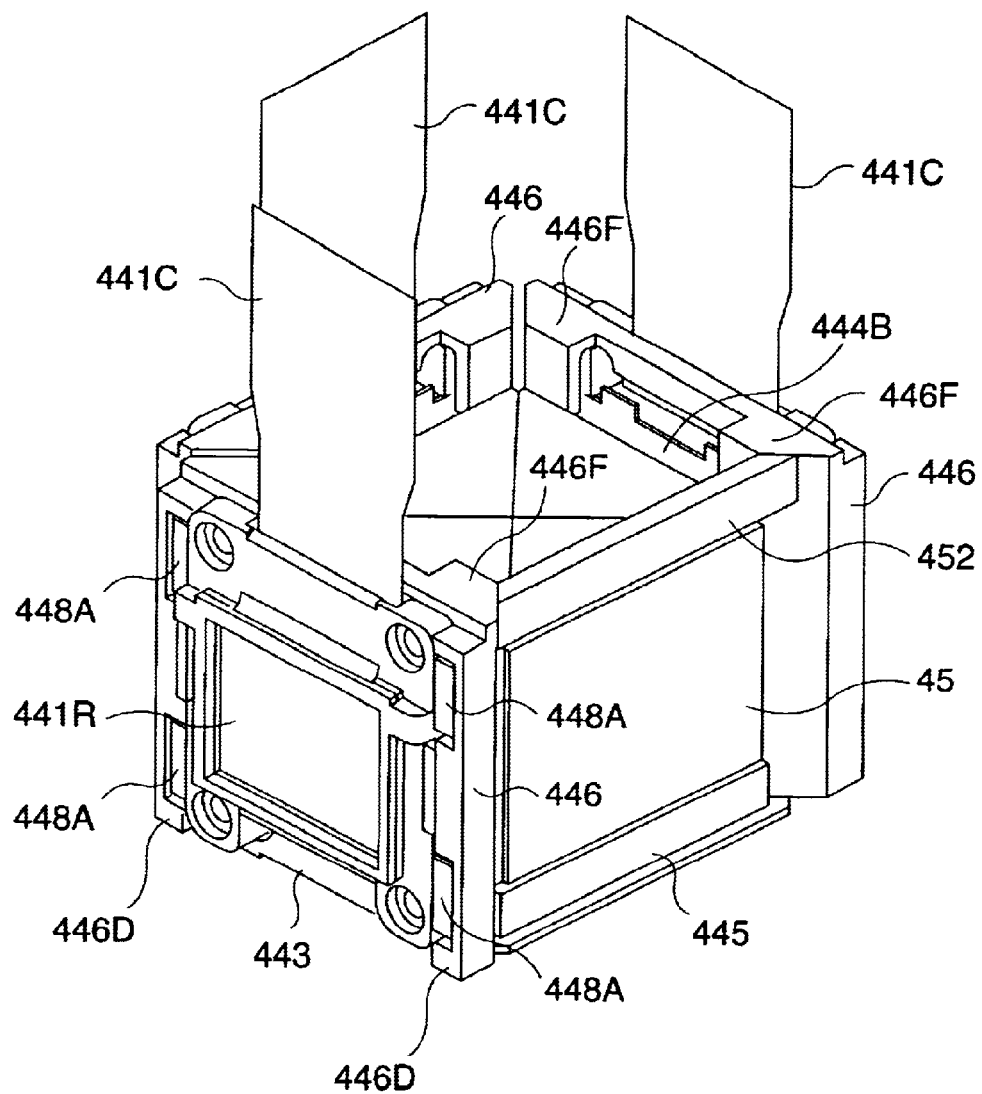
FIG. 33 is a perspective view representing the structure of an optical unit according to a twelfth embodiment.
Figure 34:
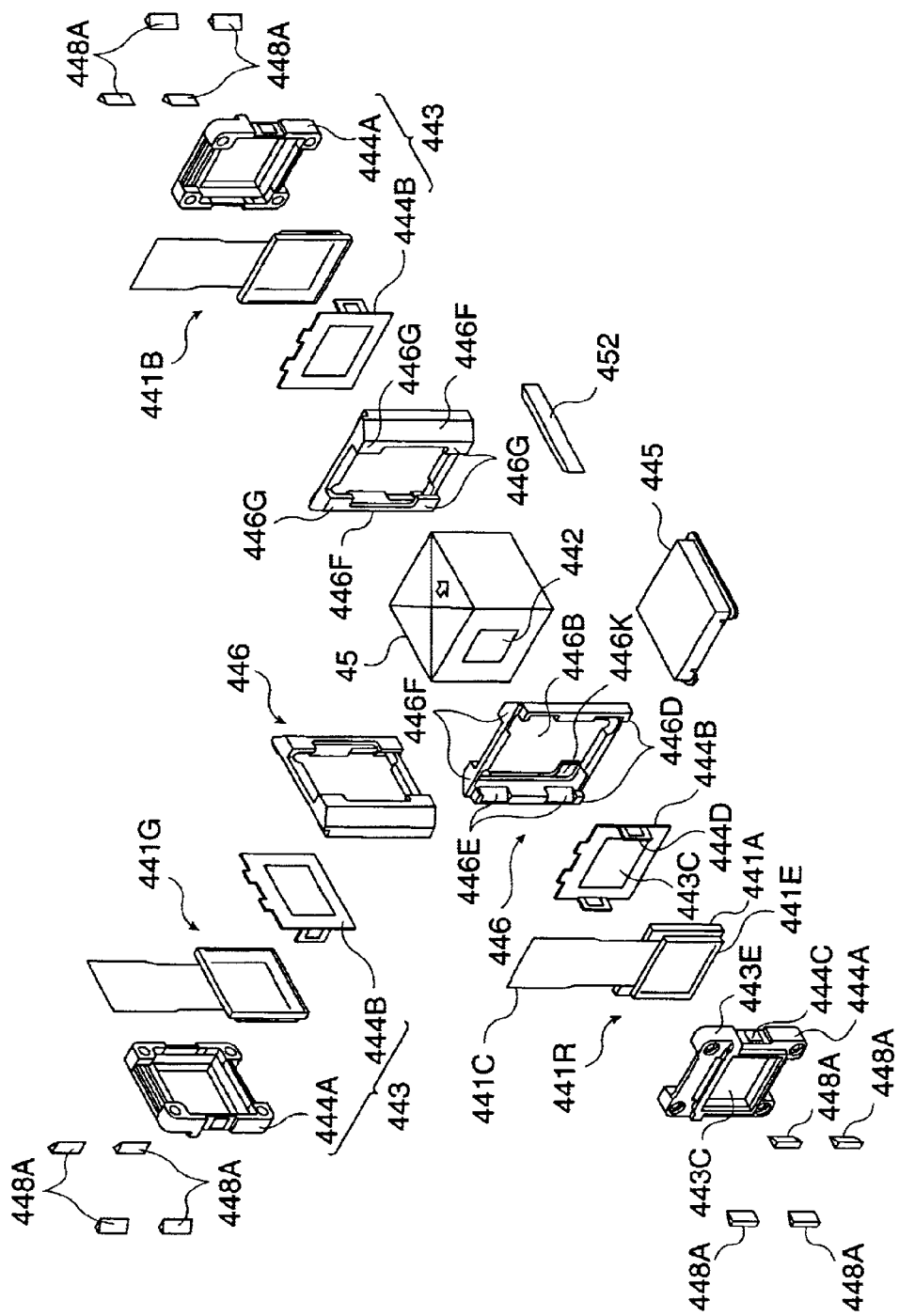
FIG. 34 is a disassembled view of FIG. 33.

With the sixth embodiment, the holding member 446 is fixed to the light flux incident end face of the cross-dichroic prism 45. Conversely, with the twelfth embodiment, the holding member 446 is fixed to the base 445, as shown in FIG. 33 or FIG. 34. Further, the top portion of opposing holding members 446 are linked by a frame linking member 452. Other configurations are the same as the sixth embodiment.

The following is a description of the manufacturing method of the optical device according to the present embodiment.

The polarizing plate 442 is fixed to the light flux incident end face of the cross-dichroic prism 45 (polarizing plate fixing step).

The cross-dichroic prism 45 with the polarizing plate 442 fixed thereto is fixed on the upper center of the base 445 (base fixing step).

Also, the liquid crystal panels 441R, 441G, and 441B are stored in the recessed frame member 444A of the holding frame 443. Further, the supporting plate 444B is attached to the recessed frame member 444A from the light emitting side of the liquid crystal panels 441R, 441G, and 441B, thereby pressing and fixing the liquid crystal panels 441R, 441G, and 441B so as to hold them. Note that attaching of the supporting plate 444B to the recessed frame member 444A can be performed by engaging the hooks 444D of the supporting plate 444B with the hook engaging portions 444C of the recessed frame member 444A (light modulating device holding step).

The contact faces 446G of the holding member 446 are attached to the end faces of the base 445 on three sides, with an adhesive agent or the like (holding member fixing step).

Further, a frame linking member 452 is fixed between holding members 446 at the synthesized light emitting side (linking member fixing step). This frame linking member 452 can be used as an attachment helper plate for the projecting lens 46.

Next, the holding frame 443 storing the liquid crystal panels 441R, 441G, and 441B is stored between the left and right erected pieces 446D of the holding member 446, and brought into contact with the supporting piece 446K (holding frame mounting step).

Wedge-shaped spacers 448A coated with adhesive agent thereupon are inserted between the inclined faces 446E formed on the inner side face of the erected pieces 446D and the perimeter 443E of the holding frame 443 (spacer mounting step). At this time, the spacers 448A are attached to the inclined faces 446E and the perimeter 443E of the holding frame 443, due to the surface tension of the adhesive agent.

Further, in a state with the adhesive agent applied on the wedge-shaped spacers unhardened, the position of the liquid crystal panels 441R, 441G, and 441B is adjusted (position adjusting step).

Following performing positional adjustment of the liquid crystal panels 441R, 441G, and 441B, the adhesive agent is hardened (adhesive agent hardening step).

Figure 35:
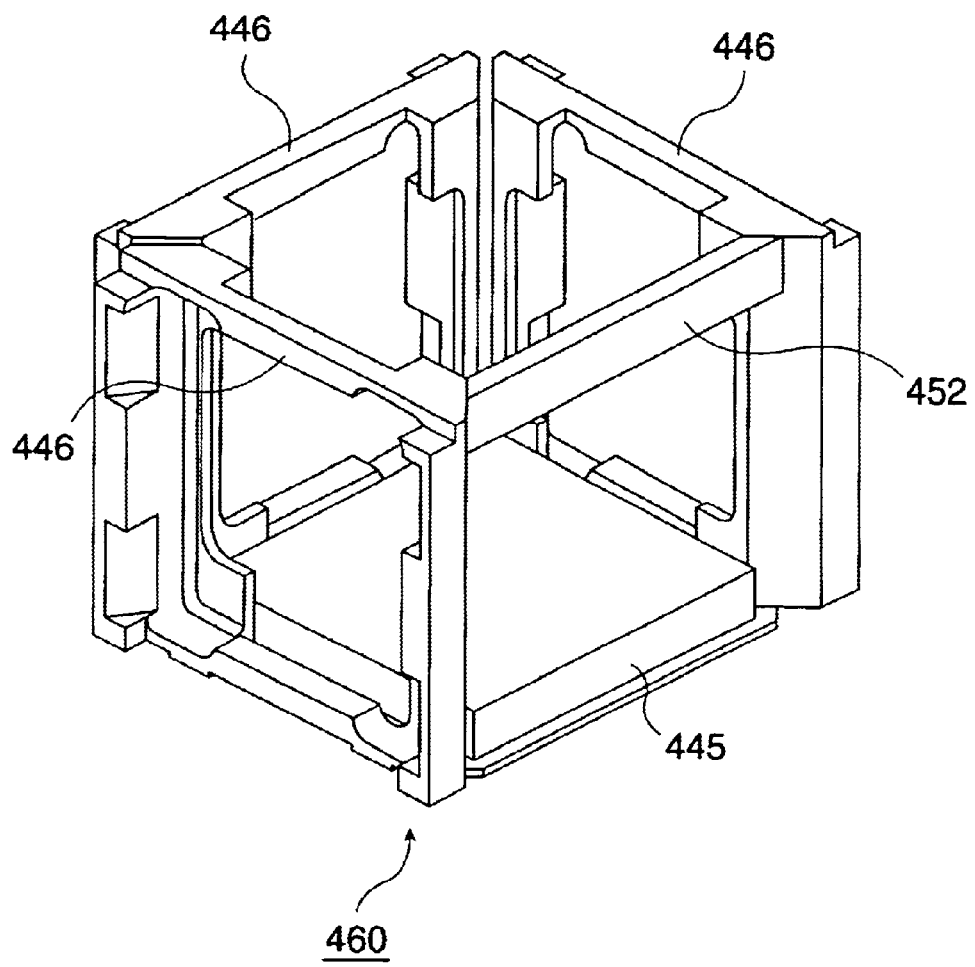
FIG. 35 is a perspective view wherein a base and holding members in the twelfth embodiment are integrally formed.

Now, the above has been a description of the configuration and manufacturing method wherein, the base 445, holding members 446, and linking member 452 are configured as separate parts, which are fixed and integrated at the time of assembling an optical device, but a formed unit 460 wherein these are integrally formed as shown in FIG. 35 may be used.

The manufacturing method of the optical device in this case is as described next.

The polarizing plate 442 is fixed to the light flux incident end face of the cross-dichroic prism 45 (polarizing plate fixing step).

Subsequently, the cross-dichroic prism 45 with the polarizing plate 442 fixed thereto is inserted from above the formed unit 460, and fixed on the upper center of the base 445 (formed unit fixing step).

Also, the liquid crystal panels 441R, 441G, and 441B are stored in the recessed frame member 444A of the holding frame 443. Further, the supporting plate 444B is attached to the recessed frame member 444A from the light emitting side of the liquid crystal panels 441R, 441G, and 441B, thereby pressing and fixing the liquid crystal panels 441R, 441G, and 441B so as to hold them. Note that attaching of the supporting plate 444B to the recessed frame member 444A can be performed by engaging the hooks 444D of the supporting plate 444B with the hook engaging portions 444C of the recessed frame member 444A (light modulating device holding step).

Next, the holding frame 443 storing the liquid crystal panels 441R, 441G, and 441B is stored between the left and right erected pieces 446D of the holding member 446, and brought into contact with the supporting piece 446K (holding frame mounting step).

Wedge-shaped spacers 448A coated with adhesive agent thereupon are inserted between the inclined faces 446E formed on the inner side face of the erected pieces 446D and the perimeter 443E of the holding frame 443 (spacer mounting step). At this time, the spacers 448A are attached to the inclined faces 446E and the perimeter 443E of the holding frame 443, due to the surface tension of the adhesive agent.

Further, in a state with the adhesive agent applied on the wedge-shaped spacers unhardened, the position of the liquid crystal panels 441R, 441G, and 441B is adjusted (position adjusting step).

Following performing positional adjustment of the liquid crystal panels 441R, 441G, and 441B, the adhesive agent is hardened (adhesive agent hardening step).

Thus, by employing a formed unit 460 wherein the base 445, holding members 446, and linking member 452 are integrated, the number of parts is reduced, and the structure can be simplified. Also, the holding member fixing step and linking member fixing step can be omitted, so that the optical device can be readily assembled. Thus, this can contribute to reduction of manufacturing costs of the optical device, and further, the projector. Also, it is not necessary to integrally form all of the base 445, holding members 446, and linking member 452, and the same advantages can be obtained in cases wherein only two of these are integrally formed, as well.

With regard to the above two manufacturing methods, the positional adjustment method of the liquid crystal panels 441R, 441G, and 441B in the position adjusting step is the same as the position adjusting step described with the second manufacturing method of the optical device according to the sixth embodiment.

With regard to the fixing of the holding frame 443 and the holding member 446, for example, first, temporary fixing can be made in spots for the adhesive agent around the spacers 448A, and then adhesive agent is filled in the gap between the inclined faces 446E and the perimeter 443E of the holding frame 443 so as to fix permanently. By employing such a fixing method, the holding frame 443 and the holding member 446 can be securely fixed in a short time. Also, adhesive agent is filled in the gap between the inclined faces 446E and the perimeter 443E of the holding frame 443, so that positional misalignment of the spacers 448A due to thermal stress or the like following positional adjustment can be prevented, and the positions of the liquid crystal panels 441R, 441G, and 441B are maintained at a suitable state.

Now, attaching of the liquid crystal panels 441R, 441G, and 441B to the cross-dichroic prism 45 does not necessarily have to be performed in the above order. For example, in the event of using solder as an adhesive agent, an arrangement is sufficient wherein the parts are mounted without adhesive agent in the above manufacturing steps, and following the positional adjustment, the holding member 446, spacers 448A, holding frame 443, and linking member 452 are fixed with solder. Note that the holding members 446 and frame linking member 452 may be mechanically fixed by screws or the like, instead of adhesive agent. This is true for optical devices according to other embodiments which are manufactured with the same method as the present embodiment.

The liquid crystal panels 441R, 441G, and 441B and cross-dichroic prism 45 thus integrated are fixed to the lower housing 471 (FIG. 6) by screws or the like, using the base 445 on the bottom.

The twelfth embodiment can provide the following advantages.

The liquid crystal panels 441R, 441G, and 441B are not fixed to the light flux incident end face of the cross-dichroic prism 45 unlike the conventional POP structures, and rather fixed to the side faces of the bases 445 fixed on the upper and lower faces of the cross-dichroic prism 45. Accordingly, the size of the cross-dichroic prism 45 can be reduced, and consequently, this can reduce the size and reduce the manufacturing costs of the optical device, and further, the projector.

The light flux incident end face of the cross-dichroic prism 45 and the face of the holding member 446 are fixed without position adjusting members such as pins or spacers introduced between. That is to say, though the position of the liquid crystal panels 441R, 441G, and 441B is fixed relatively to the side face of the base 445 with the spacers 448A introduced therebetween, but no spacers exist between the holding member 446 and the base 445. Moreover, the spacers are disposed between the erected pieces 446D of the holding member 446 formed so as to cover the side edge of the liquid crystal panels 441R, 441G, and 441B, and the holding frame 443 holding the liquid crystal panels 441R, 441G, and 441B. Accordingly, positional adjustment of the liquid crystal panels 441R, 441G, and 441B is easy, and the effects that the positional misalignment of spacers 448A following positional adjustment have on the positional misalignment of the liquid crystal panels 441R, 441G, and 441B are relatively small. Accordingly, this can contribute to reduction in manufacturing costs and improved image quality of the optical device and further the projector employing this.

Also, the holding member 446 has protrusions 446F at the face of contact with the base 445, and these protrusions and the base 445 form a partial gap whereby, in the event that replacing the liquid crystal panels 441R, 441G, and 441B becomes necessary at the time of manufacturing or following manufacturing, a tool such as a screwdriver or the like can be inserted into the gap allowing easy peeling of the holding member 446 and the cross-dichroic prism 45 away from one another. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

The holding frame 443 comprises a recessed frame member 444A for storing the liquid crystal panels 441R, 441G, and 441B, and a supporting plate 444B for pressing and fixing the stored liquid crystal panels 441R, 441G, and 441B. Accordingly, the storing and fixing of the liquid crystal panels 441R, 441G, and 441B can be carried out easily, and also stable holding and fixing of the liquid crystal panels 441R, 441G, and 441B can be performed.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat, effects on the image quality of the projected image can be alleviated.

Also, erected pieces 446D of the holding member 446 are formed so as to cover the side edges of the holding frame. Accordingly, the light leaking out from between the holding frame 443 and the liquid crystal panels 441R, 441G, and 441B can be shielded. Accordingly, the light leaking out from between the holding member 446 and the holding frame 443 can be shielded. That is to say, deterioration in contrast of the projected image or unclear images due to light that has leaked within the optical device and been taken into the projecting lens 46 can be prevented by these erected pieces 446D, so that high-quality images can be obtained.

Further, by linking the top portions of the holding members 446 with a frame linking member 452, the holding members 446 can be held and fixed in a stable manner, while the temperature distribution of the holding members 446 can be made uniform, thereby improving thermal conductivity.

The thirteenth embodiment according to the present invention will be described next.

In the following description, parts and structures the same as the twelfth embodiment are denoted with the same reference numerals, and detailed description thereof will be omitted or simplified.

With the optical device according to the twelfth embodiment, attachment of the holding frame 443 to the holding member 446 is performed by two wedge-shaped spacers 448A each on the left and right sides.

Figure 36:
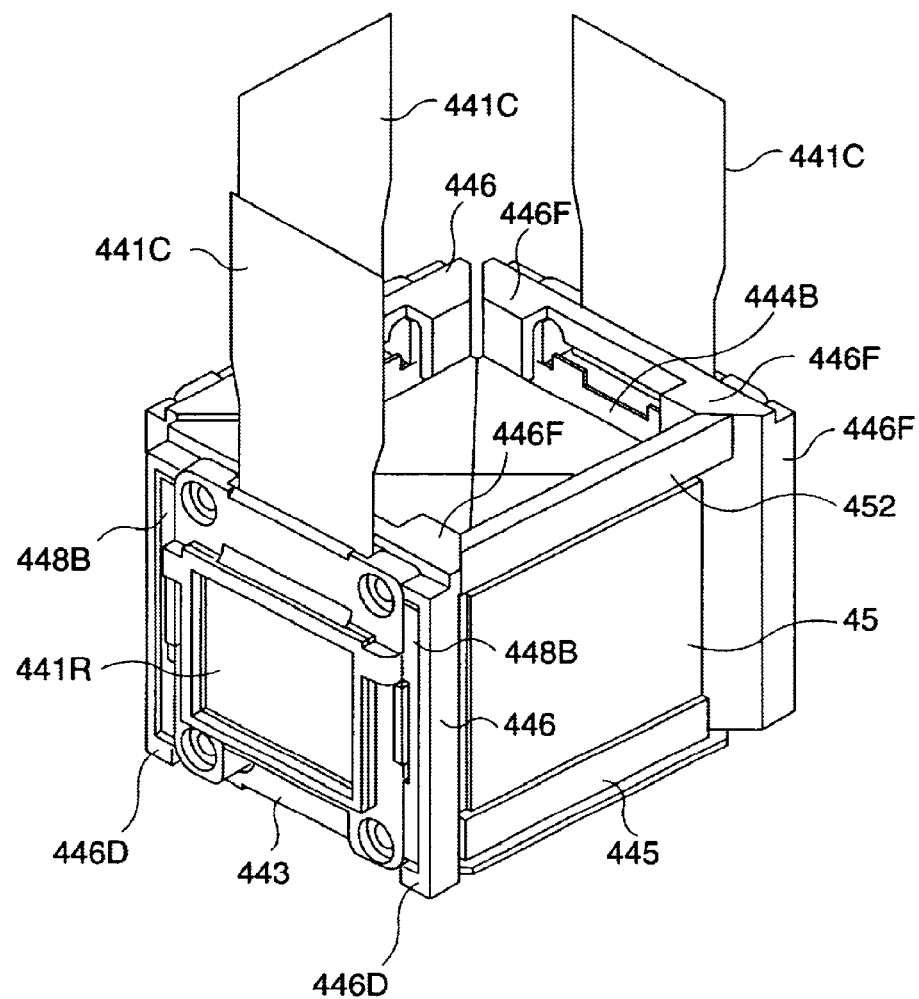
FIG. 36 is a perspective view representing the structure of an optical device according to a thirteenth embodiment.
Figure 37:
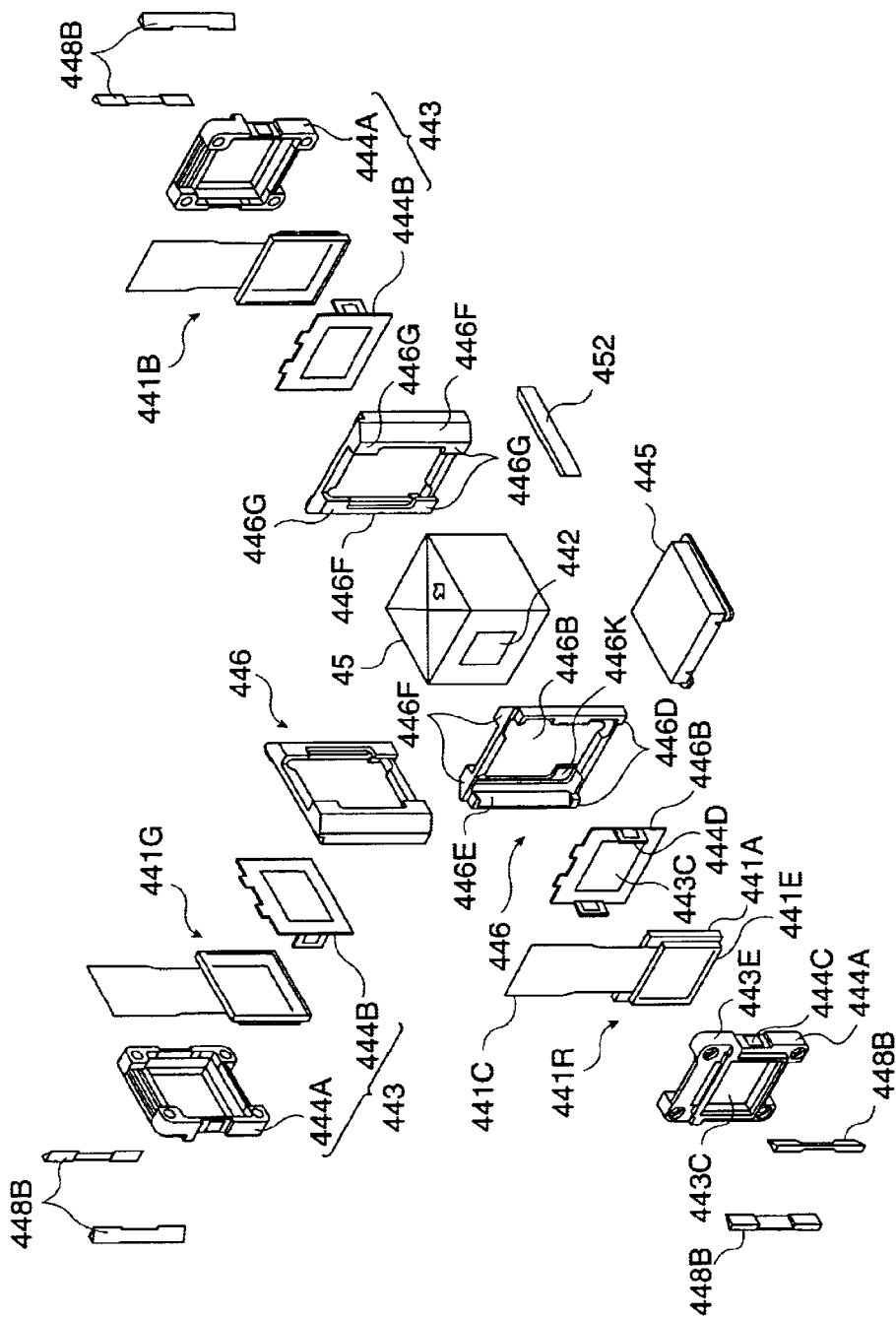
FIG. 37 is a disassembled view of FIG. 36.
Figure 38:
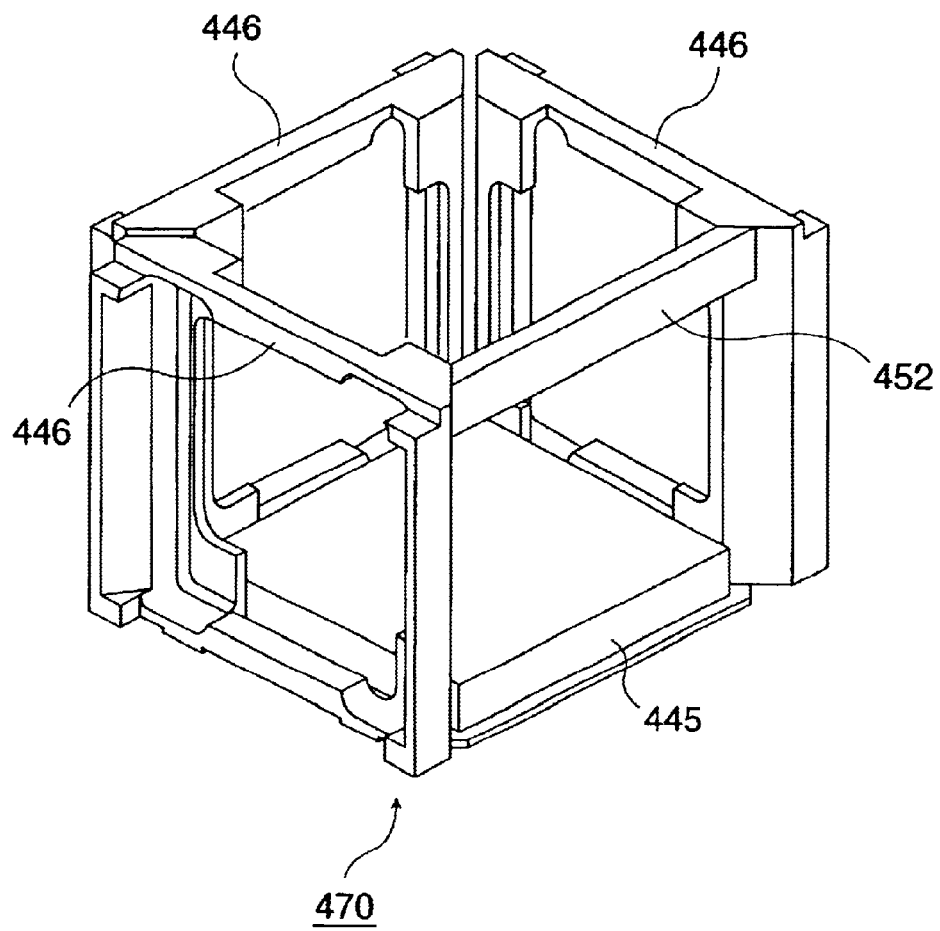
FIG. 38 is a perspective view wherein a base and holding members in the thirteenth embodiment are integrally formed.

Conversely, with the optical device according to the thirteenth embodiment, attachment of the holding frame 443 to the holding member 446 is performed by one wedge-shaped spacer 448B each on the left and right sides, as shown in FIG. 36 or FIG. 37. Specifically, a wedge-shaped spacer 448B is disposed over the entire length of the inclined face 446E of the erected piece 446D, forming the contact portion of the holding frame 443 and the holding member 446 at the top and bottom ends. Also, as shown in FIG. 38, a formed unit 470 wherein the base 445, holding members 446, and linking member 452, or two of these, are integrally formed, may be used with the present embodiment as well, as shown in FIG. 38.

Other configurations and manufacturing methods are the same as the twelfth embodiment.

According to such a thirteenth embodiment, advantages the same as the twelfth embodiment can be obtained.

Also, the holding frame 443 and the holding member 446 are fixed by the minimally essential number of spacers 448B, so that the number of parts is few, and the manufacturing costs of the optical device and further the projector can be reduced.

The fourteenth embodiment according to the present invention will be described next.

In the following description, parts and structures the same as the twelfth embodiment are denoted with the same reference numerals, and detailed description thereof will be omitted or simplified.

With the twelfth embodiment and thirteenth embodiment, fixing of the holding frame 443 to the holding member 446 is performed by a plurality of wedge-shaped spacers 448A or 448B.

Figure 39:
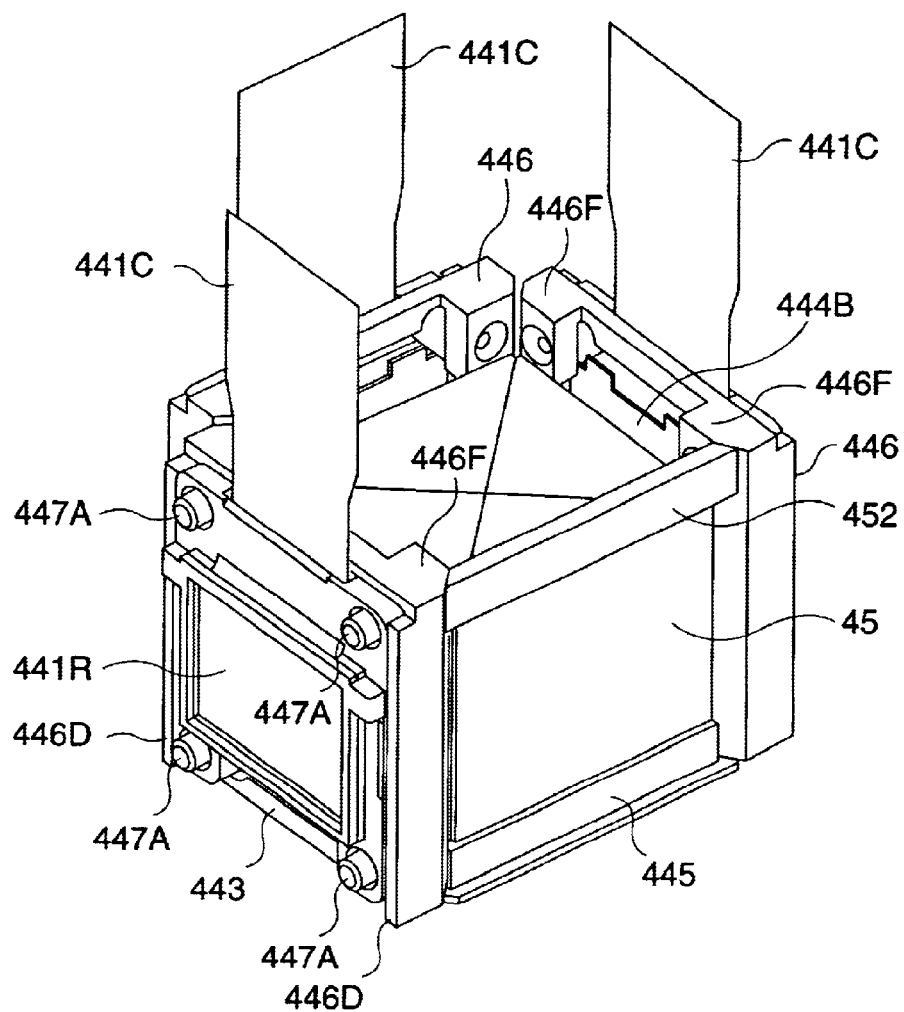
FIG. 39 is a perspective view representing the structure of an optical device according to a fourteenth embodiment.
Figure 40:
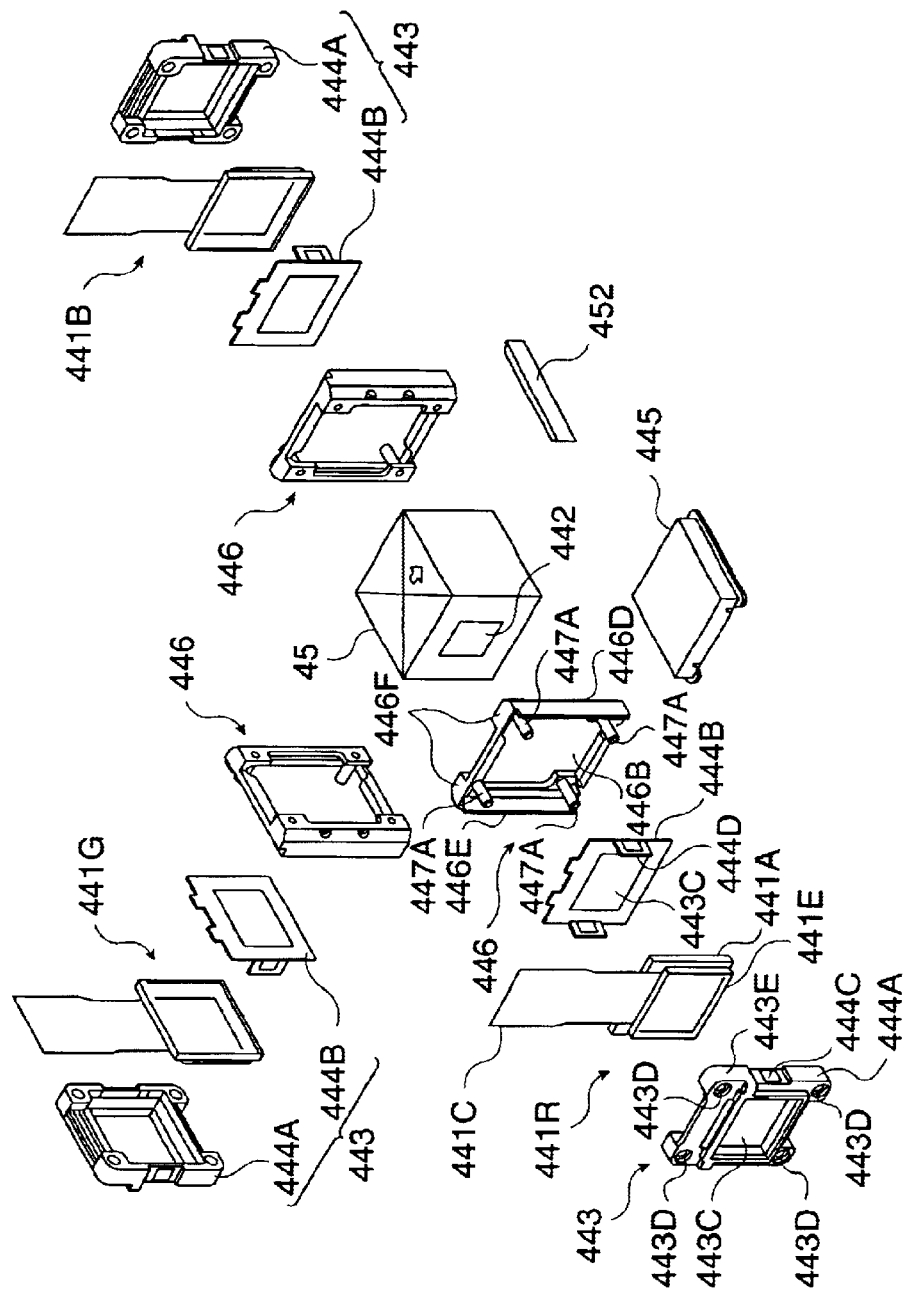
FIG. 40 is a disassembled view of FIG. 39.

Conversely, the fourteenth embodiment differs in that this fixing is performed by pins 447A provided in a protruding condition from the four corners of the face of the holding member 446 on the holding frame 443 side, and holes 443D formed in the four corners of the holding frame 443, as shown in FIG. 39 or FIG. 40. Other configurations are the same as the twelfth embodiment. Now, the positions of the pins 447A do not need to be at the corners of the holding member 446. Also, the number of pins 447A is not restricted to four, with two or more being sufficient.

Figure 41:
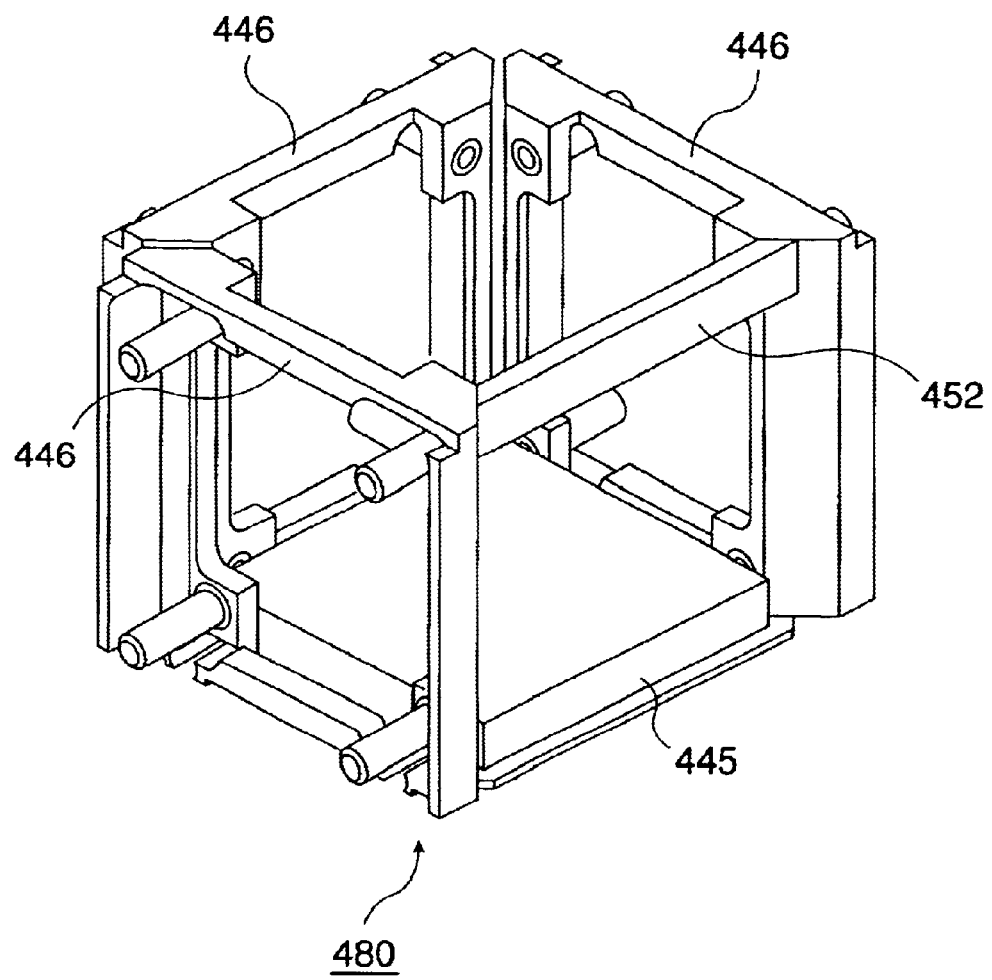
FIG. 41 is a perspective diagram wherein a base and holding members in the fourteenth embodiment are integrally formed.

Also, as shown in FIG. 41, a formed unit 470 wherein the base 445, holding members 446, and linking member 452, or two of these, are integrally formed, may be used with the present embodiment as well.

The manufacturing method of the optical devices according to the present embodiment is almost the same as that described with the twelfth embodiment, except for the point that the pins 447A of the holding member 446 are inserted into the holes 443D of the holding frame 443 along with the adhesive agent in the above holding frame mounting step, the point that there is no spacer mounting step (e-2), and the point that positional adjustment of the liquid crystal panels 441R, 441G, and 441B in the above position adjusting step is performed by sliding the contact portion of the holding frame 443 and the holding member 446, i.e., through the pins 447A.

According to such an fourteenth embodiment, pins 447A for fixing the holding frame 443 to the holding member 446 are provided, and pins or spacers configured as independent parts are not used unlike the conventional POP structures, so that the number of parts can be reduced. Also, the structure is simple, and manufacturing is easy. This can contribute to reduction in size and reduction in manufacturing costs of the optical device and further the projector.

The liquid crystal panels 441R, 441G, and 441B are not fixed to the light flux incident end face of the cross-dichroic prism unlike conventional POP structures, and rather fixed to the side face of bases 445 fixed on the top and bottom faces of the cross-dichroic prism 45, so that the size of the light flux incident end face of the cross-dichroic prism 45 can be kept to approximately the same size of an image formation region of the liquid crystal panels 441R, 441G, and 441B or somewhat larger than that. Accordingly, the size of the cross-dichroic prism 45 can be reduced, and consequently, this can reduce the size and reduce the manufacturing costs of the optical device, and further, the projector.

Also, the positions of the liquid crystal panels 441R, 441G, and 441B are not defined by the position of the light flux incident end face of the cross-dichroic prism 45 unlike conventional arrangements, and rather defined by the side face of the bases 445. Accordingly, the size of the cross-dichroic prism 45 can be reduced by that much. Accordingly, the optical device and further the projector can be reduced in size and reduced in cost. Further, the back-focus of the projecting lens 46 can be shortened, so that a greater amount of light can be taken in by the projecting lens 46, and a bright projected image can be obtained.

Further, the liquid crystal panels 441R, 441G, and 441B are not fixed to the light flux incident end face of the cross-dichroic prism but rather fixed to the side face of the bases 445 fixed on the top and bottom faces of the cross-dichroic prism 45, so that in the event that there is the need to replace the liquid crystal panels 441R, 441G, and 441B during manufacturing or following manufacturing, the light flux incident end face of the cross-dichroic prism 45 is not scratched even in the event of removing these. Also, there is no need to scrape off adhesive agent fixed to the light flux incident end face. Accordingly, this can contribute to reduction in manufacturing costs of the optical device and the projector, and to improvement in after-sales service.

Further, the position of the liquid crystal panels 441R, 441G, and 441B is determined by the positional relation between the holding member 446 and the bases 445 without pins or spacers introduced, so that positional adjustment of the liquid crystal panels 441R, 441G, and 441B is easy, and positional misalignment of the liquid crystal panels 441R, 441G, and 441B following positional adjustment can be reduced. Accordingly, this can contribute to reduced manufacturing costs and improved image quality of the optical device and the projector.

The holding frame 443 comprises a recessed frame member 444A for storing the liquid crystal panels 441R, 441G, and 441B, and a supporting plate 444B for pressing and fixing the stored liquid crystal panels 441R, 441G, and 441B. Accordingly, the storing and fixing of the liquid crystal panels 441R, 441G, and 441B can be carried out easily, and also stable holding and fixing of the liquid crystal panels 441R, 441G, and 441B can be performed.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat, effects on the image quality of the projected image can be alleviated.

Also, the holding member 446 has protrusions 446F at the face of contact with the base 445, and these protrusions and the base 445 form a partial gap whereby, in the event that replacing the liquid crystal panels 441R, 441G, and 441B becomes necessary at the time of manufacturing or following manufacturing, a tool such as a screwdriver or the like can be inserted into the gap allowing easy peeling of the holding member 446 and the cross-dichroic prism 45 away from one another. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

Further, by linking the top portions of the holding members 446 with a frame linking member 452, the holding members 446 can be held and fixed in a stable manner, while the temperature distribution of the holding members 446 can be made uniform, thereby improving thermal conductivity.

The fifteenth embodiment according to the present invention will be described next.

In the following description, parts and structures the same as the thirteenth embodiment are denoted with the same reference numerals, and detailed description thereof will be omitted or simplified.

With the twelfth embodiment through the fourteenth embodiment, the holding frame 443 for holding the liquid crystal panels 441R, 441G, and 441B is configured of a recessed frame member 444A for storing the liquid crystal panels 441R, 441G, and 441B, and a supporting plate 444B for pressing and fixing the stored liquid crystal panels 441R, 441G, and 441B.

Figure 42:
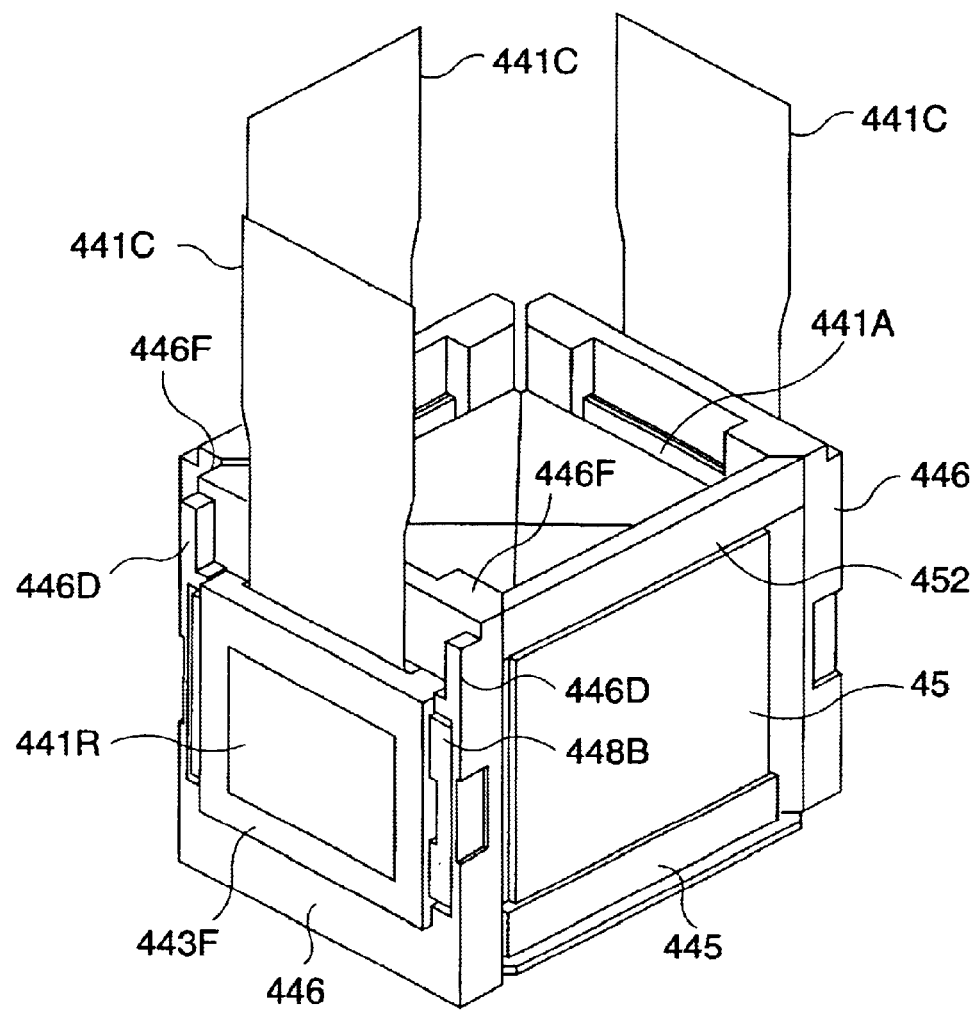
FIG. 42 is a perspective view representing the structure of an optical device according to a fifteenth embodiment.
Figure 43:
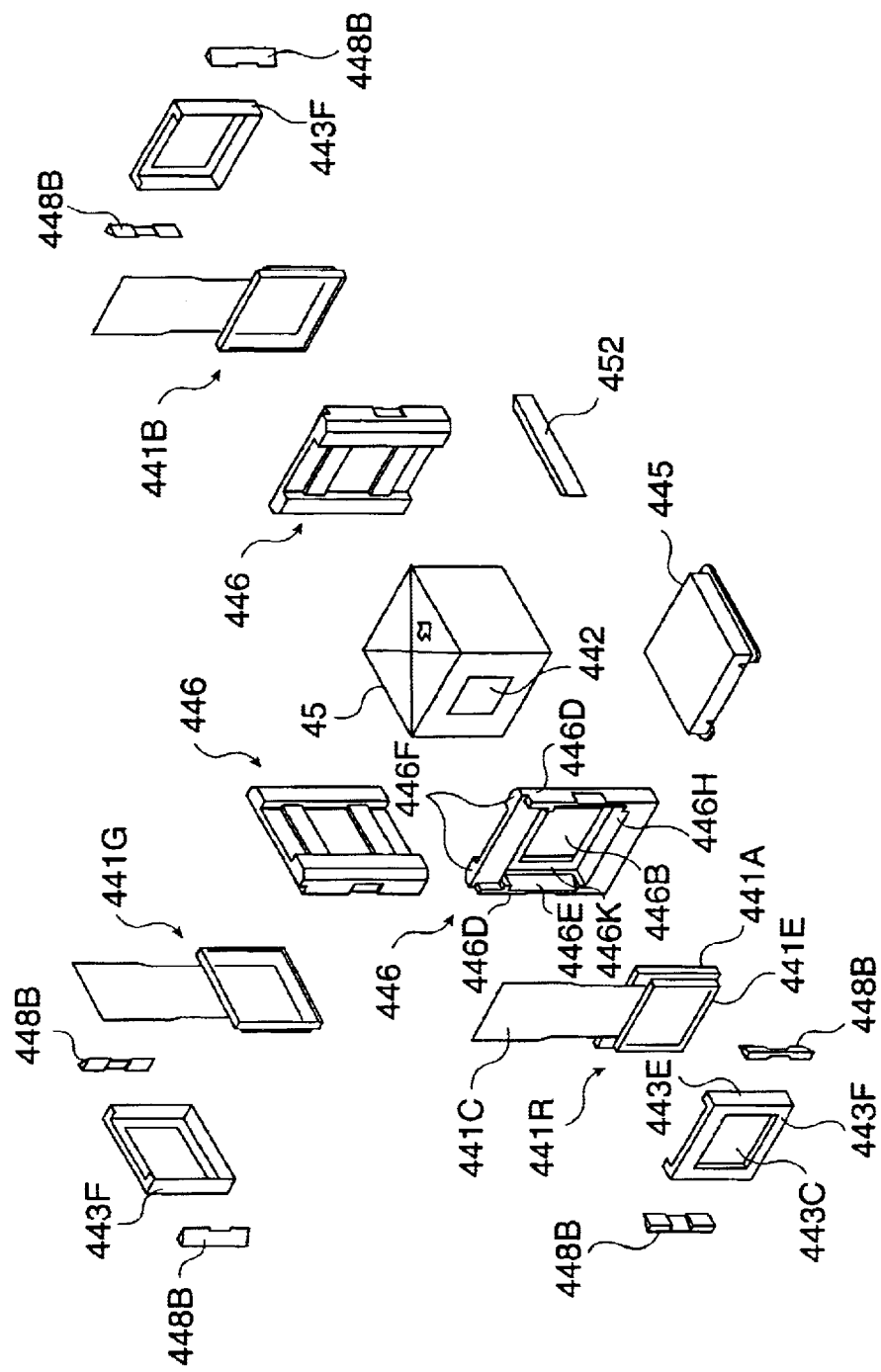
FIG. 43 is a disassembled view of FIG. 42.

Conversely, with the fifteenth embodiment, a holding frame 443F comprises a recessed frame member for supporting the light incident side of the liquid crystal panels 441R, 441G, and 441B as shown in FIGS. 42 and 43. The light emitting side thereof is not pressed and fixed by the supporting plate 444B, but directly stored and held in storing space 446H of the holding member 446. Also, as shown in FIG. 38, a formed unit 470 wherein the base 445, holding members 446, and linking member 452, or two of these, are integrally formed, may be used with the present embodiment as well. Other configurations are the same as with the thirteenth embodiment.

Also, the manufacturing method of the optical device according to the present embodiment is the same as that described above with the thirteenth embodiment, except for the point that the light modulating device holding step in (c) ends with only storing the liquid crystal panels 441R, 441G, and 441B in the holding frame 443F configured of a recessed frame.

According to such a fifteenth embodiment, the following advantages can be realized.

The holding frame 443F is configured without the supporting plate 444B, doing away with the need for the hook engaging portions for fixing the supporting plate 444B, and a plate member thinner than the recessed frame member 444A can be used and formed into a simple shape. Accordingly, the reduction in the number of parts and reduction in the number of assembly steps can be achieved, enabling reduction in manufacturing costs of the optical device and further the projector.

The liquid crystal panels 441R, 441G, and 441B are not fixed to the light flux incident end face of the cross-dichroic prism 45 unlike the conventional POP structures, and rather fixed to the side faces of the bases 445 fixed on the upper and lower faces of the cross-dichroic prism 45. Accordingly, the size of the cross-dichroic prism 45 can be reduced, and consequently, this can reduce the size and reduce the manufacturing costs of the optical device, and further, the projector.

Also, the holding member 446 has protrusions 446F at the face of contact with the base 445, and these protrusions and the base 445 form a partial gap whereby, in the event that replacing the liquid crystal panels 441R, 441G, and 441B becomes necessary at the time of manufacturing or following manufacturing, a tool such as a screwdriver or the like can be inserted into the gap allowing easy peeling of the holding member 446 and the cross-dichroic prism 45 away from one another. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

Further, by linking the top portions of the holding members 446 with a frame linking member 452, the holding members 446 can be held and fixed in a stable manner, while the temperature distribution of the holding members 446 can be made uniform, thereby improving thermal conductivity.

Also, advantages based on the number of the spacers 448B described with the thirteenth embodiment, can be obtained.

Also, a light-transmissive dust-proof plate 441D is provided to the liquid crystal panels 441R, 441G, and 441B, so that even in the event that dust adheres to the surface of the liquid crystal panels 441R, 441G, and 441B, this can be made less conspicuous on the projected screen. Accordingly, this can contribute to improved image quality.

A shielding film is provided at the light flux emitting side end face of the holding frame 443 and holding member 446, thereby preventing light reflected from the cross-dichroic prism 45 from being further reflected to the cross-dichroic prism 45 side, thereby preventing deterioration in contrast due to stray light. Thus, this can contribute to improved image quality.

The bases 445, holding member 446, and holding frame 443 comprise the same material (magnesium alloy), so that the amount of dimensional change due to heat (expansion and shrinking) is the same, and accordingly, reliability is high. Also, with these components expanding and shrinking due to heat, effects on the image quality of the projected image can be alleviated.

With the present embodiment, an arrangement may be made wherein the holding frame 443 and holding member 446 are fixed without using the spacers 448A. In this case, the erected pieces 446D of the holding member 446 and the perimeter of the holding frame 443F are made to face one another with a gap therebetween wherein focus adjustment is possible or a gap wherein both focus adjustment and alignment adjustment are possible, and following adjusting the position of the liquid crystal panels 441R, 441G, and 441B, the holding member 446 and the holding frame 443 are fixed with adhesive agent. It is preferable that the adhesive agent is applied before adjusting the position of the liquid crystal panels 441R, 441G, and 441B, and positional adjustment is performed in a state that the adhesive agent is unhardened. Also, the adhesive agent may be applied following adjustment and be hardened. Thus, fixing the holding frame 443F and holding member 446 without using the spacers 448B yields, in addition to the above advantages, the number of parts can be reduced. Also, the structure is simple, and manufacturing is easy. This can contribute to reduction in size and reduction in manufacturing costs of the optical device and further the projector.

Further, the position of the liquid crystal panels 441R, 441G, and 441B is determined by the positional relation between the holding member 446 and the bases 445 without pins or spacers introduced, so that positional adjustment of the liquid crystal panels 441R, 441G, and 441B is easy, and positional misalignment of the liquid crystal panels 441R, 441G, and 441B following positional adjustment can be reduced. Accordingly, this can contribute to reduced manufacturing costs and improved image quality of the optical device and the projector.

The sixteenth embodiment according to the present invention will be described next.

In the following description, parts and structures the same as the twelfth embodiment are denoted with the same reference numerals, and detailed description thereof will be omitted or simplified.

With the twelfth embodiment through the fourteenth embodiment, the holding frame 443 for holding the liquid crystal panels 441R, 441G, and 441B is configured of a recessed frame member 444A for storing the liquid crystal panels 441R, 441G, and 441B, and a supporting plate 444B for pressing and fixing the stored liquid crystal panels 441R, 441G, and 441B.

Figure 44:
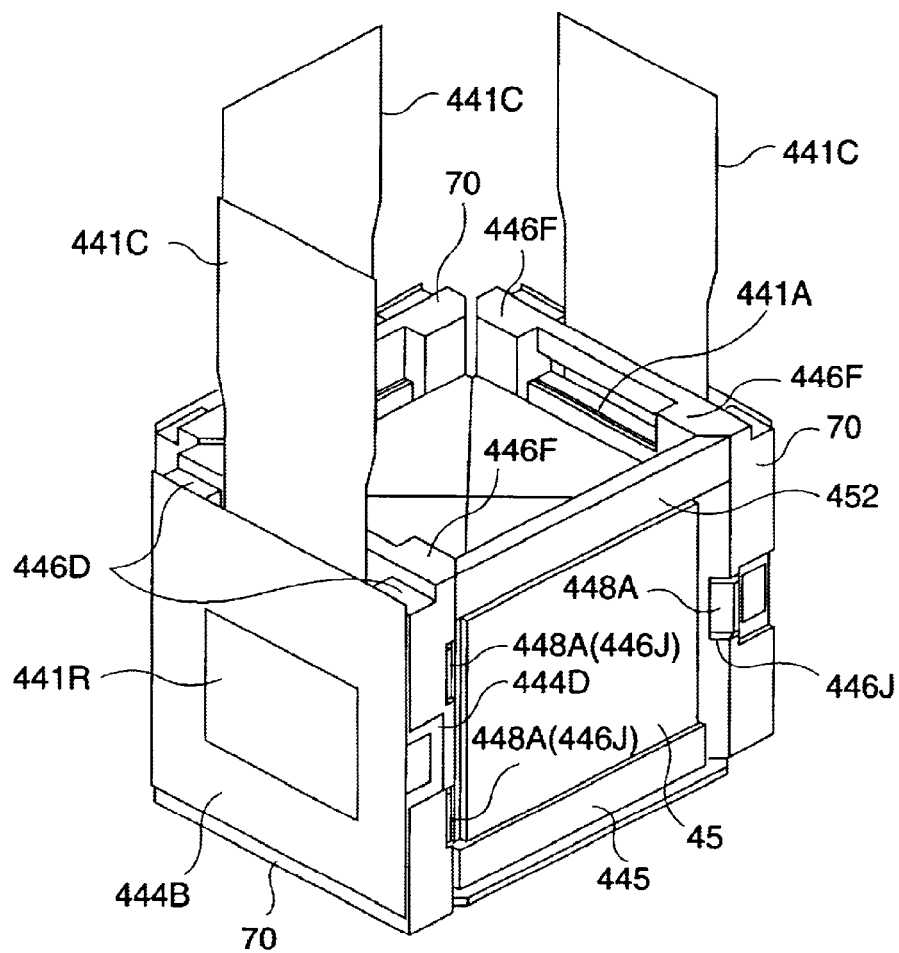
FIG. 44 is a perspective view representing the structure of an optical device according to a sixteenth embodiment.
Figure 45:
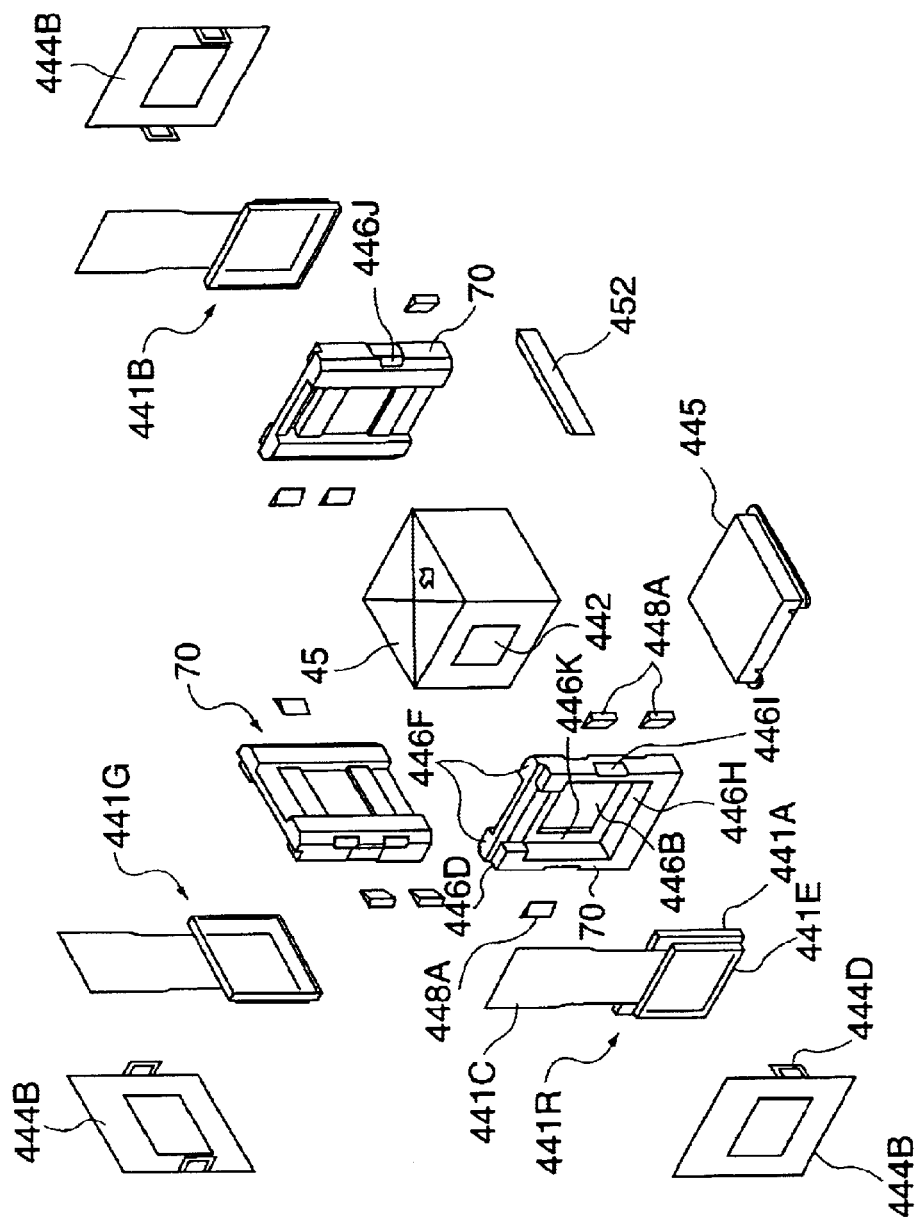
FIG. 45 is a disassembled view of FIG. 44.

Conversely, with the sixteenth embodiment, a holding frame 443G comprises a supporting plate for supporting the light incident side of the liquid crystal panels 441R, 441G, and 441B, as shown in FIG. 44 or FIG. 45.

The liquid crystal panels 441R, 441G, and 441B are stored and held in storing space 446H of the holding member 446, and the light incident side of the liquid crystal panels 441R, 441G, and 441B is pressed and fixed by the holding frame 443G configured of the supporting plate. The holding frame 443G configured of the supporting plate, and the holding member 446, are fixed by engaging of hooks 444D provided on the holding frame 443G and hook engaging portions 446I provided on the holding member 446.

Further, the holding member 446 according to the twelfth embodiment has inclined faces 446E where the spacer 448A is inserted at the inner side of the erected pieces 446D (see FIG. 34), but the holding member 446 according to the present embodiment has no such inclined faces 446E. Instead, through holes 446J exposed on the left and right sides of the holding member 446 are provided on the erected pieces 446D of the holding member 446. The spacers 448A are inserted between the light emitting face of the liquid crystal panels 441R, 441G, and 441B, and the face of the holding member 446 at the side of the liquid crystal panels 441R, 441G, and 441B, from the outside of the holding member 446, by the through holes 446J. While three each of the spacers 448A and through holes 446J are provided, this may be two, four, or more. Other configurations are the same as with the twelfth embodiment.

The manufacturing method for the optical device according to the present embodiment can be carried out as follows.

The polarizing plate 442 is fixed to the light flux incident end face of the cross-dichroic prism 45 (polarizing plate fixing step).

The cross-dichroic prism 45 with the polarizing plate 442 fixed thereto is fixed on the center of the upper face of the base 445 (base fixing step).

The contact faces 446G of the holding members 446 are attached to the end faces of the base 445 on the three sides (holding member adhesion step).

Further, a frame linking member 452 is fixed by adhesion between holding members 446 at the synthesized light emitting side (linking member fixing step).

The liquid crystal panels 441R, 441G, and 441B are stored in the storing space 446H of the holding member 446 (light modulating device holding step).

The holding frame 443G configured of the supporting plate is attached from the light incident side of the liquid crystal panels 441R, 441G, and 441B, the hooks 444D are engaged with the hook engaging portions 446C on the holding member 446, and the liquid crystal panels 441R, 441G, and 441B are pressed and fixed (holding frame mounting step).

Wedge-shaped spacers 448A are inserted into through holes 446J provided on the left and right side faces of the holding member 446, and moved while being brought into contact with both the face on the liquid crystal panels 441R, 441G, and 441B side of the holding member 446 and the light emitting face of the liquid crystal panels 441R, 441G, and 441B, thereby adjusting the position of the liquid crystal panels 441R, 441G, and 441B (position adjusting step).

Subsequently, the adhesive agent is hardened (adhesive agent hardening step).

Note that the holding members 446 and frame linking member 452 may be mechanically fixed by screws or the like, instead of adhesive agent.

According to such a sixteenth embodiment, the following advantages can be had.

The base 445 and the face of the holding member 446 are fixed without position adjusting members such as pins or spacers introduced therebetween. In other words, though the position of the liquid crystal panels 441R, 441G, and 441B is fixed relatively to the base 445 with the spacers 448A introduced therebetween, no spacers exist between the holding member 446 and the base 445. Moreover, the spacers 448A are inserted between the light emitting face of the liquid crystal panels 441R, 441G, and 441B, and the face of the holding member 446 at the side of the liquid crystal panels 441R, 441G, and 441B, from the outside of the holding member 446 by the through hole 446J provided to the erected pieces 446D of the holding member 446. Accordingly, positional adjustment of the liquid crystal panels 441R, 441G, and 441B is easy, and the effects that the positional misalignment of spacers 448A following positional adjustment have on the positional misalignment of the liquid crystal panels 441R, 441G, and 441B are relatively small. Accordingly, this can contribute to reduction in manufacturing costs and improved image quality of the optical device and further the projector employing this.

Also, the holding frame 443G can include a supporting plate alone, the liquid crystal panels 441R, 441G, and 441B are directly stored and held in the storing space of the holding member 446, and the light incident side of the liquid crystal panels 441R, 441G, and 441B is pressed and fixed by the holding frame 443G, so that the number of parts can be reduced, and the number of assembly steps can be reduced. Accordingly, the manufacturing costs of the optical device and further the projector can be reduced.

The liquid crystal panels 441R, 441G, and 441B are not fixed to the light flux incident end face of the cross-dichroic prism 45 unlike the conventional POP structures, and rather fixed to the side faces of the bases 445 fixed on the upper and lower faces of the cross-dichroic prism 45. Accordingly, the size of the cross-dichroic prism 45 can be reduced, and consequently, this can reduce the size and reduce the manufacturing costs of the optical device, and further, the projector.

Also, the holding member 446 has protrusions 446F at the face of contact with the base 445, and these protrusions and the base 445 form a partial gap whereby, in the event that replacing the liquid crystal panels 441R, 441G, and 441B becomes necessary at the time of manufacturing or following manufacturing, a tool such as a screwdriver or the like can be inserted into the gap allowing easy peeling of the holding member 446 and the cross-dichroic prism 45 away from one another. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

Further, by linking the top portions of the holding members 446 with a frame linking member 452, the holding members 446 can be held and fixed in a stable manner, while the temperature distribution of the holding members 446 can be made uniform, thereby improving thermal conductivity.

The seventeenth embodiment according to the present invention will be described next.

In the following description, parts and structures the same as the twelfth embodiment are denoted with the same reference numerals, and detailed description thereof will be omitted or simplified.

With the twelfth embodiment, the holding member 446 is fixed directly to the light flux incident end face of the cross-dichroic prism 45. Conversely, with the seventeenth embodiment, a sapphire plate 451 with relatively high thermal conductivity is fixed to the light flux incident end face of the cross-dichroic prism 45, and the holding member 446 is fixed to the side face of the base 445 across the sapphire plate 451.

Figure 46:
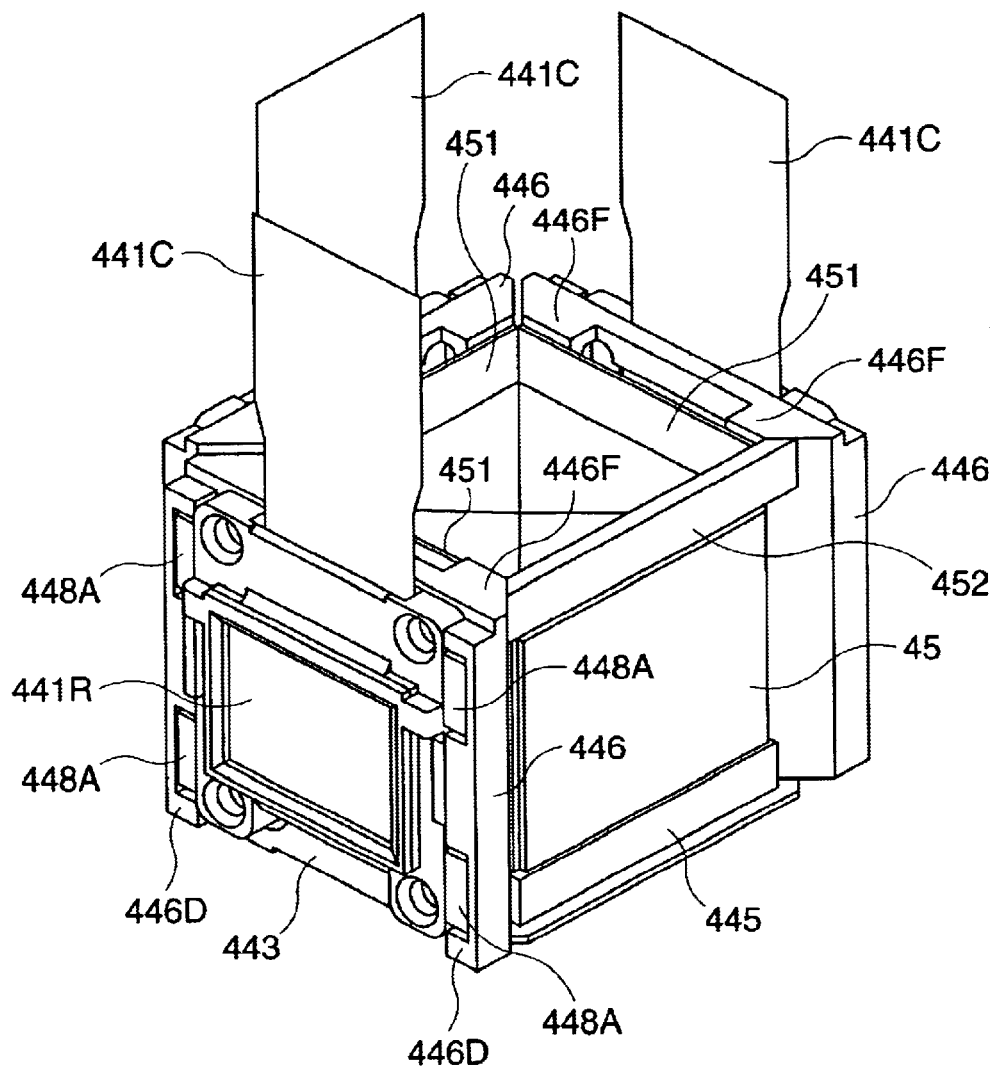
FIG. 46 is a perspective view representing the structure of an optical device according to a seventeenth embodiment.
Figure 47:
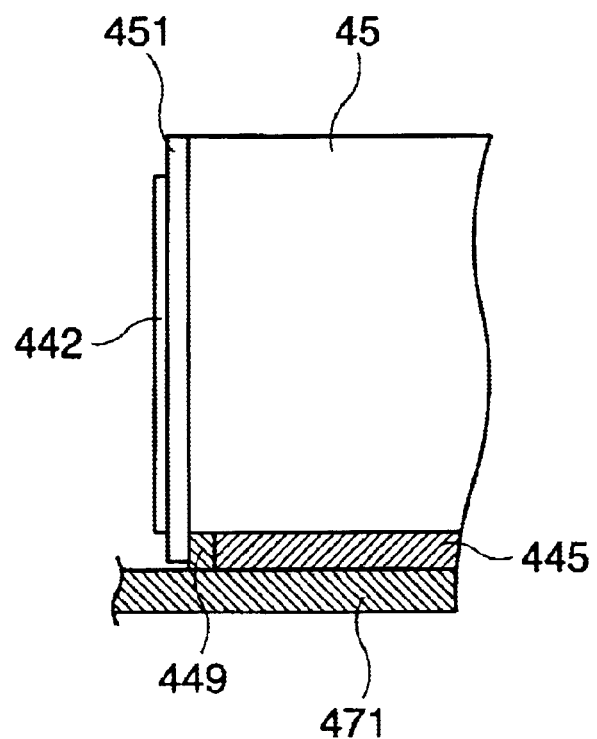
FIG. 47 is an explanatory view illustrating a sapphire plate and a base applied to a prism made of glass.

Specifically, as shown in FIG. 46 and FIG. 47, a sapphire plate 451 is fixed to almost the entire surface of the light flux incident end face of the cross-dichroic prism 45 using double-side tape or adhesive agent, and the polarizing plate 442 is applied to the liquid crystal panel corresponding portion at the center portion of the sapphire plate 451 using double-side tape or adhesive agent. Also, the protrusions 446F of the holding member 446 are fixed by an adhesive agent to the sapphire plate 451.

Further, as shown in FIG. 47, an adhesive agent 449 having excellent thermal conductivity is filled in the gap between the sapphire plate 451 and the base 445, joining these in a thermally conductible manner.

Other configurations are the same as the twelfth embodiment.

Also, the manufacturing method for the optical device according to the present embodiment is the same as the twelfth embodiment, except for the point that a sapphire plate 451 is fixed to the light flux incident end face of the cross-dichroic prism 45 using double-side tape or adhesive agent, and then the polarizing plate 442 is fixed to the sapphire plate 451 using double-side tape or adhesive agent, and the point that the holding member 446 is fixed to the side face of the base 445 across the sapphire plate 451.

As for the adhesive agent for adhesion of the interfaces of the base 445, sapphire plate 451, and holding member 446, a thermal-curing adhesive agent with excellent thermal conductivity, or a photo-curing adhesive agent is preferably used, as described above.

Also, for the configuration for joining the base 445 and the sapphire plate 451 so as to enable thermal conduction, an arrangement may be made wherein a thermal-conductive sheet with carbon mixed in, or spacer members or the like formed of thermal-conductive material are introduced so as to directly fix the sapphire plate 451 to the lower housing 471, instead of filling the adhesive agent with thermal conductivity between the base 445 and the sapphire plate 451. In this case, in addition to adhesive agent with thermal conductivity, mechanical fixing using screws or the like, can also be used in the fixation using the thermal conductive sheet or the spacer members.

Though omitted in the drawings, an arrangement may be made wherein the sapphire plate 451 is made smaller than the dimension between the protrusions 446F provided on the left and right edges of the holding member 446, so that the sapphire plate 451 is positioned between the protrusions 446F of the holding member 446 at the time of fixing the holding member 446 to the base 445 side face.

According to such a seventeenth embodiment, the following advantages can be realized, in addition to advantages the same as those of the twelfth embodiment.

In addition to cooling using the air path between the cross-dichroic prism 45 and the liquid crystal panels 441R, 441G, and 441B, the heat in the vicinity of the liquid crystal panels 441R, 441G, and 441B and the polarizing plate 442 can be conducted and dissipated in the order of the sapphire plate 451, base 445, and lower housing 471, so that even in the event that the prism 45 is made of glass with a relatively low thermal conductivity such as BK7 or the like, the cooling capabilities of the liquid crystal panels 441R, 441G, and 441B and the polarizing plate 442 can be greatly improved. Accordingly, even in the event that the luminance of the projector is raised, deterioration of the liquid crystal panel can be suppressed, and stable images can be maintained.

Also, the configuration according to the present embodiment wherein a sapphire plate 451 is used can also be applied to the first through third embodiments, and the twelfth through sixteenth embodiments. This enables advantages such as improved cooling capabilities, suppression of deterioration of the liquid crystal panel, and maintaining stable images, to be obtained with the first through third embodiments and the twelfth through sixteenth embodiments, as well.

Though various embodiments of the present invention have been described, it should be understood that the present invention is not restricted to the above embodiments, but rather includes other configurations and the like capable of achieving the objects of the present invention. For example, the following modifications are also encompassed by the present invention.

Figure 48:
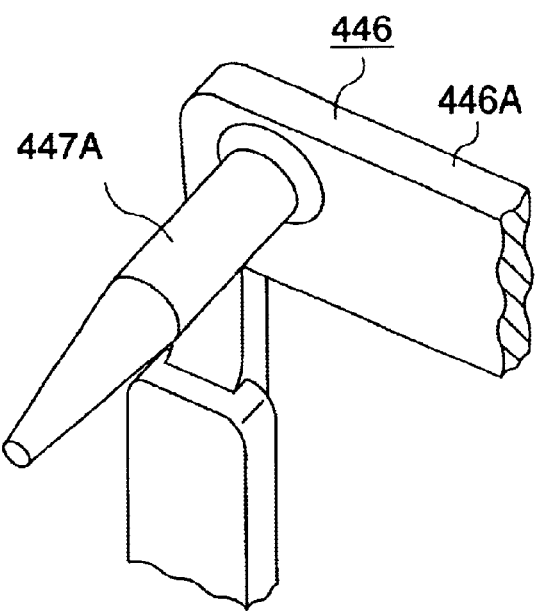
FIG. 48 is an enlarged view illustrating a modification example of the shape of pins of a holding member.

For example, in the first, fourth, fifth, eighth, eleventh, and fourteenth embodiments, the holding member 446 comprises pins 447A provided in a protruding condition from a rectangular plate-shaped member 446A, wherein the pins 447A have a generally column-like shape, but may be of a form that the top side is smaller in diameter than the base. For example, as shown in FIG. 48, a generally conical structure which grows narrower from the base toward the tip may be assumed. With such a shape wherein the tip side of the pin 447A is smaller in diameter than the base, the holding member 446 and the holding frame 443 can be efficiently fixed in a short time and in a sure manner with a photo-curing adhesive agent such as an ultraviolet curing adhesive agent or the like. The reason is that at the time of irradiating light from the tip portion of the pins 447A for hardening, the reflection and absorption of light at the tip portion of the pins 447A is reduced, and sufficient light is irradiated to the adhesive agent existing at the contact portion between the pins 447A and the holding frame 443. Such a structure is particularly preferable in the event that the holding member 446 can include metal.

Figure 49:
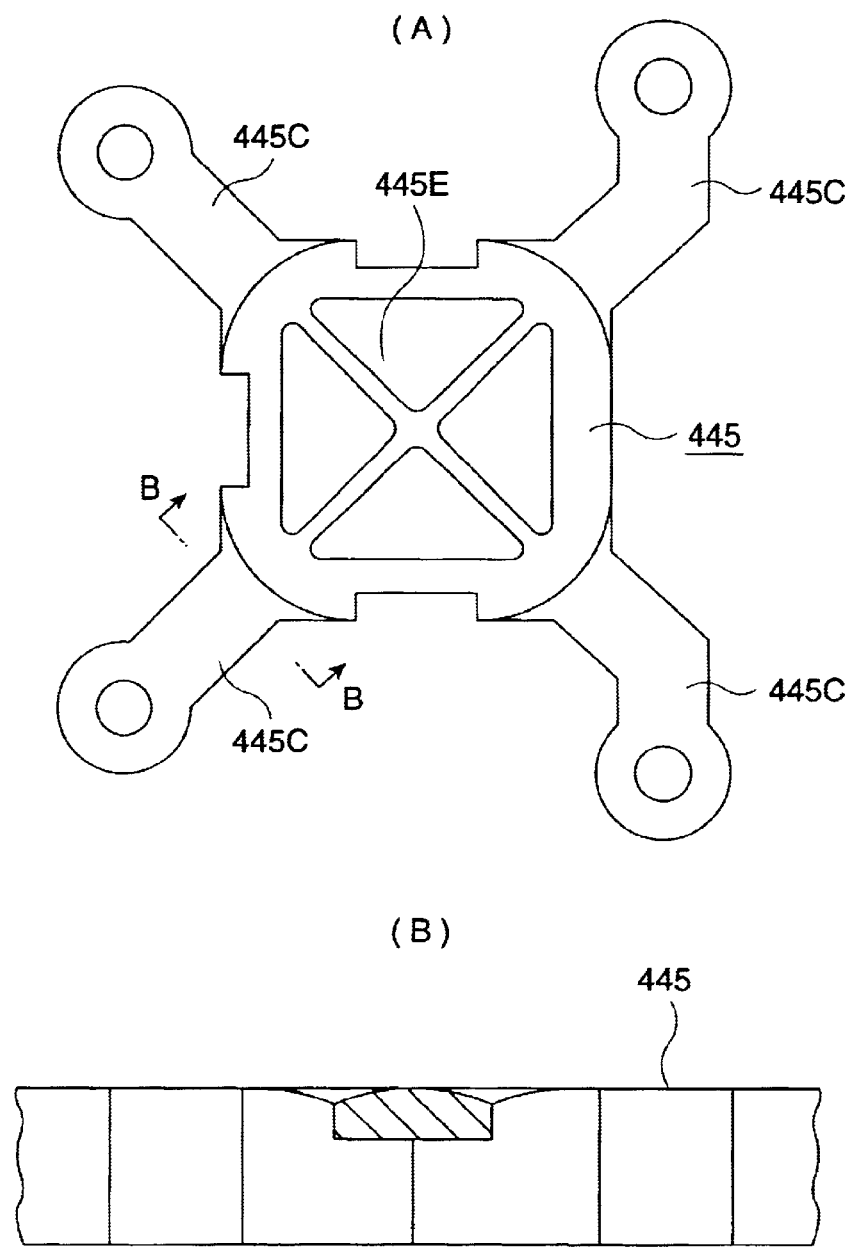
FIG. 49 is a plan view and cross-sectional view illustrating a modification example of the shape of a base.

Also, the shape of the corners of the bases 445 according to the first through third embodiments may be a tapered shape, as shown in FIG. 49. FIG. 49 (A) shows a plan view of a base 445 with the corners in a tapered shape, and FIG. 49 (B) shows a cross-sectional view along line B—B in FIG. 49 (A). Due to the base 445 being formed thus, the holding member 446 and the holding frame 443 can be efficiently fixed in a short time and in a sure manner with a photo-curing adhesive agent such as an ultraviolet effect adhesive agent or the like. The reason is that at the time of irradiating light to the gap between the base 445 and the holding member 446 from above the base 445 for joining the base 445 and the holding member 446, the reflection and absorption of light at the corners of the base 445 is reduced, and sufficient light is irradiated to the adhesive agent existing in the gap between the base 445 and the holding member 446. Now, while a case wherein light is irradiated from above the base 445 has been described here, in the event of irradiating light from below the base 445 fixed on the lower side of the cross-dichroic prism 45, the edges of the base 445 fixed below can be tapered. Also, the configuration wherein the corners of the base 445 are tapered can also be applied to the twelfth through seventeenth embodiments.

Also, in the first through fifth, eighth, eleventh, and fourteenth embodiments, the holding member 446 and holding frame 443 are fixed through pins 447A or erected pieces 447B with a general L-shape when viewed from the front, but the form of the pins 447A or erected pieces 447B are not restricted to forms such as shown in FIGS. 8 and 9, 15, 16, and so forth. That is to say, anything will suffice for the shape of the pins 447A or erected pieces 447B, as long as the shape allows the holding member 446 and the holding frame 443 to be fixed.

Also, with regard to the shape of the engaging grooves 446C provided to the holding member 446 in the first through third embodiments, the shape is not restricted to that such as shown in FIGS. 9, 15, and 16. That is to say, anything will suffice for the shape so long as it is capable of supporting the polarizing plate 442.

Further, with regard to the position of the base 445 or the way of attaching the base 445 and the lower housing 471 as well, the present invention is not restricted to the configurations shown in the above embodiments.

For example, with the first through third embodiments, bases 445 are provided on the top and bottom faces of the cross-dichroic prism 45 (both of a pair of end faces intersecting the light flux incident end face), but this may be changed to a configuration using a base 445 and linking member 452, as with the twelfth through seventeenth embodiments. Or, conversely, the configuration of the twelfth through seventeenth embodiments using a base 445 and linking member 452 may be changed to the configuration wherein bases 445 are provided on the top and bottom faces of the prism 45 as with the first through third embodiments.

Also, with the first through fourth embodiments, the optical device is fixed to the lower housing 471 by a base 445 fixed to the upper face of the prism 45, but may be fixed to the lower housing 471 by a base 445 fixed to the lower face of the prism 45, as with the other embodiments. Also, with the first through fourth embodiments, the attachment portion 445B to the lower housing 471 of the optical device is provided to the base 445 fixed to the upper face of the cross-dichroic prism 45, but this may be formed on the base 445 fixed to the lower face of the cross-dichroic prism 45. However, the arrangement wherein the attachment portion 445B is formed on the base 445 fixed to the upper face of the cross-dichroic prism 45 as with the embodiments is advantageous in that the optical device can be readily mounted to and detached from the lower housing 471. Also, the optical devices according to the fifth through seventeenth embodiments may be arranged so that the optical device may be fixed to the lower housing 471 by a base 445 fixed to the upper face of the cross-dichroic prism 45, as with the first through fourth embodiments.

Also, with the first through fourth embodiments, the optical device is fixed on an attachment portion 473 provided on bosses 476 on the lower housing 471, but the structure of attaching the optical device is not restricted to this. That is to say, the position, form, etc., of attachment portion for the optical device can be arbitrarily decided. Also, the form of the attachment portion 445B provided to the base 445 can also be arbitrarily decided, and is not restricted to the shape in the embodiments described above. Also, the bosses 476 of the lower housing 471 are integrally provided with the head portion 49 and holding pieces 477, but each may be provided individually.

With the fourth embodiment, a partial gap is not formed between the cross-dichroic prism 45 and the holding member 446, but a partial gap may be formed between the cross-dichroic prism 45 and the holding member 446 as with the sixth through seventeenth embodiments. Such a configuration contributes to reduction in manufacturing costs of optical device and further the projector, and to improvement in after-sales service. Also, this gap forms an air path for cooling the liquid crystal panels 441R, 441G, and 441B and the optical elements such as the polarizing plate and the like disposed in the vicinity thereof, which can prevent deterioration of the liquid crystal panels 441R, 441G, and 441B and the optical elements disposed in the vicinity thereof due to heat, thereby contributing to improved image quality.

Also, in the twelfth through sixteenth embodiments, thermal-conductive adhesive agent may be filled in the gap formed between the cross-dichroic prism 45 and the holding member 446. In this case, a heat conducting path from the holding member 446 to the cross-dichroic prism 45 to the base 445 is formed, so that cooling of the liquid crystal panels 441R, 441G, and 441B is further promoted.

In the above embodiments, the cross-dichroic prism 45 is configured of a prism of a material such as optical glass, crystal, sapphire, etc., and dielectric multi-layer films, but the configuration of the prism 45 is not restricted to these. For example, a configuration may be used wherein cross-mirrors are placed in a generally rectangular parallelepiped or a cubic container formed of glass or the like, and the container is filled with a fluid. That is to say, any configuration will suffice for the prism 45 as long as it has functions for synthesizing color light, and light flux incident end faces for attaching light modulating devices.

Further, with the embodiments, an example has been given of a projector using three light modulating devices, but the present invention is also applicable to a projector using one light modulating device, a projector using two light modulating devices, or a projector using four or more light modulating devices.

Also, with the present embodiment, liquid crystal panels are used as light modulating devices, but light modulating devices other than liquid crystal may be used, such as devices using micro-mirrors.

Further, with the present embodiment, transmission type light modulating devices wherein the light incident face and the light emitting face are different arc used, but reflection type light modulating devices wherein the light incident face and the light emitting face are the same may be used.

Moreover, with the present embodiment, only an example front-type projector wherein projection is performed from the side of observation of the screen has been given, but the present invention is also applicable to rear-type projectors wherein projection is performed from the opposite side from the side of observation of the screen.

What is claimed is:

1. A projector including an optical device integrally provided with a plurality of light modulating devices that modulate a plurality of color lights for each color light according to image information, and a color synthesizing optical element that synthesizes each color light modulated at the light modulating devices, comprising:

a holding frame that holds the light modulating devices, having an opening on a portion corresponding to an image formation region of the light modulating devices;

a base fixed to at least one of a pair of end faces intersecting with a light flux incident end face of the color synthesizing optical element; and a holding member disposed between the holding frame and a side face of the base, the light modulating devices being fixed to a side face of the base by the holding frame and the holding member.

2. The projector according to claim 1,
holes being formed in at least two places of the holding frame;
and the holding member further including a rectangular plate-shaped member with an opening formed at a position corresponding to the opening of the holding frame, and pins to be inserted into the holes in the holding frame, provided protruding from the rectangular plate-shaped member.

3. The projector according to claim 2,
the holding member including a material having light transmittance.

4. The projector according to claim 3,
the holding frame and the holding member being fixed by a photo-curing adhesive agent.

5. The projector according to claim 2,
the holding member comprising metal.

6. The projector according to claim 5,
the pins having forms that a tip side is narrower than a base side thereof.

7. The projector according to claim 5,
the holding frame and the holding member being fixed by a thermal-curing adhesive agent.

8. The projector according to claim 2,
a notch for hot behavioral difference absorption being formed on the rectangular plate-shaped member.

9. The projector according to claim 1,
the holding member further including a rectangular plate-shaped member with an opening formed at a position corresponding to the opening of the holding frame, and erected pieces with a general L-shape when viewed from the front, which are positioned at corner portions of the rectangular plate-shaped member and provided in a protruding condition along an edge of the rectangular plate-shaped member, and hold a perimeter of the holding frame.

10. The projector according to claim 9,
the erected pieces being provided in a protruding condition at the four corners of the rectangular plate-shaped member of the holding member.

11. The projector according to claim 9,
the erected pieces being provided along at a pair of mutually parallel sides of the rectangular plate-shaped member, having generally a same length as the sides of the rectangular plate-shaped member.

12. The projector according to claim 9,
the holding member comprising a material having light transmittance.

13. The projector according to claim 12,
the holding frame and the holding member being fixed by a photo-curing adhesive agent.

14. The projector according to claim 9,
the holding member comprising metal.

15. The projector according to claim 14,
the holding frame and the holding member being fixed by a thermal-curing adhesive agent.

16. The projector according to claim 9,
a notch for hot behavioral difference absorption being formed on the rectangular plate-shaped member.

17. The projector according to claim 1,
the holding member comprising an engaging groove to be engaged with a plate-shaped optical element.

18. The projector according to claim 1,
the holding member comprising a supporting face that fixes an optical element.

19. The projector according to claim 1,
a first supporting face that fixes a first optical element and a second supporting face that fixes a second optical element being formed on the holding member, and the first supporting face and the second supporting face being configured so that the out-of-plane directional positions differ from one another.

20. The projector according to claim 1,
the base being fixed to both of a pair of end faces intersecting with a light flux incident end face of the color synthesizing optical element.

21. The projector according to claim 20,
the base having a recessed portion formed at a portion of an end where the holding member is fixed by adhesion.

22. The projector according to claim 20,
the side face of the base protruding out farther than a light flux incident end face of the color synthesizing optical element.

23. The projector according to claim 1,
the base being fixed to only one of a pair of end faces intersecting with a light flux incident end face of the color synthesizing optical element;
and a linking member that links the holding members facing one another being provided adjacent the other of the end faces.

24. The projector according to claim 23,
at least two of the base, the holding member, and the linking member, being formed integrally.

25. The projector according to claim 1,
optical parts being attached to an optical parts housing;
and an attachment portion to be fixed to the optical parts housing being formed on at least one side of the base.

26. The projector according to claim 1,
the holding frame further comprising a recessed frame member that stores the light modulating devices, and a supporting plate that presses and fixes stored light modulating devices.

27. The projector according to claim 1,
the light modulating devices comprising a pair of substrates, and a light-transmissive dust-proof plate fixed to at least one of the pair of substrates.

28. The projector according to claim 1, further comprising a projecting lens that projects images formed by the optical device.

29. A projector including an optical device integrally provided with a plurality of light modulating devices that modulate a plurality of color lights for each color light according to image information, and a color synthesizing optical element that synthesizes each color light modulated at the light modulating devices, comprising:
a holding frame that holds the light modulating devices, having an opening on a portion corresponding to an image formation region of the light modulating devices; and
a holding member directly fixed to a light flux incident end face of the color synthesizing optical element, the holding frame being directly fixed to the holding member.

30. The projector according to claim 29,
holes being formed in at least two places of the holding frame;
and the holding member comprising a rectangular plate-shaped member with an opening formed at a position corresponding to the opening of the holding frame, and pins to be inserted into the holes in the holding frame, provided protruding from the rectangular plate-shaped member.

31. The projector according to claim 30,
the holding member comprising a material having light transmittance.

32. The projector according to claim 31,
the holding frame and the holding member being fixed by a photo-curing adhesive agent.

33. The projector according to claim 30,
the holding member comprises metal.

34. The projector according to claim 33,
the pins having forms that a tip side is narrower than a base side thereof.

35. The projector according to claim 30,
the holding frame and the holding member being fixed by a thermal-curing adhesive agent.

36. The projector according to claim 30,
a notch for hot behavioral difference absorption being formed on the rectangular plate-shaped member.

37. The projector according to claim 30,
the holding member comprising a rectangular plate-shaped member with an opening formed at a position corresponding to an opening of the holding frame, and erected pieces with a general L-shape when viewed from the front, which are positioned at the corner portions of the rectangular plate-shaped member and provided in a protruding condition along an edge of the rectangular plate-shaped member and hold a perimeter of the holding frame.

38. The projector according to claim 37,
the erected pieces being provided in a protruding condition at the four corners of the rectangular plate-shaped member of the holding member.

39. The projector according to claim 37,
the erected pieces being provided at a pair of mutually parallel sides of the rectangular plate-shaped member, and having generally a same length as the sides of the rectangular plate-shaped member.

40. The projector according to claim 37,
the holding member comprising a material having light transmittance.

41. The projector according to claim 40,
the holding frame and the holding member being fixed by a photo-curing adhesive agent.

42. The projector according to claim 37,
the holding member comprising metal.

43. The projector according to claim 42,
the holding frame and the holding member being fixed by a thermal-curing adhesive agent.

44. The projector according to claim 37,
a notch for hot behavioral difference absorption being formed on the rectangular plate-shaped member.

45. The projector according to claim 29,
the holding member comprising an engaging groove to be engaged with a plate-shaped optical element.

46. The projector according to claim 29,
the holding member comprising a supporting face that fixes an optical element.

47. The projector according to claim 29,
a first supporting face that fixes a first optical element and a second supporting face that fixes a second optical element being formed on the holding member, and the first supporting face and the second supporting face being formed so that the out-of-plane directional positions differ from one another.

48. The projector according to claim 29,
the holding member comprising a protruding portion at a face of contact with the color synthesizing optical element, and a partial gap being formed between the color synthesizing optical element and the holding member by the color synthesizing optical element and the protruding portion.

49. The projector according to claim 29,
comprising a base fixed to at least one of a pair of end faces intersecting with a light flux incident end face of the color synthesizing optical element;
the optical device being attached to an optical parts housing by the base;
and an attachment portion to be fixed to the optical parts housing being formed on the base.

50. The projector according to claim 29,
the holding frame comprising a recessed frame member that stores the light modulating devices, and a supporting plate that presses and fixes stored light modulating devices.

51. The projector according to claim 29,
the light modulating devices comprising a pair of substrates, and a light-transmissive dust-proof plate fixed to at least one of the pair of substrates.

52. The projector according to claim 29, further comprising a projecting lens that projects images formed by the optical device.

53. A projector including an optical device integrally provided with a plurality of light modulating devices that modulates a plurality of color lights for each color light according to image information, and a color synthesizing optical element that synthesizes each color light modulated at the light modulating devices, comprising:
a holding frame that holds the light modulating devices, having an opening on a portion corresponding to an image formation region of the light modulating devices;
a holding member directly fixed to a light flux incident end face of the color synthesizing optical element, having an erected piece formed so as to cover a side edge of the holding frame, and a supporting piece that supports a face of the holding frame at the side of the color synthesizing optical element; and
spacers disposed between the holding frame and the erected piece of the holding member;
the holding frame being fixed to the holding member by the spacers.

54. The projector according to claim 53,
the holding frame comprising a recessed frame member that stores the light modulating devices, and a supporting plate that presses and fixes stored light modulating devices.

55. The projector according to claim 53,
the holding frame comprising a supporting member that supports the light incident side of the light modulating device;
and the light emitting side of the light modulating device being held by the holding member.

56. The projector according to claim 55,
the spacers being provided between a light emitting face of the light modulating device and a face of the holding member at the side of the light modulating device.

57. The projector according to claim 53,
the holding member comprising a material having light transmittance.

58. The projector according to claim 57,
the holding frame and the holding member being fixed by a photo-curing adhesive agent.

59. The projector according to claim 53,
the holding member comprising metal.

60. The projector according to claim 59,
the holding frame and the holding member being fixed by a thermal-curing adhesive agent.

61. The projector according to claim 53,
the holding member comprising a protruding portion at a face of contact with the color synthesizing optical element, and a partial gap being formed between the color synthesizing optical element and the holding member by the color synthesizing optical element and the protruding portion.

62. The projector according to claim 53,
comprising a base fixed to at least one of a pair of end faces intersecting with a light flux incident end face of the color synthesizing optical element;
the optical device attached to an optical parts housing by the base;
and an attachment portion to be fixed to the optical parts housing being formed on the base.

63. The projector according to claim 53,
the light modulating devices comprising a pair of substrates, and a light-transmissive dust-proof plate fixed to at least one of the pair of substrates.

64. The projector according to claim 53 further comprising a projecting lens that projects images formed by the optical device.

65. A projector including an optical device integrally provided with a plurality of light modulating devices that modulates a plurality of color lights for each color light according to image information, and a color synthesizing optical element that synthesizes each color light modulated at the light modulating devices, comprising:
a holding frame that holds the light modulating devices, having an opening on a portion corresponding to an image formation region of the light modulating devices;
a base fixed to at least one of a pair of end faces intersecting with a light flux incident end face of the color synthesizing optical element;
a holding member directly fixed to the base, having an erected piece formed so as to cover a side edge of the holding frame, and a supporting piece that supports a face of the holding frame at the side of the color synthesizing optical element; and
spacers disposed between the holding frame and the erected piece of the holding member, the holding frame being fixed to the holding member by the spacers.

66. The projector according to claim 65,
the holding frame comprising a recessed frame member that stores the light modulating devices, and a supporting plate that presses and fixes stored light modulating devices.

67. The projector according to claim 65,
the holding frame comprising a supporting member that supports the light incident side of the light modulating device;
and the light emitting side of the light modulating device being held by the holding member.

68. The projector according to claim 67,
the spacers being provided between a light emitting face of the light modulating device and a face of the holding member at the side of the light modulating device.

69. The projector according to claim 65,
the holding member comprising a material having light transmittance.

70. The projector according to claim 69,
wherein the holding frame and the holding member are fixed by a photo-curing adhesive agent.

71. The projector according to claim 65,
the holding member comprises metal.

72. The projector according to claim 71,
the holding frame and the holding member being fixed by a thermal-curing adhesive agent.

73. The projector according to claim 65,
the base being fixed to both of a pair of end faces intersecting with a light flux incident end face of the color synthesizing optical element.

74. The projector according to claim 73,
a recessed portion being formed at a portion of an end face where the holding member is fixed by adhesion.

75. The projector according to claim 73,
a side face of the base protruding out farther than a light flux incident end face of the color synthesizing optical element.

76. The projector according to claim 65,
the base being fixed to only one of a pair of end faces intersecting with a light flux incident end face of the color synthesizing optical element; and
a linking member that links the holding members facing one another being provided near the other of the end faces.

77. The projector according to claim 76,
at least two of the base, the holding member, and the linking member, being formed integrally.

78. The projector according to claim 65,
optical parts being attached to an optical parts housing; and
an attachment portion fixed to the optical parts housing being formed on at least one side of the base.

79. The projector according to claim 65,
the light modulating devices comprising a pair of substrates, and a light-transmissive dust-proof plate fixed to at least one of the pair of substrates.

80. The projector the optical device according to claim 65, further comprising a projecting lens that projects images formed by the optical device.

81. A manufacturing method for an optical device integrally provided with a plurality of light modulating devices for modulating a plurality of color lights for each color light according to image information, and a color synthesizing optical element for synthesizing each color light modulated at the light modulating devices, the method comprising:
fixing a base to at least one end face of a pair of end faces intersecting with a light flux incident end face of the color synthesizing optical element;
mounting each of the plurality of light modulating devices to a holding frame;
attaching the holding frame to a holding member using an adhesive agent;
attaching the holding member to the base side face using an adhesive agent;
adjusting the position of the plurality of light modulating devices in the state that the adhesive agent is unhardened; and
hardening the adhesive agent following the position adjusting step;
wherein, in the position adjusting step, with a predetermined optical axis as a Z axis and two axes orthogonally intersecting the Z axis as an X axis and Y axis,
adjustment in the Z-axial direction and in a rotational direction centered on the X axis and Y axis is performed between the holding frame and the holding member;

and wherein adjustment in the X-axial direction, Y-axial direction and rotational adjustment in the X-Y plane is performed between the holding member and the base.

82. The manufacturing method for an optical device according to claim 81, further comprising inserting spacers coated with adhesive agent between the light modulating devices and the holding member, before the position adjusting step;

wherein adjustment in the Z-axial direction and in the rotational direction centered on the X axis and Y axis is performed between the holding frame and the holding member by the spacers.

83. A manufacturing method for an optical device integrally provided with a plurality of light modulating devices for modulating a plurality of color lights for each color light according to image information, and a color synthesizing optical element for synthesizing each color light modulated at the light modulating devices, the method comprising:

mounting the plurality of light modulating devices each to a holding frame;

attaching the holding frame to a holding member using an adhesive agent;

attaching the holding member to a light flux incident end face of the color synthesizing optical element, using an adhesive agent;

adjusting the position of the plurality of light modulating devices in the state that the adhesive agent is unhardened; and hardening the adhesive agent following the position adjusting step;

wherein, in the position adjusting step, with a predetermined optical axis as a Z axis and two axes orthogonally intersecting the Z axis as an X axis and Y axis, adjustment in the Z-axial direction and in a rotational direction centered on the X axis and Y axis is performed between the holding frame and the holding member;

and wherein adjustment in the X-axial direction, Y-axial direction and the rotational direction in the X-Y plane is performed between the holding member and the light flux incident end face of the color synthesizing optical element.

84. The manufacturing method for an optical device according to claim 83, further comprising inserting spacers coated with adhesive agent between the light modulating devices and the holding member, before the position adjusting step;

wherein adjustment in the Z-axial direction and in the rotational direction centered on the X axis and Y axis is performed between the holding frame and the holding member by the spacers.

* * * * *